(12) United States Patent
Bentfeld et al.

(10) Patent No.: US 12,119,774 B2
(45) Date of Patent: Oct. 15, 2024

(54) PLANAR DRIVE SYSTEM

(71) Applicant: Beckhoff Automation GmbH, Verl (DE)

(72) Inventors: Lukas Bentfeld, Delbrück (DE); Rolf Brinkmann, Bad Salzuflen (DE); Patrick Jebramcik, Gütersloh (DE); Tim Kaulmann, Paderborn (DE)

(73) Assignee: Beckhoff Automation GmbH, Verl (DE)

( * ) Notice: Subject to any disclaimer, the term of this patent is extended or adjusted under 35 U.S.C. 154(b) by 127 days.

(21) Appl. No.: 17/988,079

(22) Filed: Nov. 16, 2022

(65) Prior Publication Data

US 2023/0071070 A1 Mar. 9, 2023

Related U.S. Application Data

(63) Continuation of application No. PCT/EP2021/063868, filed on May 25, 2021.

(30) Foreign Application Priority Data

May 26, 2020 (EP) .................................... 20176561

(51) Int. Cl.
*H02K 41/03* (2006.01)
*H02P 6/00* (2016.01)
(Continued)

(52) U.S. Cl.
CPC ................ *H02P 6/10* (2013.01); *H02P 6/006* (2013.01); *H02P 25/064* (2016.02)

(58) Field of Classification Search
CPC ........ H02K 41/031; H02J 7/1492; H02P 6/10; H02P 25/064; H02P 6/006
See application file for complete search history.

(56) References Cited

U.S. PATENT DOCUMENTS

| | | |
|---|---|---|
| 7,948,122 B2 | 5/2011 | Compter et al. |
| 9,667,127 B2 | 5/2017 | Roos |

(Continued)

FOREIGN PATENT DOCUMENTS

| | | |
|---|---|---|
| CN | 104885346 A | 9/2015 |
| DE | 10054376 A1 | 6/2001 |

(Continued)

OTHER PUBLICATIONS

Office Action dated Jun. 21, 2023 in connection with Chinese patent application No. 202180038090.1, 21 pages including English translation.

(Continued)

*Primary Examiner* — Cortez M Cook
(74) *Attorney, Agent, or Firm* — Dorsey & Whitney LLP

(57) ABSTRACT

A planar drive system comprises a stator and a rotor. The stator comprises a plurality of energizable stator conductors. The rotor comprises a magnet device having at least one rotor magnet. A magnetic interaction can be produced between energized stator conductors of the stator and the magnet device to drive the rotor. The stator is configured to carry out energization of the stator conductors so that an alternating magnetic field can be generated via the energized stator conductors. The rotor comprises at least one rotor coil in which an alternating voltage can be induced due to the alternating magnetic field. The planar drive system is configured to transmit data from the stator to the rotor, and the stator is configured to temporarily influence the energization of the stator conductors in order to temporarily cause a change with respect to the alternating voltage induced in the at least one rotor coil.

19 Claims, 30 Drawing Sheets

(51) Int. Cl.
*H02P 6/10* (2006.01)
*H02P 25/064* (2016.01)

(56) References Cited

U.S. PATENT DOCUMENTS

| | | | |
|---|---|---|---|
| 2010/0175943 | A1 | 7/2010 | Bergmann |
| 2016/0241173 | A1* | 8/2016 | Prussmeier .......... H02K 41/031 |
| 2021/0170890 | A1* | 6/2021 | Iyer ..................... H02J 7/1492 |

FOREIGN PATENT DOCUMENTS

| | | | |
|---|---|---|---|
| DE | 102009014960 A1 | 10/2010 | |
| EP | 2415162 A2 | 2/2012 | |
| EP | 1842101 B1 | 9/2014 | |
| EP | 3457558 A1 | 3/2019 | |
| JP | 5422126 B2 | 11/2013 | |
| WO | 2010112132 A2 | 10/2010 | |
| WO | 2015179962 A1 | 12/2015 | |

OTHER PUBLICATIONS

Philips Engineering Solutions, "Magnetic Levitation using Inverted Planar Motor Technology" from <https://www.youtube.com/watch?v=CEK7bfBLTCk>.
International Preliminary Report on Patentability dated Apr. 25, 2022 in connection with International Patent Application No. PCT/EP2021/063868, 39 pages including translation.
International Search Report and Written Opinion dated Aug. 19, 2021 in connection with International Patent Application No. PCT/EP2021/063868, 20 pages including translation.
Office Action dated Jan. 6, 2024 in connection with Chinese patent application No. 202180038090.1, 20 pages including English translation.
Ding et al. "The principle of energy feedback traction power supply and its application in urban rail transit," Beijing Jiaotong University Press, 1st Ed., Sep. 30, 2014, p. 57, lines 1-3.

* cited by examiner

PLANAR DRIVE SYSTEM

CROSS-REFERENCE TO RELATED APPLICATIONS

This patent application is a continuation of International Patent Application No. PCT/EP2021/063868, PLANAR DRIVE SYSTEM AND METHOD FOR OPERATING A PLANAR DRIVE SYSTEM, filed 25 May 2021, which claims the priority of European patent application No. EP 20 176 561.7, PLANARANTRIEBSSYSTEM UND VERFAHREN ZUM BETREIBEN EINES PLANARANTRIEBSSYSTEMS, filed 26 May 2020, each of which is incorporated by reference herein, in the entirety and for all purposes.

FIELD

The present invention relates to a planar drive system.

BACKGROUND

Planar drive systems may be used in various fields. Possible examples are automation technology, in particular manufacturing technology, handling technology and process engineering. A planar drive system may be used to move or position a movable element, which may e.g. be a component of a system or machine, in at least two linearly independent directions. A planar drive system may comprise a permanently energized electromagnetic planar motor with a planar stator and at least one rotor movable above the stator in at least two directions.

The stator of a planar drive system may have a plurality of energizable stator conductors. The rotor may comprise a magnet device having a plurality of permanent magnets. The rotor may be driven by energizing stator conductors of the stator. In this way, a magnetic interaction may be caused between energized stator conductors and the magnet device of the rotor, wherein the rotor may be held suspended above the stator and moved above it.

SUMMARY

The present invention provides an improved planar drive system.

According to a first aspect, a planar drive system is proposed. The planar drive system comprises a stator and a rotor. The stator comprises a plurality of energizable stator conductors. The rotor comprises a magnet device having at least one rotor magnet. A magnetic interaction may be produced between energized stator conductors of the stator and the magnet device of the rotor in order to drive the rotor. The stator is embodied to carry out the energization of stator conductors in such a way that an alternating magnetic field may be generated via energized stator conductors. The rotor comprises at least one rotor coil in which an alternating voltage may be induced due to the alternating magnetic field. The planar drive system is embodied to transmit data from the stator to the rotor, in that the stator is embodied to temporarily influence the energization of stator conductors in order to thereby temporarily cause a change with respect to the alternating voltage which may be induced in the at least one rotor coil of the rotor According to a second aspect, a planar drive system is proposed. The planar drive system comprises a stator and a rotor. The stator comprises a plurality of energizable stator conductors. The rotor comprises a magnet device having at least one rotor magnet. A magnetic interaction may be produced between energized stator conductors of the stator and the magnet device of the rotor in order to drive the rotor. The stator is embodied to carry out the energization of stator conductors by a current control based on a pulse-width modulation, so that stator conductors to be energized are supplied with pulse-width modulated periodic voltage pulses. Due to the current control based on pulse-width modulation, a ripple current in energized stator conductors of the stator and thereby an alternating magnetic field may be generated. The rotor comprises at least one rotor coil in which an alternating voltage may be induced due to the alternating magnetic field. The planar drive system is embodied to transmit data from the stator to the rotor, in that the stator is embodied to temporarily influence the energization of stator conductors in order to thereby temporarily cause a change with respect to the alternating voltage which may be induced in the at least one rotor coil of the rotor. The stator comprises an influencing device for temporarily influencing the energization of stator conductors for this purpose, which is embodied to temporarily influence the current control in such a way that a change with respect to the ripple current is caused in energized stator conductors of the stator.

According to a third aspect, a planar drive system is proposed. The planar drive system comprises a stator and a rotor. The stator comprises a plurality of energizable stator conductors. The rotor comprises a magnet device having at least one rotor magnet. A magnetic interaction may be produced between energized stator conductors of the stator and the magnet device of the rotor in order to drive the rotor. The stator is embodied to carry out the energization of stator conductors by a current control based on a pulse-width modulation, so that stator conductors to be energized are supplied with pulse-width modulated periodic voltage pulses. Due to the current control based on pulse-width modulation, a ripple current in energized stator conductors of the stator and thereby an alternating magnetic field may be generated. The rotor comprises at least one rotor coil in which an alternating voltage may be induced due to the alternating magnetic field. The planar drive system is embodied to transmit data from the stator to the rotor, in that the stator is embodied to temporarily influence the energization of stator conductors in order to thereby temporarily cause a change with respect to the alternating voltage which may be induced in the at least one rotor coil of the rotor. The temporary influencing of the energization of stator conductors comprises temporarily influencing the current control in such a way that a change with respect to the ripple current is caused in energized stator conductors of the stator.

EXAMPLES

The examples described in the following relate to an improved planar drive system suitable for transmitting data between a stator and a rotor. Further described is a corresponding method for operating a planar drive system.

A planar drive system is proposed. The planar drive system comprises a stator and a rotor. The stator comprises a plurality of energizable stator conductors. The rotor comprises a magnet device having at least one rotor magnet. A magnetic interaction may be produced between energized stator conductors of the stator and the magnet device of the rotor in order to drive the rotor. The stator is embodied to carry out the energization of stator conductors in such a way that an alternating magnetic field may be generated via energized stator conductors. The rotor comprises at least one rotor coil in which an alternating voltage may be induced due to the alternating magnetic field. The planar drive system is embodied to transmit data from the stator to the rotor. For this purpose, the stator is embodied to temporarily influence the energization of stator conductors in order to thereby temporarily cause a change with respect to the alternating voltage which may be induced in the at least one rotor coil of the rotor.

The proposed planar drive system is suitable for reliable data transmission from the stator to the rotor. In this context, energized stator conductors of the stator function as primary windings or primary coils, with the help of which a magnetic field is generated that changes over time. For this purpose, an electric current or alternating current varying over time may be induced in the relevant stator conductors. The at least one rotor coil of the rotor serves as a secondary winding or secondary coil in which an alternating electric voltage is induced due to the alternating magnetic field. The stator is embodied to temporarily influence the current flowing through stator conductors. This results in a change with respect to the alternating magnetic field generated by the stator, and thus also with respect to the alternating voltage that may be induced in the at least one rotor coil of the rotor. By temporarily influencing the current applied to stator conductors, a change in the induction voltage may be temporarily caused in a corresponding manner, and information transmission from the stator to the rotor may be realized on this basis.

Further possible details and embodiments, which may be considered for the planar drive system, are described in more detail in the following.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
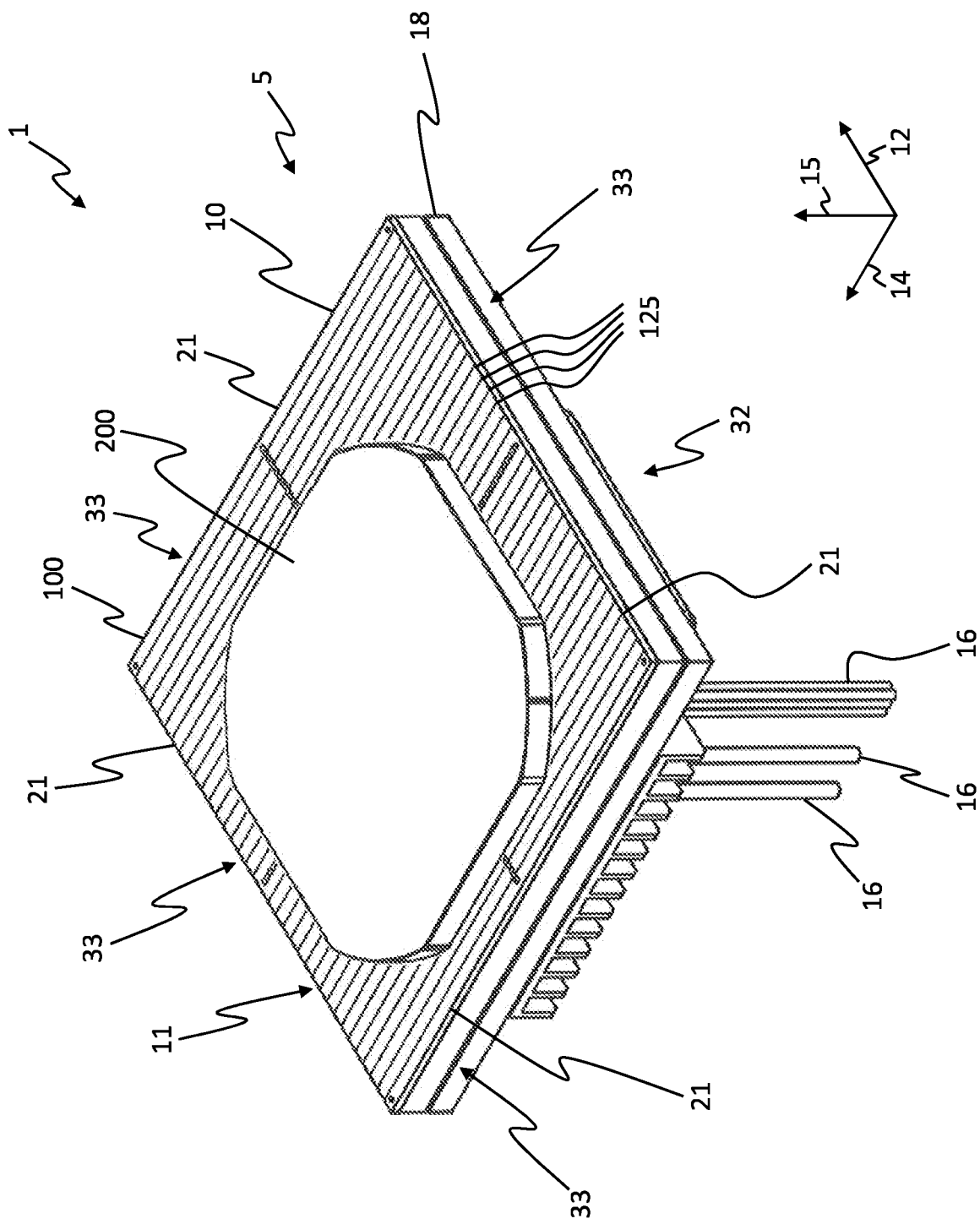
FIG. 1 is a perspective view of a planar drive system with a stator and a rotor, wherein the stator comprises a stator module.

Based on the following schematic figures, embodiments of a planar drive system and a method of operating a planar drive system are described. The planar drive system, which includes a planar stator and a movable rotor, is suitable for both reliable inductive power transfer from the stator to the rotor and reliable data transmission between the stator and the rotor. With reference to the embodiments described below, it is noted that aspects and details described with respect to one embodiment may also be applied to a further embodiment. Furthermore, it is possible to combine features of multiple embodiments.

The influencing of the energization of stator conductors of the stator may e.g. take place in such a way that, compared to an uninfluenced energization of stator conductors, a weaker or stronger alternating magnetic field is generated, and thus a smaller or larger alternating electrical voltage is induced in the at least one rotor coil of the rotor in a corresponding manner. Furthermore, it is possible that as a result of influencing the energization of stator conductors, the generation of the alternating magnetic field is suppressed or essentially suppressed, and thus no alternating voltage or only a small or negligibly small alternating voltage is induced in the rotor coil.

In order to transmit data signals or symbols from the stator to the rotor, the influencing of the energization of stator conductors may be intermittent or pulsed to thereby cause an intermittent or pulsed change with respect to the alternating magnetic field generated by the stator and thus with respect to the alternating voltage induced in the at least one rotor coil. For detecting the change in voltage induction and thus sending the data signals, the rotor may include a voltage measuring device for measuring the AC voltage induced in the rotor coil, as will be discussed in more detail below. By evaluating the measured induction voltage, the data signals generated by the stator may be inferred or determined.

The generating of the alternating magnetic field by the stator and the induction of the alternating electric voltage in the at least one rotor coil of the rotor may be used not only in the context of data communication, but also for wireless or inductive energy transmission from the stator to the rotor.

In this context, according to an embodiment, the rotor has a rectifier for converting the induced AC voltage into a DC voltage. The DC voltage may be used to electrically supply at least one further device, which may be a component of the rotor and/or arranged on the rotor. The rectifier may be a bridge rectifier or a synchronous rectifier. Furthermore, the rectifier may be embodied as a voltage amplifier or voltage doubler.

In a further embodiment, the planar drive system comprises a primary controller. The primary controller may be used to control the operation of the planar drive system. This includes, for example, the energization of stator conductors. The data transmission from the stator to the rotor may be controlled or initiated by the primary controller, as well.

In a further embodiment, which may be applied in this context for the purpose of data transmission from the stator to the rotor, the stator has an influencing device for temporarily influencing the energization of stator conductors. The influencing device of the stator may be controlled by the primary controller of the planar drive system. For this purpose, the primary controller may transmit corresponding control or data signals to the influencing device, on the basis of which the influencing device may temporarily influence the energization of stator conductors.

In a further embodiment, the stator is embodied to perform current control of stator conductors based on pulse-width modulation (PWM). The influencing device is embodied to temporarily influence the current control. By influencing the current control with the aid of the influencing device, the energization of stator conductors may be acted upon in a reliable manner to cause a corresponding change with respect to the alternating magnetic field and thereby with respect to the alternating voltage which may be induced in the at least one rotor coil of the rotor.

In the aforementioned embodiment, stator conductors to be energized may be supplied with an electrical voltage clocked with the aid of pulse-width modulation, and consequently with periodic voltage pulses predetermined by a PWM clock frequency or by a time grid of the pulse-width modulation. In this way, the electric current generated in energized stator conductors may be superimposed with an alternating current component, the so-called ripple current. This is due to a smoothing effect of the stator conductors serving as primary coils, as a result of which the current flowing in energized stator conductors follows the pulse-width modulated voltage in such a way that a sawtooth or triangular current curve is provided. The current may oscillate back and forth around a mean value. The occurrence of the ripple current is associated with a time-varying magnetic field, so that an alternating electrical voltage may be induced in the at least one rotor coil of the rotor as indicated above.

In a further embodiment, in which use is made of the fact that, as a result of the current control based on pulse-width modulation, a ripple current in energized stator conductors of the stator and thereby the alternating magnetic field may be generated, the influencing device used for the data transmission from the stator to the rotor is embodied to influence the current control in such a way as to cause a change with respect to the ripple current in energized stator conductors.

For example, it is possible to temporarily suppress the occurrence of the ripple current in energized stator conductors. In a corresponding manner, the generation of the alternating magnetic field and thus the induction of the alternating voltage in the at least one rotor coil of the rotor may be temporarily suppressed or essentially suppressed.

It is also possible to cause an increased or reduced ripple current in energized stator conductors by influencing. In this case, the ripple current may have an increased or reduced oscillation width (peak-to-peak amplitude) compared to the unaffected state.

As stated above, the rotor is driven by a magnetic interaction between energized stator conductors of the stator and the magnet device of the rotor. In this context, the rotor may be held suspended above the stator as well as additionally moved. As will be described in more detail below, the stator conductors of the stator may be interconnected to form independently energizable multiphase systems. In order to drive the rotor, depending on a position of the rotor, a part of the stator conductors or the multiphase systems may be energized simultaneously. Driving the rotor may be based on the mean value of the current flowing in energized stator conductors. The ripple current caused by the pulse-width modulated current, on the other hand, may have no or only a small and thus negligible influence on the driving of the rotor.

Within the framework of current control, different electrical target current values may be specified for stator conductors or multiphase systems of the stator, so that different electrical currents may flow through the stator conductors on average. Compared to the superimposed ripple current, such current changes may be much slower or relate to much larger periods of time. In this respect, current control may be referred to as direct current control or DC current control.

For current control, according to another embodiment, the stator comprises a plurality of current controllers, output stage devices connected to the stator conductors or multiphase systems, and current measuring devices. The output stage devices may comprise a plurality of output stages. The current measuring devices may be embodied to detect actual current values of stator conductors or multiphase systems. This may be done by sampling. The actual current values, together with target current values, may be transmitted to the current controllers. The current controllers may be embodied to generate control signals based on the actual current values and target current values. The control signals, which may be pulse-width modulated control signals, may be applied to the output stage devices. Based on this, pulse-width modulated or clocked voltage pulses may be applied to stator conductors or multiphase systems of the stator with the aid of the output stage devices, thus periodically energizing them. The output stage devices may be supplied with an intermediate circuit voltage for this purpose. The intermediate circuit voltage may be provided by an intermediate circuit of the stator.

As indicated above, the planar drive system may comprise a primary controller. The primary controller may be embodied to generate target current values for energizing stator conductors or multiphase systems of the stator. The target current values may be transmitted to the aforementioned current controllers.

The primary controller may further be embodied to define a system clock of the planar drive system, according to which the timing of the operation of the planar drive system may be determined. Based on the system clock, time parameters of the current control such as the PWM clock frequency may be specified in this context.

The PWM clock frequency may be in the kHz range, e.g. in the two-digit kHz range, and may amount to 64 kHz, for example. This correspondingly applies to the frequency of the alternating magnetic field and thus to the frequency of the AC voltage induced in the rotor coil.

As indicated above, according to a further embodiment, the stator conductors of the stator are interconnected to form multiphase systems which may be energized independently of one another. Each multiphase system may have a plurality of coils formed from stator conductors. In this respect, the multiphase systems may also be referred to as coil systems or multi-coil systems. In order to drive the rotor, a portion of the multiphase systems may be simultaneously energized or pulse-width modulated. The energizing of a plurality of multiphase systems may take place synchronously in time or essentially synchronously in time.

The stator may also be embodied to energize multiphase systems thereof with a multiphase current. Here, each coil of an energized multiphase system may be fed with a corresponding phase of the current. The current control carried out for this purpose with the aid of the stator may be based on center-aligned PWM, in which the coils of a multiphase system are supplied with voltage pulses center-aligned with regard to one another with respect to the PWM clock frequency or a time grid of the pulse-width modulation.

The multiphase systems of the stator may be three-phase systems or three-coil systems, each comprising three coils formed from stator conductors and interconnected with a common star point in each case. During operation of the planar drive system, such coil systems may be energized with a three-phase current. With reference to this embodiment, the output stage devices may be realized in the form of circuits with triple half-bridges.

With regard to the independent energizing of multiphase systems, the stator may also be embodied to perform its own current control for each multiphase system. For this purpose, the stator may have a current controller and an output stage device for each multiphase system. The stator may also have a current measuring device for each multiphase system. Alternatively, the stator may have one current measuring device for each group of multiphase systems, which allows for a low-cost design of the stator.

In a further embodiment, the stator of the planar drive system comprises one or a plurality of stator modules. In an embodiment with multiple stator modules, these may be arranged laterally adjacent to each other. Such a stator module may comprise a plurality of the above components, i.e. a plurality of stator conductors or multiphase systems, current controllers, output stage devices, and current measuring devices. Furthermore, the or each stator module may comprise an intermediate circuit and a module controller. The module controller may e.g. be implemented in the form of a field programmable gate array (FPGA). Furthermore, the module controller may comprise the current controllers of the respective stator module and, depending on the embodiment, possibly at least one further device.

The above-mentioned further device of the module controller of a stator module may be the influencing device described above and used for data transmission from the stator to the rotor, which may be used for influencing the current flow of stator conductors or of at least one multiphase system. For the influencing device, the following embodiments may also be used.

In a further embodiment, the influencing device is embodied to suppress the application of voltage pulses to stator conductors or to at least one multiphase system of the stator during current control. Here, individual or a plurality of voltage pulses may be temporarily switched off in a targeted manner. The switching off of voltage pulses is associated with a suppression of the ripple current flowing in the respective stator conductors or multiphase systems, wherein the generation of the alternating magnetic field and thus the occurrence of the induction voltage in the at least one rotor coil of the rotor may be suppressed or essentially suppressed. The omission of voltage pulses, which may also be referred to as blanking, may further reduce or suppress parasitic capacitive couplings between the stator and the rotor, which may interfere with a voltage measuring performed at the rotor as part of the data transmission for detecting changes in the induced voltage.

In a further embodiment, in which the stator conductors of the stator are interconnected as indicated above to form multiphase systems which may be energized independently of one another, and energized multiphase systems are subjected to voltage pulses center-aligned with respect to one another during current control, the influencing device is embodied to influence the current control of at least one multiphase system in such a way that the multiphase system is subjected to voltage pulses with matching pulse widths. This embodiment is based on the fact that a multiphase system, usually or in the uninfluenced state, is electrically driven during current control with voltage pulses center-aligned on one another with different pulse widths, as a result of which a ripple current also flows in the multiphase system. If the voltage pulses have the same pulse widths, the ripple current does not occur. By temporarily driving a multiphase system with center-aligned voltage pulses with matching pulse widths, a suppression of the ripple current flowing in the multiphase system may consequently be evoked, and thus also the occurrence of the induction voltage in the at least one rotor coil of the rotor may be suppressed or essentially suppressed.

In order to realize the aforementioned embodiments, the following embodiment may be considered for the influencing device provided for data transmission from the stator to the rotor. In this context, the influencing device is embodied to interrupt the control signals generated by at least one current controller of the stator used for current control, or the transmission of the control signals generated by at least one current controller, so that the control signals are not applied to at least one output stage device. Instead, the at least one output stage device may be operated or controlled such that suppression of the ripple current in at least one multiphase system may be caused, and thus the occurrence of the induction voltage in the at least one rotor coil of the rotor may be suppressed or essentially suppressed. This may e.g. be done by applying modified control signals to the at least one output stage device with the aid of the influencing device.

For this purpose, the influencing device may e.g. comprise a data controller and an interrupting device. The interrupting device may be used to interrupt the control signals generated by at least one current controller. The application of modified control signals to at least one output stage device may also be carried out with the aid of the interrupting device. The data controller may be used to drive or temporarily drive the interrupting device to temporarily perform the interrupting and thus the suppressing of the ripple current in at least one multiphase system. The data controller may be controlled by the primary controller of the planar drive system, which may transmit data signals to the data controller. Based on this, the data controller may control the interrupting device.

In a further embodiment, the influencing device is embodied to influence or change target current values used in current control. In this way, for example, influenced or changed target current values may be transmitted to at least one current controller. In this way, the current control of at least one multiphase system may be influenced, and a change may thereby be achieved with respect to the alternating magnetic field and the alternating voltage which may be induced in the at least one rotor coil of the rotor.

In a further embodiment, the influencing device is embodied to influence at least one current controller and thus to influence the control signals generated by the at least one current controller. Through this, influenced or modified control signals may be applied to at least one output stage device. In this way, as well, the current control of at least one multiphase system may be influenced, and a change may be caused with respect to the alternating magnetic field and the alternating voltage inducible in the at least one rotor coil of the rotor.

The stator may have an influencing device or, in an embodiment of the stator with several stator modules, one influencing device per stator module. With the aid of an influencing device, the current control of one or a plurality of multiphase systems may be temporarily influenced. It is also possible for the stator to have a separate influencing device for each multiphase system and thus each current controller. One or a plurality of influencing devices may each be integrated in a module controller of a stator module. Furthermore, one or a plurality of influencing devices may be controlled by the primary controller of the planar drive system. For this purpose, the primary controller may transmit corresponding control or data signals to one or a plurality of influencing devices. In this way, the current control of at least one multiphase system may be influenced.

During operation of the planar drive system, a plurality of multiphase systems may be simultaneously energized to drive the rotor. In an embodiment of the stator having multiple stator modules, multiple multiphase systems energized simultaneously may also be components of multiple adjacent stator modules. In the case of a simultaneous energization of a plurality of multiphase systems, the rotor and thus the at least one rotor coil of the rotor may be located in the area of influence of the plurality of multiphase systems and may be exposed to the influence of a resulting alternating magnetic field formed by a superposition of a plurality of alternating magnetic fields, each caused by the ripple currents flowing in the multiphase systems. The alternating voltage induced in the rotor coil may be dependent on the resulting alternating magnetic field.

With reference to the data transmission from the stator to the rotor, it is possible to influence the current flow of at least one multiphase system. If the current flow of a plurality of multiphase systems is influenced, this may be done with the aid of one or of a plurality of influencing devices of the stator. Furthermore, the influencing of the plurality of multiphase systems may be performed synchronously in time.

With regard to the data transmission from the stator to the rotor, according to a further embodiment the stator is embodied to perform the temporary influencing of the energization of stator conductors or of at least one multiphase system in modulated form. In this embodiment, data transmission from the stator to the rotor is performed using modulation. In this way, reliable data transmission is possible. The modulation used may e.g. phase modulation, amplitude modulation or frequency modulation.

Such a data transmission from the stator to the rotor using modulation may be realized with the aid of one or a plurality of influencing devices of the stator. The influencing device(s) may be controlled by the primary controller of the planar drive system in order to influence the current flow of stator conductors or the current control of at least one multiphase system in a correspondingly modulated manner.

With reference to the aforementioned embodiment, a modulation of a user signal to be transmitted to a carrier signal or a carrier frequency of a carrier signal may take place within the framework of the data transmission from the stator to the rotor by the temporary or modulated influencing of the current flow of stator conductors. The user signal may comprise the data signals or symbols intended for transmission. The carrier signal modulated in this way with the user signal may be included in the induction voltage measured at the rotor, so that the user signal may be inferred by evaluation.

The carrier frequency used in the data transmission from the stator to the rotor may be smaller than the PWM clock frequency of the current control. The PWM clock frequency may be a multiple of the carrier frequency. The carrier frequency may be in the kHz range, e.g. in the single-digit kHz range. The frequency range from 1 kHz to 2 kHz is possible, for example.

In order to allow for a high robustness of the data transmission from the stator to the rotor, the stator may further be embodied to perform the transmission of data signals or symbols respectively extended to a predetermined length by transmitting the respective symbols with a predetermined repetition. In this way, the information content of a symbol, e.g. a bit or dibit, is transmitted by sending the relevant symbol several times in succession. This procedure results in a reduction of the transmittable data rate, but leads to an increase of the interference immunity.

With regard to performing the data transmission in modulated form, further embodiments may also be considered. For example, modulation to a pseudo-random sequence or the use of a pseudo-random sequence as a carrier signal is possible, or also the use of several carrier frequencies, for example.

With reference to the rotor of the planar drive system, the following embodiments may further be used.

In a further embodiment, as has been indicated above, the rotor comprises a voltage measuring device for measuring the AC voltage induced in the at least one rotor coil. Based on the measured induction voltage, the change in relation to the induction voltage caused as a result of influencing the energization of stator conductors or of at least one multiphase system may be detected, and data signals or symbols generated by the stator may be determined as a result. The voltage measuring device may be connected to the at least one rotor coil of the rotor.

In a further embodiment, the rotor comprises a processing device for evaluating the measured induced AC voltage. The processing device may be powered by the DC voltage provided by the rectifier described above. The processing device may be connected to the voltage measuring device described above. The data signals or symbols generated by the stator may be determined by the evaluation. Provided that the data transmission from the stator to the rotor is performed using modulation as indicated above, the processing device may be embodied to perform the evaluation of the measured induction voltage by correlation using at least one reference signal.

For the length of a symbol, voltage measurements of the induction voltage may be multiplied by the at least one reference signal, and the products may be summed up. If a symbol is transmitted repeatedly in succession as indicated above, the length is the extended length of the symbol transmitted repeatedly. Performing data communication from the stator to the rotor using modulation has the consequence that all components of a voltage signal of the induction voltage on which the evaluation is based may be uncorrelated to the reference signal except for the user signal. With the aid of the correlation, a suppression of interference variables, which may be adjusted via the symbol length, and thus an improvement of the signal-to-noise ratio may be achieved. The at least one reference signal may have a frequency tuned to the carrier signal or its carrier frequency or a frequency corresponding to the carrier frequency.

With regard to the at least one rotor coil of the rotor, different embodiments are conceivable. For example, it is possible that the at least one rotor coil of the rotor is realized in the form of a wound or surrounding metallic wire. In a further possible embodiment, the rotor comprises at least one printed circuit board (PCB). The at least one printed circuit board may be multilayered. The at least one rotor coil of the rotor may in this context be implemented in the form of one or a of plurality of spiral-shaped metallic conductor tracks of the at least one PCB.

For example, the rotor may comprise a single printed circuit board having one or a plurality of spiral-shaped conductor tracks, each of which may form one or a plurality of rotor coils. Furthermore, the rotor may comprise a plurality of separate printed circuit boards each having one or a plurality of spiral-shaped conductor tracks, each of which may form one or a plurality of rotor coils. A plurality of spiral-shaped conductor tracks or rotor coils may be electrically or electrically connected in series.

The at least one rotor magnet of the rotor magnet device may be a permanent magnet.

Furthermore, the rotor magnet device may comprise a plurality of rotor magnets. The rotor magnets may be arranged such that the rotor magnets surround an area. Furthermore, the magnet device may have a rectangular or square contour.

In a further embodiment, the at least one rotor coil of the rotor is arranged in the area surrounded by the rotor magnets of the magnet device. In this embodiment, a multilayer printed circuit board having a plurality of layers arranged on top of one another and a plurality of spiral-shaped conductor tracks arranged on top of one another may be used. In this embodiment, the printed circuit board may be integrated into the rotor in a relatively simple manner. In this case, the rotor may have an exposed recess in its center, in which the printed circuit board may be arranged. The number of layers of the printed circuit board and the spiral-shaped conductor tracks may e.g. be six or eight. The printed circuit board used may have a thickness of 1 mm, for example.

In a further embodiment, the rotor comprises a plurality of rotor coils which are arranged in an area below the magnet device of the rotor. In this embodiment, as well, a multilayer printed circuit board having a plurality of layers and a plurality of spiral-shaped conductor tracks arranged on top of one another may be used. Furthermore, in the region of each layer, a plurality of spiral-shaped conductor tracks arranged side by side may be provided. The printed circuit board may be arranged on the underside of the rotor, and may extend over all or substantially all of the surface area of the rotor. In this embodiment, since the flight height of the rotor may be reduced by the thickness of the printed circuit board, the use of a relatively flat printed circuit board may be considered. For example, the printed circuit board used may have two layers, and a thickness of e.g. 0.3 mm.

In a further embodiment, the rotor comprises a plurality of rotor coils arranged in the region of lateral outer sides of the rotor. In this embodiment, a plurality of multilayer printed circuit boards having a plurality of layers and a plurality of spiral-shaped conductor tracks arranged on top of one another may be used. The circuit boards used may e.g. have six or eight layers, and a thickness of e.g. 1 mm. Furthermore, the printed circuit boards may be integrated in spacers of the rotor, which may be present in the area of the lateral outer sides of the rotor.

Also, other of the above-mentioned components of the rotor, such as the rectifier, the voltage measuring device, and the processing device, may be arranged on or on at least one printed circuit board of the rotor.

In a further embodiment, the rotor comprises a rotor coil in a region laterally surrounding the magnet device. The rotor coil may be realized in the form of a wound wire. It is also possible to use a printed circuit board with spiral-shaped conductor tracks surrounding the magnet device, by which the rotor coil may be formed.

In a further embodiment, the planar drive system is embodied to transmit data from the rotor to the stator. For this purpose, the rotor is embodied to temporarily load the at least one rotor coil to thereby temporarily cause an increased current consumption of energized stator conductors of the stator.

In the above-mentioned embodiment, the process of load modulation is used. The electrical loading of the rotor coil results in energy being extracted or extracted in amplified form from the alternating magnetic field generated with the aid of the stator. The energy extraction due to the loading of the rotor coil consequently leads to an increased current consumption of energized stator conductors of the stator. By temporarily loading the rotor coil, an increased current consumption of energized stator conductors of the stator may be evoked in a corresponding manner, and based on this, an information transfer from the rotor to the stator may be realized.

For the temporary loading of the at least one rotor coil, the rotor may be embodied to short-circuit the rotor coil.

In a further embodiment, the rotor is configured to short-circuit a coil portion of the at least one rotor coil for intermittent electrical loading of the at least one rotor coil. In this way, it may be ensured that during the loading of the rotor coil the induction voltage does not or only partially drop, as a result of which the inductive energy transfer from the stator to the rotor may be maintained.

According to a further embodiment, the rotor has a switching device for short-circuiting. The switching device may be connected to the at least one rotor coil. Furthermore, the switching device may be in the form of a transistor. By appropriately controlling the switching device, the short circuit may be caused and cancelled again, and the increased current consumption of the stator may thus be evoked and terminated again.

In a further embodiment, the rotor comprises a load resistor via which the coil portion of the at least one rotor coil is short-circuited. The load resistor may be connected to the at least one rotor coil. The load resistor may be used to set the magnitude of the energy extraction from the alternating magnetic field when the rotor coil is loaded.

In a further embodiment, the coil portion used for short-circuiting is a lowermost coil portion of the at least one rotor coil. This coil portion, which may comprise a spiral conductive path of the at least one rotor coil, may face the stator during operation of the planar drive system. Also, the respective coil portion may have the smallest distance to the stator conductors of the stator compared to another coil portion of the at least one rotor coil. In this way, a highly inductive coupling may be achieved between the coil part of the rotor used for short-circuiting and energized stator conductors of the stator. The effect caused by the short-circuiting to cause an increased current consumption in the stator may thus be as large as possible.

In a further embodiment, the coil part used for short-circuiting has a larger conductor cross-section than at least one other coil part of the at least one rotor coil. In this way, the coil part used for short-circuiting may have a high coil quality or a higher coil quality than another coil part. This also favors the presence of a high inductive coupling between the coil part used for short-circuiting and energized stator conductors of the stator.

In a further embodiment, the rotor comprises a controller for controlling the temporary loading of the at least one rotor coil. The controller may be connected to the above-described switching device of the rotor, and may be arranged to control the switching device. Also, the controller may be powered by the DC voltage provided by the rectifier described above. Furthermore, the controller may be the processing device described above and used in the data transmission from the stator to the rotor for evaluating the measured induction voltage.

In an embodiment of the rotor with a plurality of rotor coils, the above-described short-circuiting of a coil part may refer to only one rotor coil, or also to a plurality of or to all rotor coils of the rotor. With reference to the latter variant, the coil part used for short-circuiting may e.g. be formed from interconnected subsections or conductor tracks of a plurality of rotor coils. The relevant subsections may be serially interconnected, and may be lowermost subsections of the rotor coils, i.e. subsections facing the stator during operation of the planar drive system.

In order to transmit data signals or symbols from the rotor to the stator, the loading of the rotor coil may be intermittent or pulsed to thereby cause an intermittent or pulsed increased current draw at the stator. For detecting the increased current consumption and thus sending the data signals, the stator may have a summation current measuring device for measuring a summation current of energized stator conductors, as will be described in more detail below. By evaluating the measured summation current, the data signals generated by the rotor may be inferred or determined.

In a further embodiment, the rotor is embodied to perform the temporary loading of the at least one rotor coil in modulated form. The modulation used may e.g. be phase modulation, amplitude modulation or frequency modulation. Such data transmission using modulation may be realized with the aid of the controller and the switching device of the rotor. By loading the rotor coil, a modulation of a user signal to be transmitted to a carrier signal or a carrier frequency of a carrier signal may take place in this context. The user signal may comprise the data signals or symbols intended for transmission. The carrier signal modulated with the user signal in this way may be included in the summation current measured at the stator, so that the user signal may be inferred by evaluating it. The carrier frequency may be smaller than the PWM clock frequency of the current control. The carrier frequency may be in the kHz range, e.g. in the single-digit kHz range. For example, the frequency range from 1 kHz to 2 kHz is possible. The rotor may further be embodied to perform the transmission of data signals or symbols each extended to a predetermined length by transmitting the respective symbols with a predetermined repetition. Further embodiments are conceivable for carrying out the data transmission in modulated form. For example, modulation to a pseudo-random sequence or the use of a pseudo-random sequence as carrier signal is possible, or also, for example, the use of several carrier frequencies.

In a further embodiment, as indicated above, the stator has a summation current measuring device for measuring a summation current of energized stator conductors or multiphase systems. Based on the measured summation current, the increased current consumption of the stator caused as a result of the loading of the at least one rotor coil of the rotor may be detected, and consequently data signals generated by the rotor may be determined. The summation current measuring device may be arranged between an intermediate circuit and a plurality of output stage devices of the stator used for energizing stator conductors or multiphase systems, and may be connected to the intermediate circuit and the output stage devices. In this way, the summation current measuring device may detect the current consumption of the respective multiphase systems. In an embodiment of the stator with multiple stator modules, each stator module may have a summation current measuring device. This may be arranged between the DC link and the output stage devices of the respective stator module. The summation current measured with the aid of a summation current measuring device may relate to the associated intermediate circuit.

In a further embodiment, the stator comprises a bandpass filter for filtering the measured summation current. The bandpass filter may be connected to and downstream of the summation current measuring device described above. This embodiment may be used if the data transmission from the rotor to the stator is performed using modulation as indicated above. In this context, the bandpass filter may have a passband in the range of the carrier frequency used. In an embodiment of the stator having a plurality of stator modules, each stator module may have a bandpass filter. This may be arranged downstream of the summation current measuring device of the respective stator module.

In a further embodiment, the stator has an evaluation device for evaluating the summation current. The evaluation device may be connected to and downstream of the bandpass filter described above, and thereby be provided for evaluating the measured and filtered summation current. The evaluating may determine the data signals or symbols generated by the rotor. Furthermore, the evaluation may comprise a generation of evaluation signals or evaluation data by the evaluation device, which reflect the data signals or symbols transmitted by the rotor. If the data transmission from the rotor to the stator is carried out using modulation as indicated above, the evaluation device may be embodied to carry out the evaluation of the measured and filtered summation current with the aid of a correlation using at least one reference signal.

The primary controller of the planar drive system may also be included within the framework of the evaluation. In this respect, the evaluation signals generated by the evaluation device may be transmitted to the primary controller, and in the case of an embodiment of the stator with a plurality of stator modules, the evaluation signals generated by one or a plurality of evaluation devices of the respective stator modules. The primary controller may be embodied for further processing of the evaluation signals coming from the stator in order to determine the data signals or symbols generated by the rotor on this basis.

With reference to the data transmission from the rotor to the stator, the use of a reference clock may be considered. The alternating magnetic field generated by the stator or its frequency may be used as a reference clock.

In this sense, according to a further embodiment, the rotor is embodied to perform the temporary loading of the at least one rotor coil in time with the alternating magnetic field generated with the aid of the stator. For this purpose, the voltage measuring device of the rotor mentioned above and used for measuring the AC voltage induced in the rotor coil may be used. Based on the measured alternating voltage, its frequency and thus the frequency of the alternating magnetic field may be determined, and the loading of the rotor coil may be carried out in accordance with this.

As indicated above, the rotor may have a controller for controlling the temporary loading of the at least one rotor coil. The controller may here be connected to the voltage measuring device described above, and may be embodied to evaluate the measured AC voltage. Based on the measured AC voltage, the controller may determine the frequency of the AC voltage and thus the frequency of the alternating magnetic field. In accordance with this, the controller may apply the load to the at least one rotor coil, which may take place in modulated form as indicated above.

In a corresponding manner, the stator or the or each evaluation device of the stator is embodied according to a further embodiment to carry out the evaluation of the summation current in time with the alternating magnetic field generated with the aid of the stator. In this way, a reference signal used in the evaluation may be synchronized as well as possible with the carrier signal.

A method for operating a planar drive system is proposed. The planar drive system may be as described above or according to one or a plurality of the embodiments described above. The planar drive system comprises a stator and a rotor. The stator comprises a plurality of energizable stator conductors. The rotor comprises a magnet device having at least one rotor magnet. By energizing stator conductors of the stator, a magnetic interaction between energized stator conductors and the magnet device of the rotor is generated in order to drive the rotor. The energization of stator conductors is performed in such a way that an alternating magnetic field is generated via energized stator conductors. The rotor comprises at least one rotor coil in which an alternating voltage is induced due to the alternating magnetic field. In the method, a data transmission from the stator to the rotor is further performed. For this purpose, the energization of stator conductors of the stator is temporarily influenced, which temporarily causes a change with respect to the alternating voltage induced in the at least one rotor coil of the rotor.

The proposed method may be used to achieve reliable data transmission from the stator to the rotor. The data transmission is effected by intermittently influencing the current flowing through stator conductors of the stator, thereby temporarily causing a change in the alternating magnetic field generated by the stator, and thereby temporarily causing a change in the alternating voltage induced in the at least one rotor coil of the rotor. By intermittently or pulse-like influencing of the current flowing through stator conductors, data signals or symbols may consequently be transmitted from the stator to the rotor.

The same features, details, and embodiments may be applied to the method, and the same advantages may be considered, as discussed above with respect to the planar drive system.

For example, by influencing the current flow of stator conductors, it is possible to achieve that a weaker or stronger alternating magnetic field is generated compared to an uninfluenced current flow, and thus a smaller or larger alternating electric voltage is induced in the at least one rotor coil. It is also possible that by influencing the energization, the generation of the alternating magnetic field and thus the induction of the alternating voltage, is suppressed or essentially suppressed.

The induction voltage may be used not only in the context of data transmission, but also for inductive energy transmission from the stator to the rotor. In this sense, rectification and thereby conversion of the induced AC voltage into a DC voltage may further be performed. This may be done with the aid of a rectifier of the rotor.

Temporary influencing of the energization of stator conductors may be carried out with the aid of at least one influencing device of the stator. The at least one influencing device may be controlled by a primary controller of the planar drive system.

In a further embodiment, the energization of stator conductors is performed by a current control based on pulse-width modulation. The temporary influencing of the energization of stator conductors, which may be carried out as indicated above with the aid of at least one influencing device of the stator, is carried out by influencing the current control.

In the above embodiment, stator conductors to be energized may be electrically driven with an electrical voltage clocked with the aid of pulse-width modulation, and consequently with periodic voltage pulses. In this way, a ripple current in energized stator conductors, and thereby the alternating magnetic field, may be generated. This leads, as indicated above, to the induction of an alternating electric voltage in the at least one rotor coil of the rotor.

In a further embodiment, in which use is made of the fact that, as a result of the current control based on pulse-width modulation, a ripple current is generated in energized stator conductors of the stator and, as a result, the alternating magnetic field is generated, the influencing of the current control is carried out in such a way as to cause a change with respect to the ripple current in energized stator conductors. It is e.g. possible to temporarily suppress the ripple current, wherein the generation of the alternating magnetic field and thus the occurrence of the induction voltage in the at least one rotor coil of the rotor may be temporarily suppressed or essentially suppressed.

The stator conductors of the stator may be interconnected to form multiphase systems which may be energized independently of each other. With regard to current control, the multiphase systems may be supplied with voltage pulses centered-aligned with regard to one another. A separate current control may be performed for each energized multiphase system. The current control may be performed with the aid of stator components such as current controllers, output stage devices connected to the stator conductors or multiphase systems, and current measuring devices.

In a further embodiment, the current control is influenced by suppressing the application of voltage pulses to stator conductors or to at least one multiphase system of the stator during the current control. In this context, individual or a plurality of voltage pulses may be temporarily omitted. This procedure leads to a suppression of the ripple current flowing in the respective stator conductors or multiphase systems, wherein the generation of the alternating magnetic field and thus the induction of the alternating voltage in the at least one rotor coil of the rotor may be suppressed or essentially suppressed.

In a further embodiment, in which the stator conductors of the stator are interconnected as indicated above to form multiphase systems which may be energized independently of one another, and energized multiphase systems are subjected to voltage pulses center-aligned with regard to one another during current control, the current control of at least one multiphase system is influenced in such a way that the multiphase system is subjected to voltage pulses with matching pulse widths. In this way, a suppression of the ripple current flowing in the multiphase system may also be caused, and thereby the occurrence of the induction voltage in the at least one rotor coil of the rotor may be suppressed or essentially suppressed.

The stator may comprise a plurality of stator modules as indicated above. Each stator module may include a plurality of stator conductors or multi-phase systems, current controllers, output stage devices, and current measuring devices. Furthermore, each stator module may have one or a plurality of influencing devices used to influence the current flowing to stator conductors or at least one multiphase system.

In a further embodiment, the temporary influencing of the energization of stator conductors or of at least one multiphase system is carried out in modulated form, i.e. using a modulation. The modulation used may e.g. be phase modulation, amplitude modulation or frequency modulation.

In a further embodiment, a measurement of the induced AC voltage is performed to detect the change with respect to the induced AC voltage. Based on the measured induced voltage, the change in relation to the induced voltage caused as a result of influencing the current flowing through stator conductors or at least one multiphase system may be determined, and conclusions may be drawn about the data signals or symbols generated by the stator. The measurement of the induced AC voltage may be performed with the aid of a voltage measuring device of the rotor.

In a further embodiment, an evaluation of the measured induced AC voltage is performed. The evaluating may determine the data signals or symbols generated by the stator. The evaluating may comprise correlating the measured induced voltage with at least one reference signal. Evaluating may be performed using a processing device of the rotor.

In a further embodiment, a data transmission is performed from the rotor to the stator. For this purpose, the at least one rotor coil of the rotor is temporarily loaded, thereby temporarily causing an increased current consumption of energized stator conductors of the stator. By intermittently or pulse-like loading of the rotor coil, data signals or symbols may consequently be transmitted from the rotor to the stator.

The temporary loading of the at least one rotor coil may be achieved by short-circuiting the rotor coil.

In a further embodiment, a coil portion of the at least one rotor coil is short-circuited for temporarily loading the at least one rotor coil.

The short-circuiting of the coil portion may be performed via a load resistor. The short-circuiting may be performed with the aid of a switching device of the rotor. The temporary loading of the at least one rotor coil may be controlled with the aid of a controller of the rotor. The aforementioned switching device may be controlled by the controller for this purpose.

In a further embodiment, the temporary loading of the at least one rotor coil is performed in modulated form, i.e. using a modulation. The modulation used may e.g. be phase modulation, amplitude modulation or frequency modulation.

In a further embodiment, the temporary loading of the at least one rotor coil is carried out in time with the alternating magnetic field generated with the aid of the stator. For this purpose, the induced AC voltage may be measured and its frequency determined. Measuring the induced voltage may be performed using a voltage measuring device of the rotor. Determining the frequency of the AC voltage may be performed with the aid of the aforementioned controller of the rotor.

In a further embodiment, a measurement of a summation current of energized stator conductors or multi-phase systems of the stator is performed to detect the increased current consumption. Based on the measured summation current, the increased current consumption of the stator caused as a result of the loading of the at least one rotor coil of the rotor may be determined, and data signals or symbols generated by the rotor may be inferred. The measurement of the summation current may be performed with the aid of a summation current measuring device of the stator.

In a further embodiment, the measured summation current is performed. Filtering of the measured summation current may be performed using a bandpass filter of the stator.

In a further embodiment, the measured summation current is filtered. Here, evaluation signals or evaluation data may be provided, which may reflect data signals or symbols transmitted by the rotor. The evaluation of the summation current may be performed after filtering. Furthermore, the evaluation of the summation current may be performed in time with the alternating magnetic field generated with the aid of the stator. The evaluation may comprise correlating the summation current with at least one reference signal. The evaluation may be performed with the aid of an evaluation device of the stator.

The embodiments described above may be used individually or in any combination with one another.

FIG. 1 shows a perspective view of an embodiment of a planar drive system 1, which comprises a stator 5 having at least one stator module 10 and a rotor 200. The rotor 200 is movably arranged above the stator 5 and the stator module 10 during operation of the planar drive system 1. The stator module 10 comprises a module housing 18 and a stator unit 100, which is arranged on an upper side of the module housing 18. The stator unit 100 is configured as a planar stator and comprises a flat or planar stator surface 11. The stator surface 11 extends over the entire top surface of the stator unit 100 and of the stator module 10. The stator unit 100 comprises a plurality of metallic stator conductors 125 that may be supplied with electrical drive currents. The stator conductors 125 may also be referred to as coil conductors or conductor strips.

Figure 3:
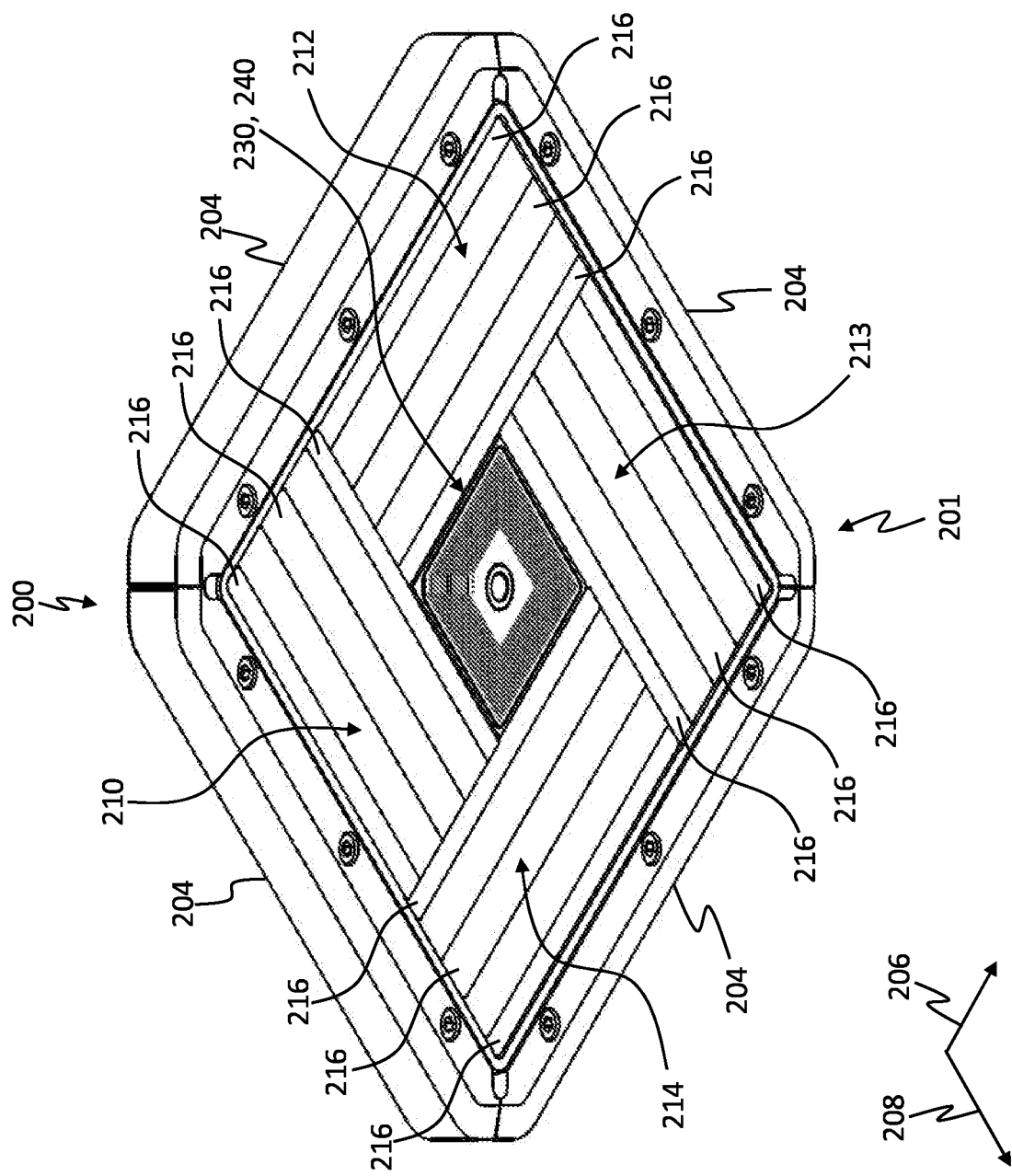
FIG. 3 is a perspective view of the rotor, which has a magnet device and a printed circuit board surrounded by the magnet device.

By energizing stator conductors 125 of the stator module 10, a magnetic field may be generated which may drive the rotor 200 in interaction with a magnet device 201 of the rotor 200 (cf. FIG. 3). The rotor 200 may be held suspended above the stator surface 11 and may also be moved. A movement of the rotor 200 may take place in a first direction 12 as well as in a second direction 14. As shown in FIG. 1, the first and second directions 12, 14 are oriented perpendicularly with regard to each other, and respectively parallel to the stator surface 11. By moving the rotor 200 in both the first direction 12 and the second direction 14, the rotor 200 may be moved in any direction across the stator surface 11. Moving the rotor 200 is further possible in a third direction 15 oriented perpendicularly with regard to the first direction 12, to the second direction 14 and to the stator surface 11. In this way, the distance of the rotor 200 to the stator surface 11 may be varied, i.e. the rotor 200 may be raised or lowered above the stator surface 11.

Further electrical and electronic components and devices of the stator module 10 are arranged in the module housing 18. These components serve, among other things, to generate electrical drive currents and thereby to energize stator conductors 125 of the stator module 10. As will be described in more detail below, the energization is carried out by a current control based on pulse-width modulation. Components of the stator module 10 used for data transmission with the rotor 200, which will also be discussed in more detail below, may also be contained in the module housing 18.

On an underside 32 of the module housing 18 opposite the stator surface 11 are connections which are used to connect the stator module 10 to a plurality of connecting lines 16. The connecting lines 16 may comprise a power supply line for supplying electrical power to the stator module 10, an input data line, and an output data line. The power supply line may be used to supply electrical power to the stator module 10 to generate drive currents, among other things. Data may be sent to and from the stator module 10 via the input data line and the output data line. In this way, data communication between the stator module 10 and a primary controller 500 (cf. FIG. 11) of the planar drive system 1 may be realized. This e.g. comprises the transmission of control signals or control data such as electrical target current values or other data signals from the primary controller 500 to the stator module 10.

It is clear from FIG. 1 that the module housing 18, the stator unit 100 and the stator surface 11 are rectangular or square in a top view of the stator surface 11. The stator surface 11 is delimited by four respective straight outer edges 21. Two respective opposing outer edges 21 are oriented in parallel to the first direction 12, and two respective opposing further outer edges 21 are oriented in parallel to the second direction 14. The stator module 10 and the module housing 18 further comprise, between the stator surface 11 and the opposite underside 32, four planar side surfaces 33 which are flush with the outer edges 21 at the stator surface 11.

The stator 5 of the planar drive system 1 may be realized not only with one stator module 10, but with a plurality of identical examples of the stator module 10 shown in FIG. 1. The plurality of stator modules 10 may be arranged adjacent to one another such that the outer edges 21 and side surfaces 33 of adjacent stator modules 10 abut on one another. In this way, the stator surfaces 11 of the stator modules 10 may form a continuous working surface over which the rotor 200 may be moved without interruption. This is achieved by applying an appropriate current to stator conductors 125 of the stator modules 10 and thereby generating a magnetic field that drives the rotor 200.

Figure 2:
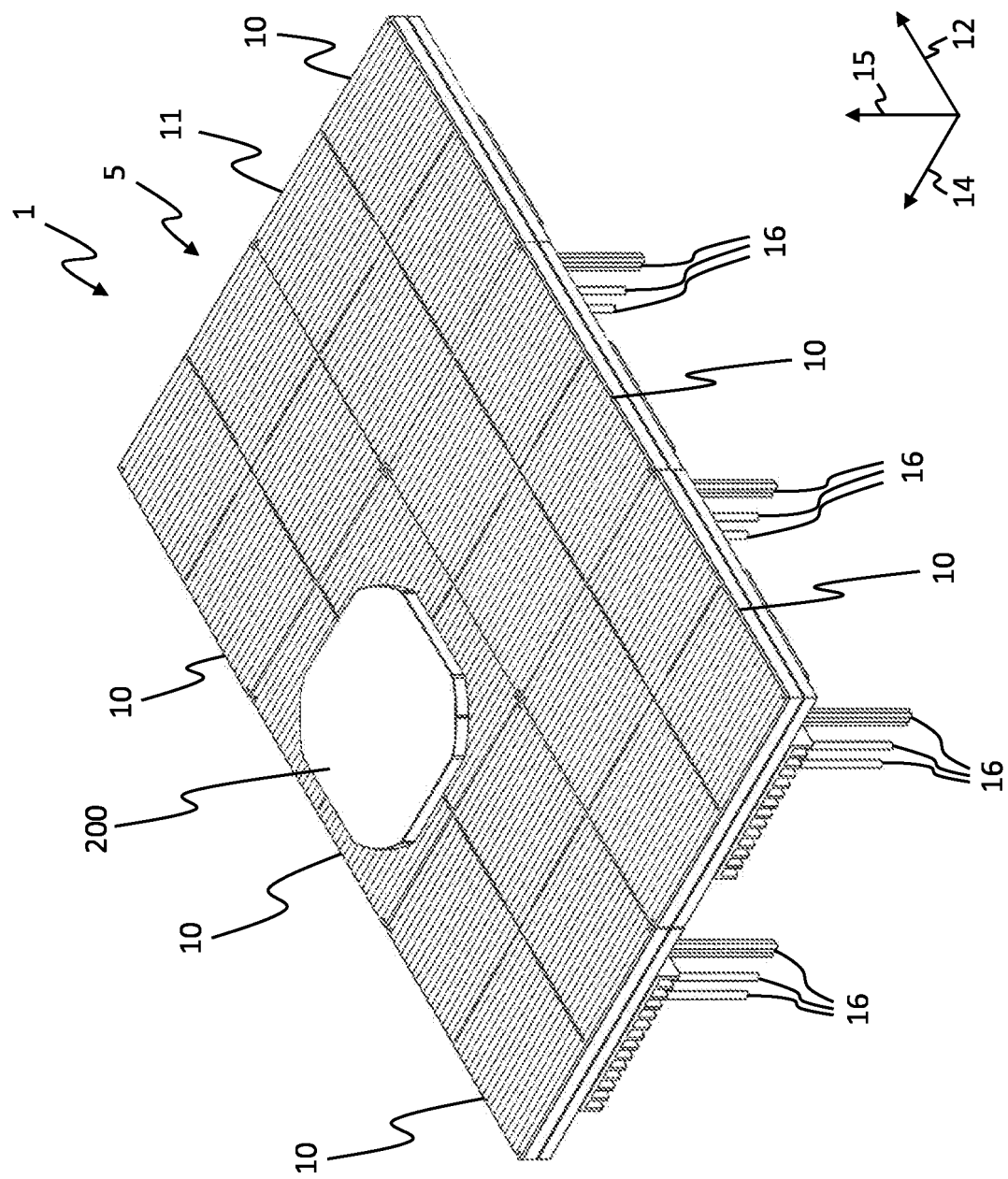
FIG. 2 is a perspective view of the stator having a plurality of stator modules arranged side by side.

By way of illustration, FIG. 2 shows a perspective view of an embodiment of the stator 5 having six stator modules 10 arranged side by side. The stator modules 10 are arranged side by side in two first rows adjacent to each other in the second direction 14 and extending along the first direction 12, and in three second rows or columns adjacent to each other in the first direction 12 and extending along the second direction 14. The stator surfaces 11 of the stator modules 10 form a continuous and planar working surface for the rotor 200, and the rotor 200 may be moved seamlessly from the stator surface 11 of one stator module 10 to or across the stator surface 11 of an adjacent stator module 10, respectively.

Apart from the embodiment shown in FIG. 2, other embodiments with other arrangements and/or other numbers of stator modules 10 arranged next to one another may also be considered for the stator 5 of the planar drive system 1. The stator modules 10 may in principle be joined in the first and/or second direction 12, 14 to form a stator 5 of any size.

The above-mentioned power supply and data communication with the primary controller 500 may be implemented in each of the stator modules 10 of the stator 5 via respective dedicated connecting lines 16 of the stator modules 10. Alternative embodiments of the stator modules 10 may further comprise electrical connecting elements via which electrical power and/or data may be transmitted from one stator module 10 to an adjacent stator module 10. Such connecting elements may e.g. be arranged on the side surfaces 33 of the stator modules 10.

FIG. 3 shows an embodiment of the rotor 200 of the planar drive system 1 in a perspective view from below onto an underside of the rotor 200. In operation of the planar drive system 1, the underside of the rotor 200 is arranged facing the stator surface 11 of the stator module 10 or of a plurality of stator modules 10 of the stator 5. Also, the rotor 200 or its underside is oriented in parallel or substantially in parallel to the stator surface 11. The rotor 200 comprises a magnet device 201 on its underside. The magnet device 201 has a rectangular or square outer contour, and comprises a first magnet unit 210, a second magnet unit 212, a third magnet unit 213, and a fourth magnet unit 214. The first magnet unit 210 and the third magnet unit 213 each include elongated rotor magnets 216 arranged side by side in a first rotor direction 206 and extending along a second rotor direction 208 oriented perpendicularly with regard to the first rotor direction 206. The second magnet unit 212 and the fourth magnet unit 214 each include elongated rotor magnets 216 arranged side-by-side in the second rotor direction 208 and extending along the first rotor direction 206. The rotor magnets 216 are permanent magnets. In operation of the planar drive system 1, the first and third magnet units 210, 213 serve to drive the rotor 200 in the first rotor direction 206. In operation, the second and fourth magnet units 212, 214 serve to drive the rotor 200 in the second rotor direction 208.

The magnet units 210, 212, 213, 214 of the magnet device 201 and their rotor magnets 216 are arranged to surround an area. In the area surrounded by the rotor magnets 216, the rotor 200 according to the embodiment shown in FIG. 3 comprises a first printed circuit board 230 with a rotor coil 240. The rotor coil 240, together with the stator conductors 125 of the stator 5, is used for inductive power transfer from the stator 5 to the rotor 200, and for data transmission between the stator 5 and the rotor 200. As will be discussed in more detail below, this takes advantage of the fact that pulse-width modulated electrical accessing of stator conductors 125 generates a ripple current and thereby an alternating magnetic field, such that an alternating electrical voltage may be induced in the rotor coil 240. The induced AC voltage may be substantially proportional to the change over time of the magnetic flux passing through the rotor coil 240. The induced AC voltage may be used to supply power, and may be rectified for this purpose using a rectifier 260 of the rotor 200 (see FIG. 13). As will also be described in more detail below, embodiments with a plurality of rotor coils 240 are also conceivable for the rotor 200 (cf. FIG. 27).

As shown in FIG. 3, the rotor 200 further comprises four spacers 204 surrounding the magnet device 201 and forming lateral outer sides of the rotor 200. When a plurality of identical rotors 200 are used in the planar drive system 1 (cf. FIG. 30), the spacers 204 may ensure that a minimum distance is maintained between the magnet devices 201 of the rotors 200 when the spacers 204 of two rotors 200 arranged next to each other are in contact. In this way, it may be prevented that the undersides of the rotors 200 are straightened from the position parallel to the stator surface 11 by an attractive force between their magnet devices 201 and that the two rotors 200 remain magnetically stuck to each other with their undersides facing each other. The spacers 204 may comprise or be formed from an elastically deformable material.

Figure 4:
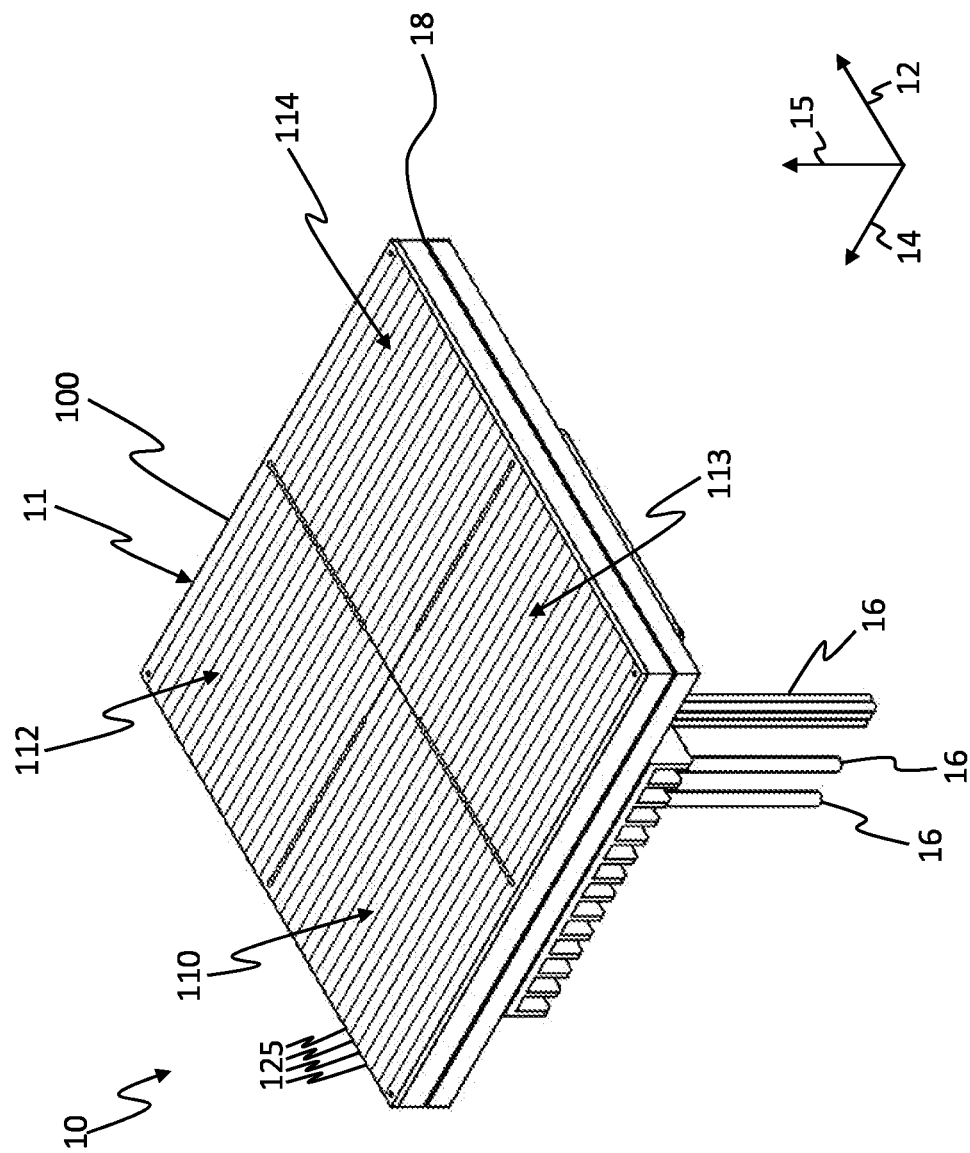
FIG. 4 is a perspective view of the stator module without rotor.

FIG. 4 shows a perspective view of the stator module 10 without the rotor 200. In an embodiment of the stator 5 having a plurality of stator modules 10, as exemplarily shown in FIG. 2, all stator modules 10 may be of identical or substantially identical embodiment. Therefore, details described above as well as below may be applied with respect to all stator modules 10 of the stator 5.

The stator unit 100 of the embodiment of the stator module 10 illustrated in FIG. 4 comprises a first stator sector 110, a second stator sector 112, a third stator sector 113, and a fourth stator sector 114. The stator sectors 110, 112, 113, 114 each in turn comprise a portion of respective stator conductors 125 each electrically insulated from one another. Each of the stator conductors 125 is arranged entirely within one of the stator sectors 110, 112, 113, 114. The stator sectors 110, 112, 113, 114 are rectangular in shape. The stator sectors 110, 112, 113, 114 may be square in shape such that an extension of the stator sectors 110, 112, 113, 114 in the first direction 12 corresponds to an extension of the stator sectors 110, 112, 113, 114 in the second direction 14. The stator sectors 110, 112, 113, 114 each comprise a quarter of the area, i.e. a quadrant, of the stator unit 100.

Within the stator sectors 110, 112, 113, 114, the stator conductors 125 may be arranged in a plurality of stator layers or stator planes arranged on top of one another, each of the stator layers having only stator conductors 125 extending along either the first direction 12 or the second direction 14. With respect to the orientation and arrangement of the stator conductors 125 and with respect to the stator layers, the stator sectors 110, 112, 113, 114 may have identical or substantially identical structures.

Figure 5:
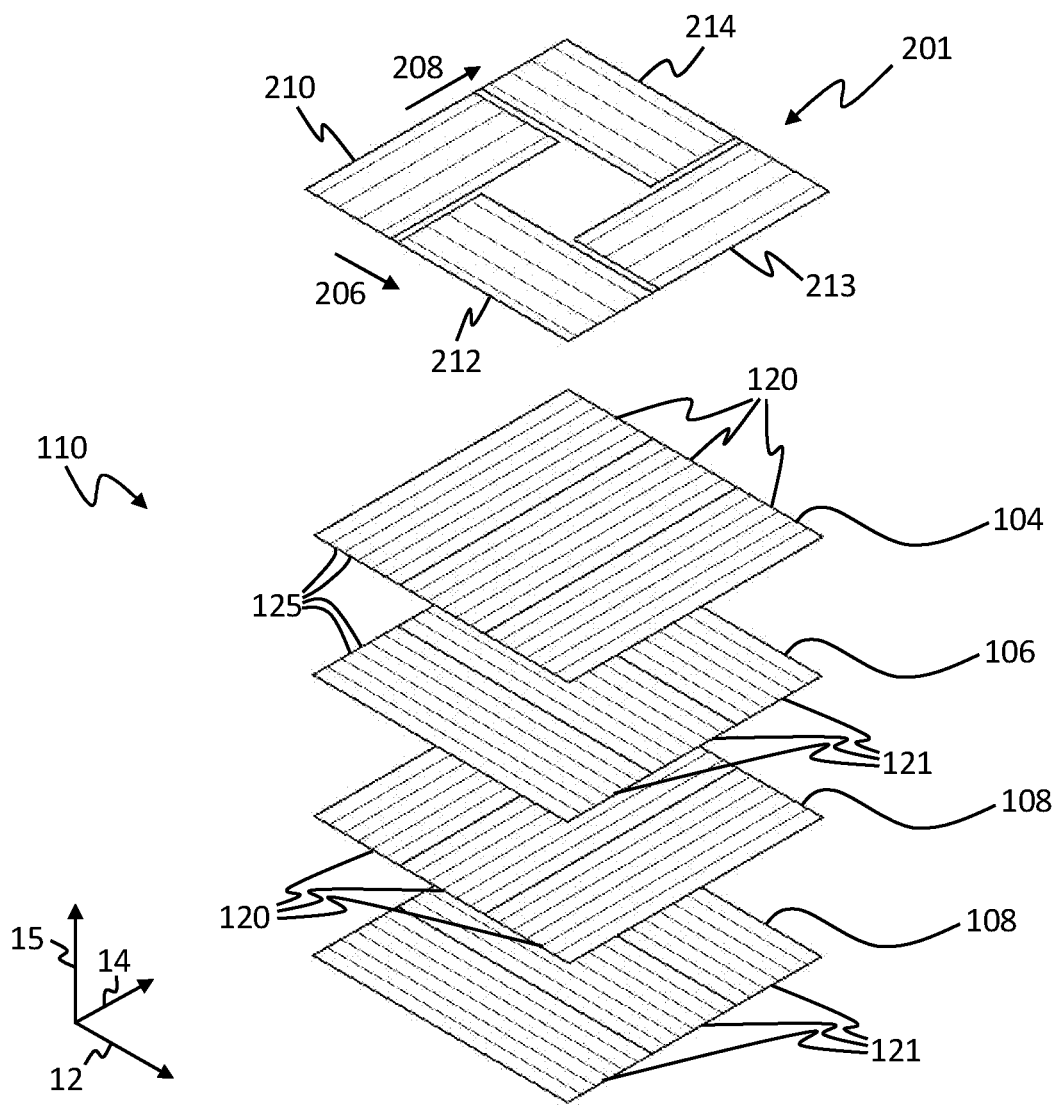
FIG. 5 is an exploded view of the magnet device of the rotor and stator layers of the stator module.

For further illustration, FIG. 5 shows an exploded view of the magnet device 201 of the rotor 200 and of the first stator sector 110 with four stator layers arranged on top of one another. Unless differences are described, the second, third and fourth stator sectors 112, 113, 114 are identical in construction to the first stator sector 110. According to the embodiment shown in FIG. 5, the first stator sector 110 comprises a first stator layer 104, a second stator layer 106 arranged below the first stator layer 104, and two further stator layers 108 arranged below the second stator layer 106. The first stator layer 104 comprises only stator conductors 125, which are arranged side by side along the first direction 12 and extend in an elongated manner along the second direction 14. The second stator layer 106 comprises only stator conductors 125, which are arranged side by side along the second direction 14 and extend in an elongated manner along the first direction 12. Correspondingly, a first of the further stator layers 108 disposed below the second stator layer 106 comprises only stator conductors 125 that extend in an elongated manner along the second direction 14, and a second of the further stator layers 108 disposed below the first of the further stator layers 108 comprises only stator conductors 125 that extend in an elongated manner along the first direction 12.

The first stator sector 110 may furthermore comprise further stator layers 108 below the stator layers 104, 106, 108 shown in FIG. 5. Overall, the first stator sector 110 thus comprises alternating first or further stator layers 104, 108 with stator conductors 125, which only extend along the second direction 14, and second or further stator layers 106, 108 with stator conductors 125, which only extend along the first direction 12.

For the stator module 10, apart from the embodiment described with reference to FIG. 5, a further embodiment with a different arrangement of stator layers 104, 106, 108 with stator conductors 125 extending in an elongated manner along the first direction 12 and along the second direction 14 may be considered. A possible example is an embodiment in which, as in FIG. 5, the first stator layer 104 having stator conductors 125 only extending along the second direction 14 and, below that, the second stator layer 106 having stator conductors 125 only extending along the first direction 12 are initially provided. In a departure from FIG. 5, the first of the further stator layers 108 disposed below the second stator layer 106 may comprise stator conductors 125 extending only along the first direction 12, and the second of the further stator layers 108 disposed below the first of the further stator layers 108 may comprise stator conductors 125 extending only along the second direction 14. Further stator layers 108 may be provided therebelow having an orientation of the stator conductors 125 corresponding to and repeating the orientation of the four stator layers 104, 106, 108 described previously.

As shown in FIG. 5, the stator conductors 125 of the first stator sector 110 are combined to form stator segments 120, 121 within each of the stator layers 104, 106, 108. In each stator layer 104, 106, 108, the first stator sector 110 comprises three stator segments 120, 121 arranged side by side and adjacent to each other. Each of the stator segments 120, 121 comprises six stator conductors 125 arranged side by side. The first stator sector 110 comprises three first stator segments 120 in the first stator layer 104 and three second stator segments 121 in the second stator layer 106. The first stator segments 120 each comprise six stator conductors 125 arranged side by side and extending along the second direction 14. The second stator segments 121 each comprise six adjacent stator conductors 125 extending along the first direction 12. In each of the other stator layers 108, the first stator sector 110 comprises, alternately, or in a different order, three first stator segments 120 or three second stator segments 121. The first and second stator segments 120, 121 have identical dimensions except for their orientation.

In operation of the planar drive system 1, the rotor 200 may be oriented over the stator unit 100 such that the first rotor direction 206 is oriented along the first direction 12 and the second rotor direction 208 is oriented along the second direction 14. Such an orientation is illustrated in FIG. 5. Here, the first and third magnet units 210, 213 of the magnet device 201 of the rotor 200 may interact with the magnetic field generated by the stator conductors 125 of the first stator segments 120 to cause the rotor 200 to move along the first direction 12. The second and fourth magnet units 212, 214 of the magnet device 201 of the rotor 200 may interact with the magnetic field generated by the stator conductors 125 of the second stator segments 121 to cause the rotor 200 to move along the second direction 14.

Alternatively, other than as shown in FIG. 5, the rotor 200 may be oriented such that the first rotor direction 206 is oriented along the second direction 14 and the second rotor direction 208 is oriented along the first direction 12. Here, the first and third magnet units 210, 213 may interact with the magnetic field of the second stator segments 121 for driving the rotor 200 in the second direction 14, and the second and fourth magnet units 212, 214 may interact with the magnetic field of the first stator segments 120 for driving the rotor 200 in the first direction 12.

Figure 6:
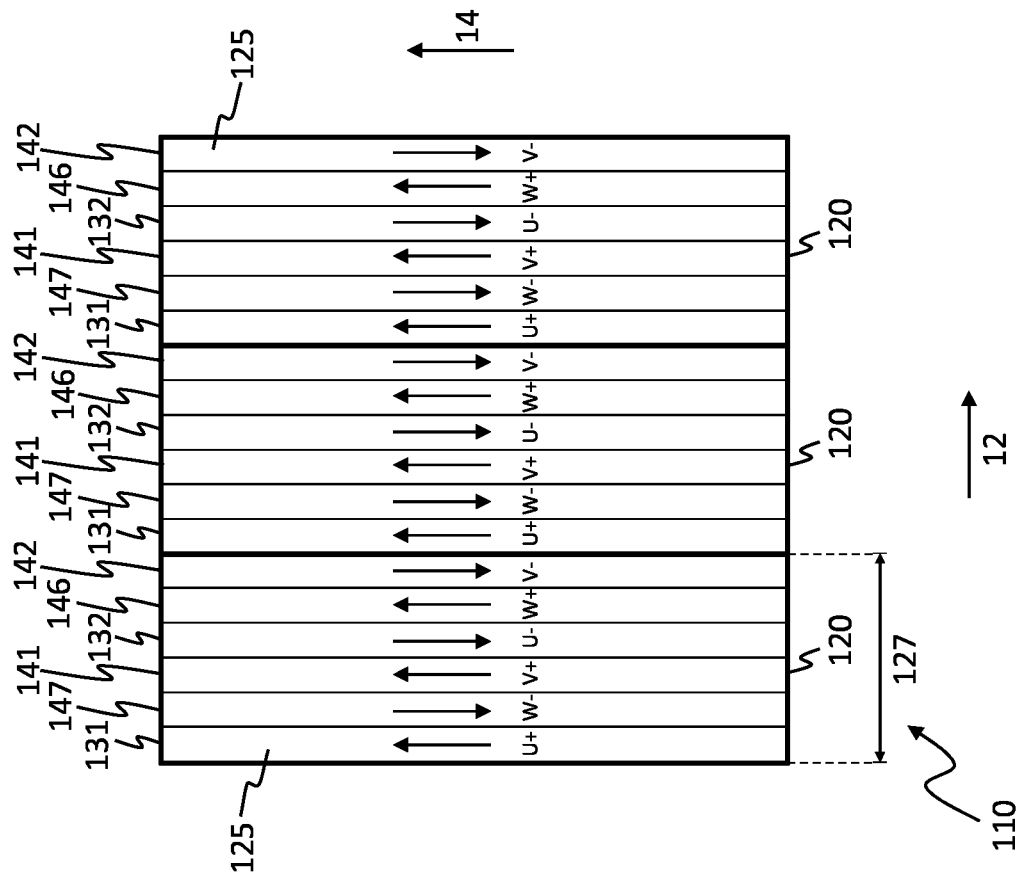
FIGS. 6 and 7 are top views of stator layers of the stator module.
Figure 7:
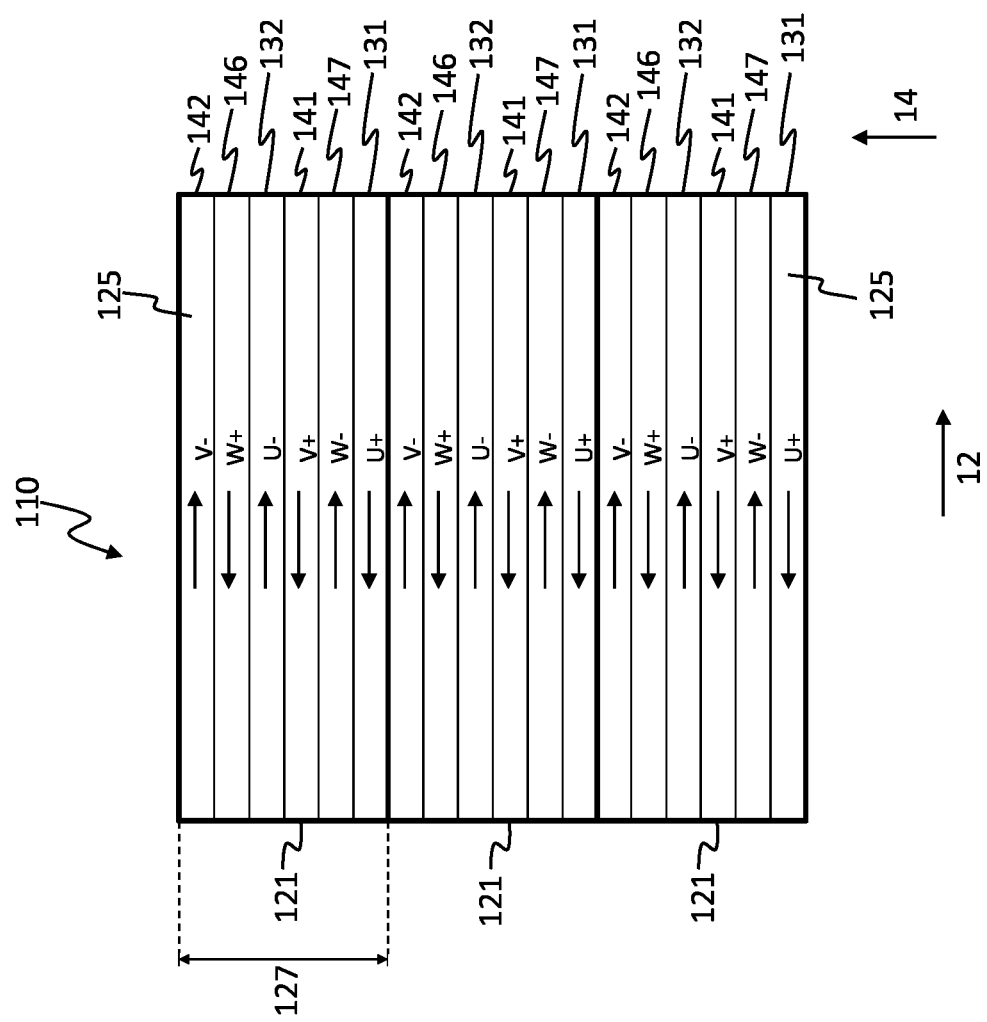

FIG. 6 shows a top view of the first stator segments 120 of the first stator sector 110. A corresponding top view of the second stator segments 121 of the first stator sector 110 is illustrated in FIG. 7. Unless differences are described, the second, third and fourth stator sectors 112, 113, 114 are identical in structure to the first stator sector 110. According to the embodiment shown in FIGS. 6 and 7, the stator segments 120, 121 have a segment width 127, which may e.g. be 40 mm. The stator conductors 125 of each of the individual stator segments 120, 121 of a respective stator layer 104, 106, 108 may each be energized with drive currents independently of the stator conductors 125 of the remaining stator segments 120, 121 of the respective stator layer 104, 106, 108. Therefore, drive currents in one of the stator segments 120, 121 do not necessarily depend on drive currents in another of the stator segments 120, 121. Furthermore, the stator conductors 125 of one of the stator segments 120, 121 may be energized with drive currents while the stator conductors 125 of another, e.g. an adjacent stator segment 120, 121, are without current.

The stator conductors 125 of the individual stator segments 120, 121 are each connected to form independently energizable three-phase coil systems, hereinafter also referred to as three-phase systems 150, with a common star point 157 (cf. FIGS. 8 and 9). The three-phase systems 150 may be supplied with a three-phase electrical drive current during operation of the planar drive system 1. In this context, a first phase U, a second phase V and a third phase W of the drive currents may each have a phase offset of 120° with regard to one another.

FIGS. 6 and 7 show a possible distribution of the phases U, V, W to the stator conductors 125 of the first and second stator segments 120, 121. The stator segments 120, 121 each have a first forward conductor 131 and a first return conductor 132 for the first phases U of the drive currents, a second forward conductor 141 and a second return conductor 142 for the second phases V of the drive currents, and a third forward conductor 146 and a third return conductor 147 for the third phases W of the drive currents. Since the individual stator segments 120, 121 may each be energized independently of one another, the drive currents applied to the individual stator segments 120, 121 may be different. In particular, the individual first phases U which may be applied to the various stator segments 120, 121 may be different in each case. In addition, the individual second phases V which may be supplied to the various stator segments 120, 121, and the individual third phases W which may be supplied to the various stator segments 120, 121, may be different in each case.

Phases U, V, and W may each be fed to the forward conductors 131, 141, 146 on a first side of the stator segments 120, 121 and to the return conductors 132, 142, 147 on an opposite second side of the stator segments 120, 121. In addition, phases U, V, and W may be coupled out of the forward conductors 131, 141, 146 at the second side of the stator segments 120, 121, respectively, and out of the return conductors 132, 142, 147 on the first side of the stator segments 120, 121, respectively.

The first forward and return conductors 131, 132 of first stator segments 120 arranged on top of one another on a plurality of first and further stator layers 104, 108 may each be serially connected. Similarly, the second forward and return conductors 141, 142 and the third forward and return conductors 146, 147 of first stator segments 120 arranged on top of one another on a plurality of first and further stator layers 104, 108 may each be serially connected. In this context, the phases U, V, W may each be coupled into the forward conductors 131, 141, 146 of one of the first stator segments 120 on one of the first and further stator layers 104, 108, then each of the forward and return conductors 131, 141, 146, 132, 142, 147 associated with the respective phase U, V, W may be passed through on all first and further stator layers 104, 108 of the respective first stator segment 120 and finally be joined in a star point 157 (cf. FIG. 8). Analogously to the first stator segments 120, the first forward and return conductors 131, 132, the second forward and return conductors 141, 142 and the third forward and return conductors 146, 147 of second stator segments 121 arranged on top of one another on a plurality of second and further stator layers 106, 108 may also be connected in series and joined in a star point 157 (cf. FIG. 9).

Figure 8:
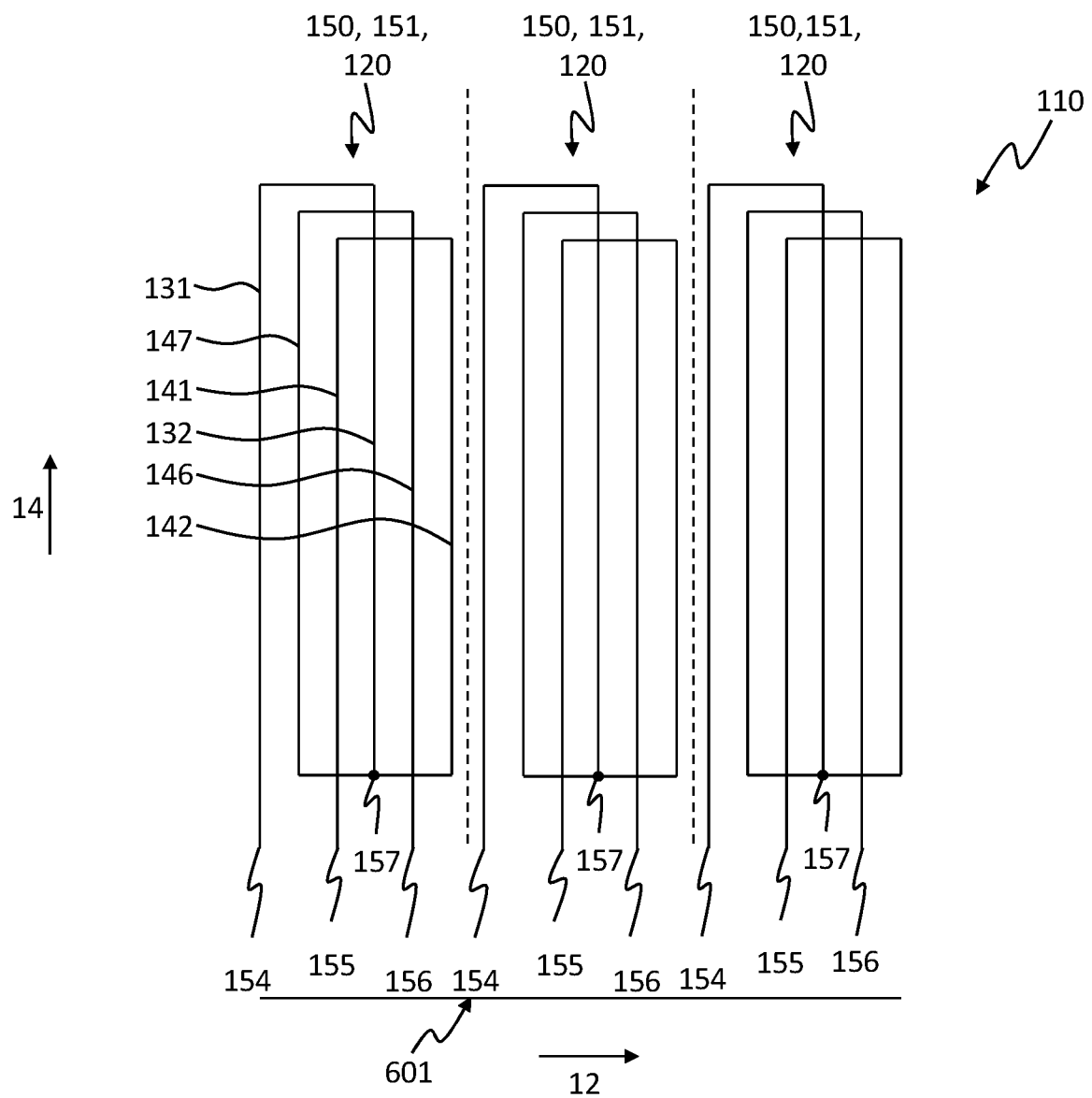
FIGS. 8 and 9 show equivalent circuit diagrams of three-phase coil systems of the stator module.

FIG. 8 shows an equivalent circuit diagram of the first stator segments 120 of the first stator sector 110, which may be considered for the above-described embodiment. In the equivalent circuit diagram shown in FIG. 8, all stator conductors 125 of the first stator segments 120 arranged on top of one another and series-connected are shown as a single conductor. The depicted first forward conductor 131 comprises all of the forward conductors 131 of the first stator segments 120 arranged on top of one another and series-connected in various first and further stator layers 104, 108, and the depicted first return conductor 132 comprises all of the first return conductors 132 of the first stator segments 120 arranged on top of one another and series-connected in various first and further stator layers 104, 108. Similarly, the illustrated second return conductor 141, second return conductor 142, third return conductor 146, and third return conductor 147 each comprise all of the second return conductor 141, second return conductor 142, third return conductor 146, and third return conductor 147 of the first stator segments 120 that are arranged on top of one another and connected in series in various first and further stator layers 104, 108.

As shown in FIG. 8, the stator conductors 125 or the forward and return conductors 131, 132, 141, 142, 146, 147 of the individual first stator segments 120 are each connected to form three-phase systems 150. With reference to the first stator segments 120, these are also referred to as first three-phase systems 151. A first connecting point 154 for feeding the first phases U, a second connecting point 155 for feeding the second phases V and a third connecting point 156 for feeding the third phases W are each arranged at a first side 601 of the individual first stator segments 120 oriented along the first direction 12. The first connecting point 154 may be connected to a first forward conductor 131 arranged in one of the first or further stator layers 104, 108. The second connecting point 155 may be connected to a second forward conductor 141 arranged in one of the first or further stator layers 104, 108. The third connecting point 156 may be connected to a third forward conductor 146 arranged in one of the first or further stator layers 104, 108. In addition, a star point 157 is arranged on the first side 601 of each of the first stator segments 120. At each of the star points 157, a first return conductor 132 of one of the first or further stator layers 104, 108, a second return conductor 142 of one of the first or further stator layers 104, 108, and a third return conductor 147 of one of the first or further stator layers 104, 108 may be connected.

Figure 9:
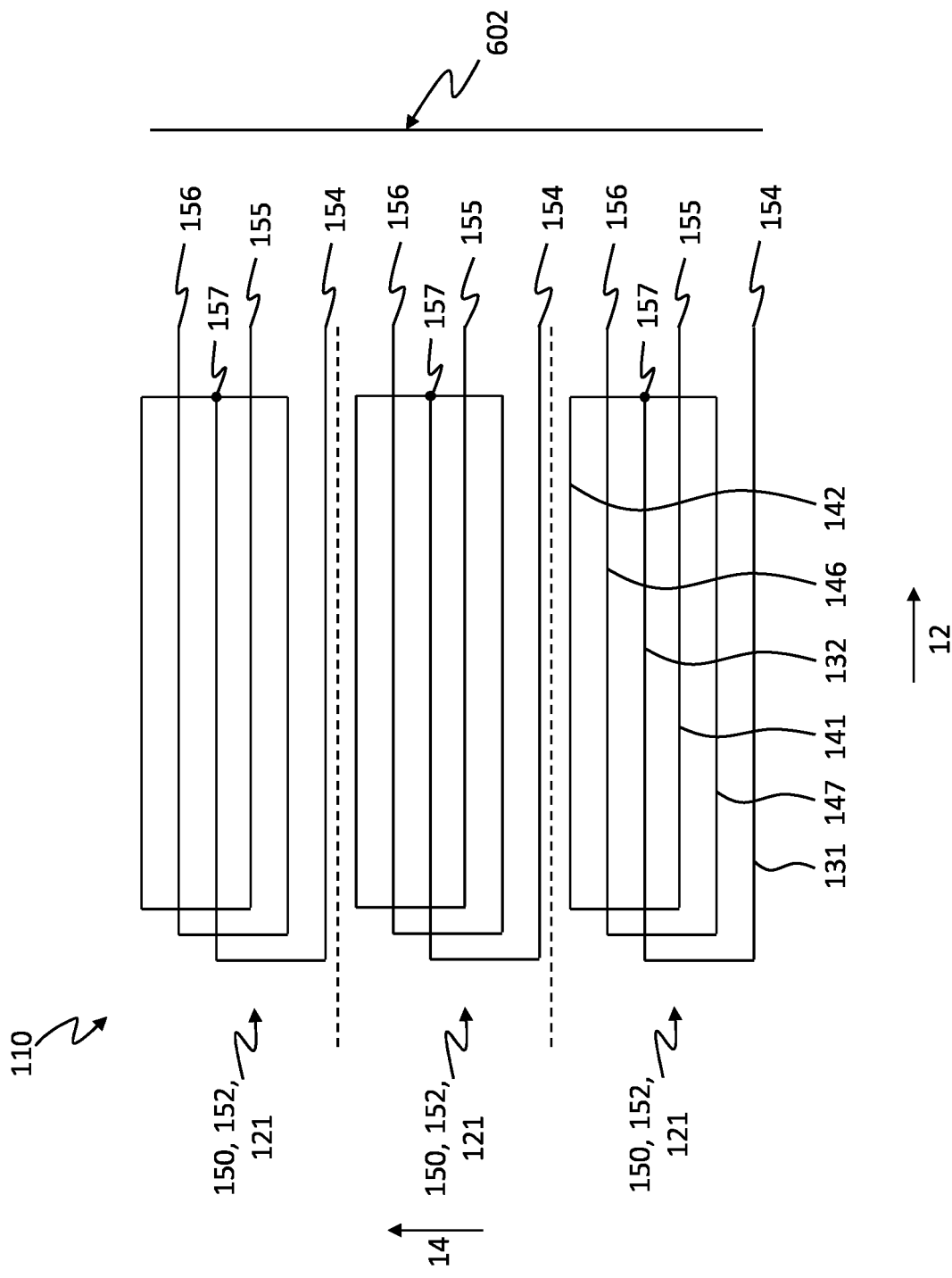

FIG. 9 shows an equivalent circuit diagram of the second stator segments 121 of the first stator sector 110, which may be considered for the embodiment described above. In the equivalent circuit diagram shown in FIG. 9, as in the equivalent circuit diagram of the first stator segments 120 shown in FIG. 8, all stator conductors 125 of the second stator segments 121 arranged on top of one another and series-connected are shown as a single conductor. The stator conductors 125 or the forward and return conductors 131, 132, 141, 142, 146, 147 of the second stator segments 121 are each connected to form three-phase systems 150. With reference to the second stator segments 121, these are also referred to as second three-phase systems 152. A first connecting point 154 for feeding the first phases U, a second connecting point 155 for feeding the second phases V and a third connecting point 156 for feeding the third phases W are each arranged at a second side 602 of the second stator segments 121 oriented along the second direction 14. The first connecting point 154 may be connected to a first forward conductor 131 arranged in one of the second or further stator layers 106, 108. The second connecting point 155 may be connected to a second forward conductor 141 arranged in one of the second or further stator layers 106, 108. The third connecting point 156 may be connected to a third forward conductor 146 arranged in one of the second or further stator layers 106, 108. In addition, a star point 157 is arranged at the second side 602 of each of the second stator segments 121. At each of the star points 157, a first return conductor 132 of one of the second or further stator layers 106, 108, a second return conductor 142 of one of the second or further stator layers 106, 108, and a third return conductor 147 of one of the second or further stator layers 106, 108 may be interconnected.

Based on the embodiment of the first stator sector 110 shown in FIGS. 8 and 9, it is clear that the first three-phase systems 151 representing the first stator segments 120 and the second three-phase systems 152 representing the second stator segments 121 of the first stator sector 110 are arranged rotated by 90° with respect to one another. The first stator sector 110 comprises three first three-phase systems 151 and three second three-phase systems 152, and the magnetic field generated by the first three-phase systems 151 may provide for movement of the rotor 200 along the first direction 12. The magnetic field generated by the second three-phase systems 152 may provide for movement of the rotor 200 along the second direction 14. This embodiment is applicable to the second, third, and fourth stator sectors 112, 113, 114 in a corresponding manner.

Consequently, the stator unit 100 of the stator module 10 illustrated in FIG. 4 comprises twelve first three-phase systems 151 and twelve second three-phase systems 152, and thus a total of twenty-four three-phase systems 150. The stator unit 100 may be realized in the form of a multilayer printed circuit board, the stator layers 104, 106, 108 each being arranged in different layers of the printed circuit board. In order to achieve interconnection of the forward and return conductors 131, 141, 146, 132, 142, 147 according to the equivalent circuit diagrams shown in FIGS. 8 and 9, the stator unit 100 may comprise electrical interconnection structures such as horizontal interconnection structures and vertical interconnection structures.

By suitably energizing three-phase systems 150 of the or at least one stator module 10 of the stator 5, the rotor 200 may be driven as indicated above. Here, a part of the three-phase systems 150 may be energized simultaneously. This concerns three-phase systems 150 which are located in the area of the rotor 200. In this context, the or each stator module 10 of the stator 5 may have position sensors such as Hall sensors, via which the current position of the rotor 200 may be detected. In an embodiment of the stator 5 having a plurality of stator modules 10, as shown for example in FIG. 2, a part of the three-phase systems 150 of one or of a plurality of adjacent stator modules 10 may be electrically controlled simultaneously in a corresponding manner in order to drive the rotor 200.

Figure 10:
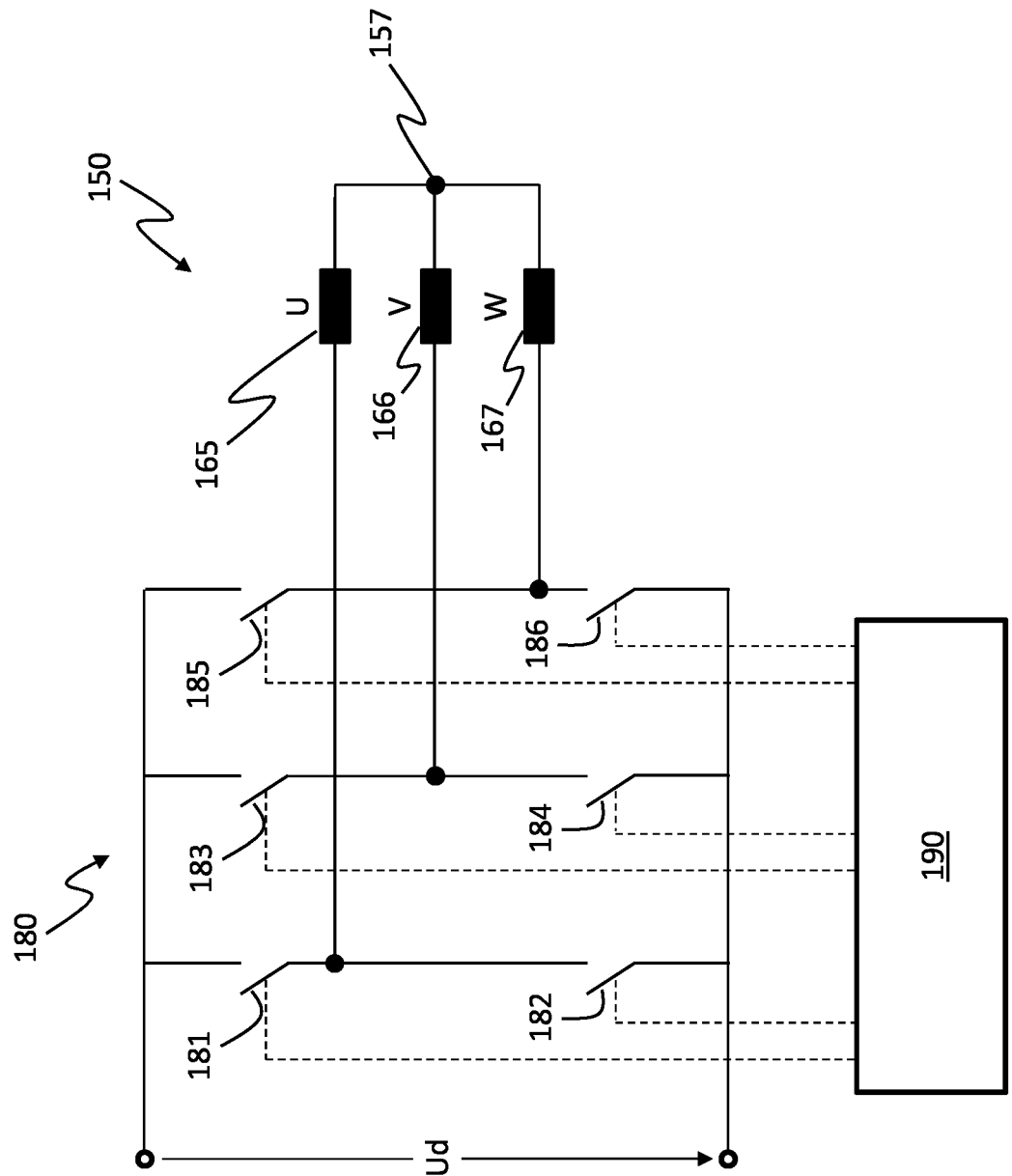
FIG. 10 shows a circuit diagram of a coil system having an output stage device.

The energization of three-phase systems 150 of the or of each stator module 10 of the stator 5 is carried out, as has been indicated above, by current control based on pulse-width modulation. As shown in FIG. 10 with reference to a single three-phase system 150 of a stator module 10, output stage device 180 of the stator module 10 associated with and connected to the three-phase system 150 may be used for this purpose, among other things. In the present case, the three-phase system 150 comprises a first coil 165, a second coil 166 and a third coil 167, which are interconnected in a common star point 157. With reference to the equivalent circuit diagrams shown in FIGS. 8 and 9, the first coil 165 may comprise first forward and return conductors 131, 132, the second coil 166 may comprise second forward and return conductors 141, 142, and the third coil 167 may comprise third forward and return conductors 146, 147. In operation, the first coil 165 may be used to energize the first phase U of a three-phase drive current, and the second coil 166 may be used to energize the second phase V and the third coil 167 may be used to energize the third phase W of the drive current.

According to the embodiment shown in FIG. 10, the output stage device 180 is connected to an electrical intermediate circuit voltage Ud of an intermediate circuit 171 (cf. FIG. 11) of the relevant stator module 10. In the present embodiment, the output stage device 180 comprises a first switch 181, a second switch 182, a third switch 183, a fourth switch 184, a fifth switch 185, and a sixth switch 186. The first and second switches 181, 182 are connected to the first coil 165 and may form a first output stage associated with the first coil 165. The third and fourth switches 183, 184 are connected to the second coil 166 and may form a second output stage associated with the second coil 166. The fifth and sixth switches 185, 186 are connected to the third coil 167 and may form a third output stage associated with the third coil 167.

The output stage device 180 shown in FIG. 10 having the switches 181, 182, 183, 184, 185, 186 may be embodied in the form of a driver circuit having three half bridges. In this embodiment, the switches 181, 182, 183, 184, 185, 186 may be implemented in the form of transistors.

In operation, in deviation from the illustration in FIG. 10, one of the two first and second switches 181, 182 is closed in each case, and the other of the two first and second switches 181, 182 is open in each case. In a corresponding manner, one of the two third and fourth switches 183, 184 and one of the two fifth and sixth switches 185, 186 are open, respectively, and the other of the two third and fourth switches 183, 184 and the other of the two fifth and sixth switches 185, 186 are closed, respectively. Depending on the switching states of the switches 181, 182, 183, 184, 185, 186 of the output stage device 180, electrical voltages or voltage pulses with a voltage amount equal to the supply voltage Ud or a reference or ground potential may be applied to the coils 165, 166, 167 of the three-phase system 150.

FIG. 10 indicates that the output stage device 180 is connected to a module controller 190 of the associated stator module 10. In operation, a pulse-width modulated periodic control of the output stage device 180 or of its switches 181, 182, 183, 184, 185, 186 may be effected via the module controller 190. In this way, the coils 165, 166, 167 of the three-phase system 150 may be supplied with pulse-width modulated periodic voltage pulses at the level of the intermediate circuit voltage Ud and thereby be appropriately energized.

Figure 11:
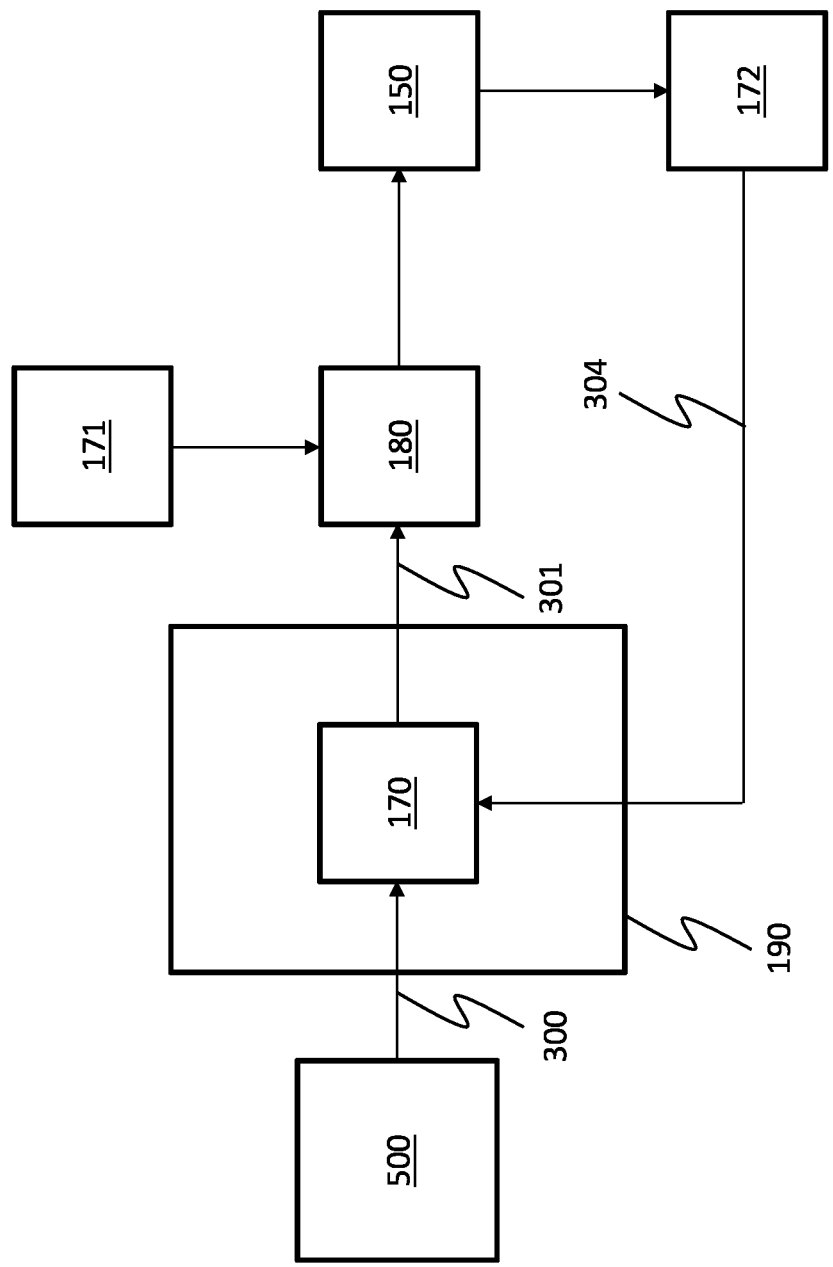
FIG. 11 shows a control loop for current control of a coil system of the stator based on pulse-width modulation.

For further illustration, FIG. 11 shows a block diagram of a control loop for current control of a three-phase system 150 of a stator module 10 based on pulse-width modulation, as may be applied to the planar drive system 1. The control loop shown in FIG. 11 comprises an external primary controller 500 of the planar drive system 1, a module controller 190, a final stage device 180, a three-phase system 150 and a current measuring device 172. The module controller 190, which comprises a current controller 170, may be realized in the form of an FPGA. The output stage device 180 is connected to an intermediate circuit 171, so that the output stage device 180 may be supplied with an intermediate circuit voltage, as described above with reference to FIG. 10. The intermediate circuit 171 may also be referred to as an intermediate circuit or intermediate circuit storage. The module controller 190, the output stage device 180, the intermediate circuit 171, the three-phase system 150 and the current measuring device 172 are components of the or a stator module 10 of the stator 5 of the planar drive system 1. With reference to the stator module 10 shown in FIG. 4, the module controller 190, the output stage device 180, the intermediate circuit 171 and the current measuring device 172 may be integrated in the module housing 18.

The electrical current measuring device 172, which may comprise an analog-to-digital converter (ADC) and which is suitably connected to the three-phase system 150, is embodied to detect actual current values of the three-phase system 150. This may be done by periodically sampling at predetermined points in time. During current measurement, only the currents of two of the three coils of the three-phase system 150 may be sampled. This is because the currents flowing in the two sampled coils may be used to infer the current flowing in the non-sampled coil. This is due to the star connection of the coils of the three-phase system 150.

As shown in the control loop of FIG. 11, during operation of the planar drive system 1, target current values 300 are generated by the primary controller 500 and transmitted to the current controller 170. Furthermore, actual current values 304 obtained from the current measuring device 172 by sensing at the three-phase system 150 are transmitted to the current controller 170. Based on the target current values 300 and actual current values 304, pulse-width modulated control signals 301 are generated by the current controller 170, which are applied to the output stages or switches of the output stage device 180. Based on the control signals 301, pulse-width modulated voltage pulses may be applied to the three-phase system 150 or its coils by the output stage device 180, allowing corresponding drive currents to flow therein.

As indicated above, the or each stator module 10 of the stator 5 comprises twenty-four three-phase systems 150. In this context, the or each stator module 10 is embodied to carry out its own current control, which is in this respect independent of other three-phase systems 150, for each of the associated three-phase systems 150 in accordance with the control loop shown in FIG. 11. Therefore, for each associated three-phase system 150, the or each stator module 10 comprises a current controller 170 and an output stage device 180. Consequently, there are twenty-four current controllers 170 per stator module 10, which are integrated in the associated module controller 190 of the respective stator module 10, and twenty-four output stage devices 180. The output stage devices 180 are each supplied with electrical energy from the intermediate circuit 171 of the respective stator module 10.

With reference to current measurement, it is also possible to provide a current measuring device 172 for each three-phase system 150. Alternatively, the following embodiment is conceivable in order to keep the hardware expenditure low. In this context, the or each stator module 10 of the stator 5 comprises a plurality of current measuring devices 172, each of which is connected to a group of three three-phase systems 150, and thereby each of which is assigned to such a group of three three-phase systems 150 for current sensing. In view of the above implementation with twenty-four three-phase systems 150, the or each stator module 10 accordingly has eight current measuring devices 172. As explained above with reference to FIGS. 8 and 9, the twenty-four three-phase systems 150 of a stator module 10 comprise twelve first three-phase systems 151 and twelve second three-phase systems 152 that may cause the rotor 200 to move along the first or second directions 12, 14. In this regard, the or each stator module 10 may be configured such that three first or three second three-phase systems 151, 152 are associated with a current measuring device 172 for measuring current.

The primary controller 500 of the planar drive system 1 shown in FIG. 11 is appropriately connected to a stator module 10 of the stator 5, and in an embodiment of the stator 5 having a plurality of stator modules 10 as shown for example in FIG. 2, to the plurality of stator modules 10 to allow for data communication between the primary controller 500 and the stator module or modules 10. As described above, appropriate data lines and, in the case of multiple stator modules 10, interconnected stator modules 10 may be used for this purpose. In operation, the primary controller 500 may transmit target current values 300 to one or a plurality of current controllers 170 of one or a plurality of stator modules 10, allowing pulse-width modulated current to be applied to the associated three-phase systems 150. With reference to generating and transmitting the target current values 300, the primary controller 500 may take into account a current position of the rotor 200. Corresponding position data may be transmitted to the primary controller 500 by one or by a plurality of stator modules 10. Such position data may be obtained using position sensors of the one or of a plurality of stator modules 10, as indicated above.

The primary controller 500 may further be configured to define a system clock of the planar drive system 1, according to which the timing of the operation of the planar drive system 1 may be determined. As part of the data communication between the primary controller 500 and the one or a plurality of stator modules 10 of the stator 5, the system clock may also be transmitted. Based on the system clock, timing parameters of current control such as a pulse-width modulation clock frequency may be specified. The PWM clock frequency may be in the kHz range and may be 64 kHz, for example.

Figure 12:
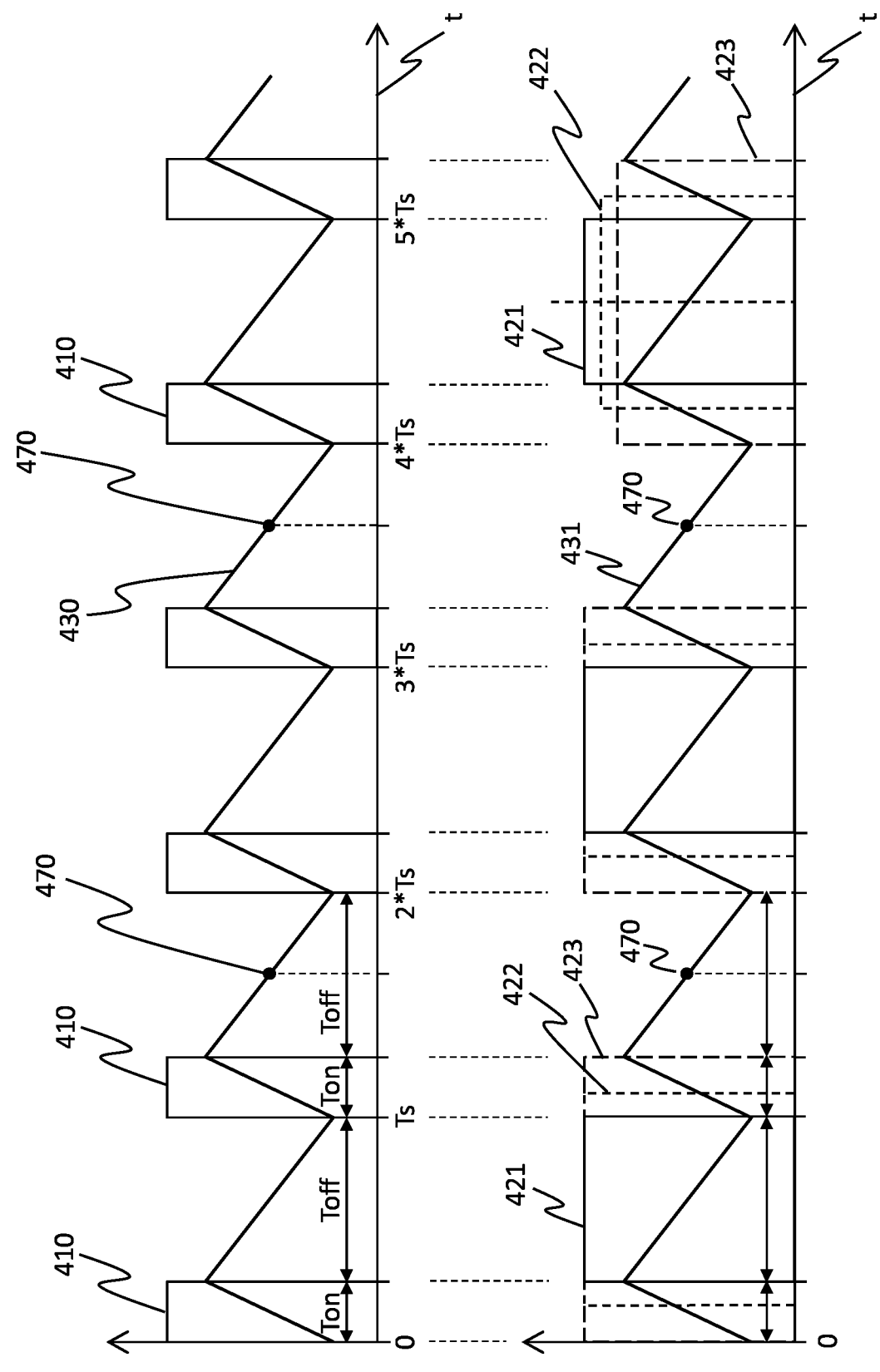
FIG. 12 shows voltage and current curves over time for pulse-width modulated energization of a single-phase and a three-phase coil system.

FIG. 12 shows possible electrical voltage and current curves as a function of time t, as they may occur with pulse width modulated electrical control of coil systems. The upper diagram of FIG. 12 shows, for simplified illustration, conditions of a control of a single-phase coil system with only one coil. The coil system is supplied with an electrical drive voltage determined by the PWM clock frequency, and thus with periodic first voltage pulses 410. The voltage has a nearly rectangular shape with two voltage levels. In addition, a period duration Ts of the pulse-width modulation, as well as a pulse duration Ton and a time-out duration Toff are shown. During the pulse duration Ton, in which voltage is applied to the coil system, a first voltage pulse 410 is present in each case. During the time-out period Toff, no voltage is applied to the coil system. Due to a smoothing effect of the coil system, the electric current flowing in the coil system follows the first voltage pulses 410 in such a way that a triangular first current curve 430 is present. Provided that the first voltage pulses 410 are applied to the coil system, there is an increase in the current or current amount occurs, and otherwise a decrease. In this way, the current oscillates back and forth about a mean value with the clock frequency of the pulse-width modulation and thus the period Ts. The mean value of the current depends on the duty cycle, i.e. the ratio of the pulse duration Ton to the period duration Ts. The current flowing in the coil system thus has an alternating current component, the so-called ripple current, which is associated with the occurrence of a magnetic field that changes with time.

The lower diagram of FIG. 12 shows corresponding conditions for electrical control of a three-phase coil system with three coils. This type of control, which is based on center-aligned PWM, may be used in the three-phase systems 150 of the planar drive system 1 and may be realized by the control loop described above with reference to FIG. 11. The three-phase coil system is supplied with three drive voltages specified by the PWM clock frequency, and thus with three periodic voltage pulses 421, 422, 423 having different pulse widths or pulse durations. These are referred to as the second, third and fourth voltage pulses 421, 422, 423 in the following. The three voltages have nearly rectangular curves with two voltage levels. The second voltage pulses 421 may relate to the first phase U, the third voltage pulses 422 to the second phase V, and the fourth voltage pulses 423 to the third phase W of a three-phase drive current. In a corresponding manner, with reference to the three-phase system 150 shown in FIG. 10, it is e.g. possible for the first coil 165 to receive the second voltage pulses 421, for the second coil 166 to receive the third voltage pulses 422, and for the third coil 167 to receive the fourth voltage pulses 423.

The electrical control is such that a second, third and fourth voltage pulse 421, 422, 423 are center-aligned with regard to one another, and thus the centers of the respective voltage pulses 421, 422, 423 are arranged on top of one another. To illustrate this aspect, a second, third and fourth voltage pulse 421, 422, 423 with different pulse heights are shown on the right side of the lower diagram of FIG. 12. The depiction with the different pulse heights serves only to emphasize the center-aligned arrangement of the second, third and fourth voltage pulses 421, 422, 423. This is because second, third and fourth voltage pulses 421, 422, 423 with matching voltage magnitudes are applied to the coils of the three-phase coil system during actuation, as is illustrated for the other second, third and fourth voltage pulses 421, 422, 423 shown in FIG. 12.

The lower diagram of FIG. 12 shows an electrical second current curve 431 that may occur in one of the three coils of the three-phase coil system energized by the second, third and fourth voltage pulses 421, 422, 423. This may e.g. be the first phase U of the three-phase drive current and, with reference to the three-phase system 150 shown in FIG. 10, the first coil 165. The second current curve 431 also has a triangular shape, due to a smoothing effect of the coil system, and oscillates back and forth about a mean value with the PWM clock frequency. An increase in the current amount occurs when all three drive voltages are not at the same (upper or lower) voltage level. If, on the other hand, the three voltages have the same voltage level, the current amount is reduced. The ripple current present in this case also leads to the occurrence of an alternating magnetic field.

In the two other coils of the three-phase coil system, triangular electrical current curves corresponding to the second current curve 431 are provided, and which are affected by the ripple current. Here, too, an increase in the current amount occurs in each case if all three drive voltages are not at the same voltage level, and a reduction in the current amount occurs otherwise. At least one of the current curves may have an appearance inverse to the second current curve 431, i.e., the current changes occur with an inverse sign with respect to the second current curve 431.

In an energized three-phase system 150 of the planar drive system 1, the drive currents flowing in the associated coils are similarly superimposed with a ripple current. The occurrence of the ripple current is associated with a time-varying magnetic field. This effect is used in the planar drive system 1 to induce an alternating electrical voltage in the at least one rotor coil 240 of the rotor 200, thereby transferring electrical energy from the stator 5 to the rotor 200, among other things.

FIG. 12 shows that the first current curve 430 in the single-phase coil system may be equivalent to the second current curve 431 in the three-phase coil system. Therefore, the upper diagram of FIG. 12 may serve as an equivalence plot for the three-phase coil system, and the first current curve 430 may also refer to one of the three coils of the three-phase coil system. In this view, the first voltage pulses 410 may be viewed as effective and current-amount-magnifying substitute pulses for the second, third and fourth voltage pulses 421, 422, 423 actually applied to the three-phase coil system. This relationship is indicated in FIG. 12 by the dashed lines between the upper and lower diagrams.

FIG. 12 also shows current measuring points 470 at which the coil systems may be sampled to obtain actual electrical current values. The periodic sampling is timed to match the pulse width modulated periodic energization, such that the current measuring points 470 are located midway between successive first voltage pulses 410 and second, third and fourth voltage pulses 421, 422, 423. In this way, it may be achieved that the actual current values obtained by sampling correspond to the mean value of the respective current (so-called regular sampling method). This procedure enables accurate current control.

In the lower diagram of FIG. 12, the current measuring time points 470 are respectively located between the second, third and fourth voltage pulses 421, 422, 423. In the upper diagram of FIG. 12, the current measuring times 470 are shown corresponding to the lower diagram. In this way, the current measuring time points 470 are not present between all of the first voltage pulses 410. However, it is also possible to provide the current measuring time points 470 between all first voltage pulses 410 and thus perform a measurement per PWM clock period.

The current control carried out in the planar drive system 1 according to the control loop shown in FIG. 11 may be performed in such a way that three-phase systems 150 to be energized are controlled in a pulse-width modulated manner according to FIG. 12 and are thereby energized. In this context, pulse-width modulated control signals 301 are generated by corresponding current controllers 170 using the target current values 300 specified by the primary controller 500 and the actual current values 304 provided by one or a plurality of current measuring devices 172 by sampling, which are transmitted to the respective output stage devices 180 (cf. FIG. 11). In this way, voltage pulses with predetermined duty cycles and pulse durations are applied to the three-phase systems 150 to be energized, thus energizing them. The mean values of the electric currents flowing in the three-phase systems 150 are based on the target current values 300 specified by the primary controller 500. A change in the target current values 300 may cause a change in the control signals 301 and thus in the duty cycles and pulse durations of the voltage pulses, which also causes the mean values of the currents to change. Compared to the superimposed ripple current, such current changes may relate to much larger periods of time. As a result, current control may also be referred to as direct current control.

In operation of the planar drive system 1, a plurality of three-phase systems 150 may be energized simultaneously to drive the rotor 200. This may be controlled by the primary controller 500 outputting corresponding target current values 300 for associated current controllers 170 (cf. FIG. 11). In an embodiment of the stator 5 with a plurality of stator modules 10 (cf. FIG. 2), a plurality of simultaneously energized three-phase systems 150 may also be components of a plurality of adjacent stator modules 10, depending on the position of the rotor 200.

In the case of simultaneous energization of a plurality of three-phase systems 150, the rotor 200 and thus the at least one rotor coil 240 of the rotor 200 may be located in the area of influence of the plurality of three-phase systems 150 and may be subjected to the influence of a resulting alternating magnetic field formed by a superposition of a plurality of alternating magnetic fields, each caused by the ripple currents flowing in the three-phase systems 150. In this regard, the alternating voltage induced in the rotor coil 240 may be in accordance with the resulting alternating magnetic field generated by the plurality of three-phase systems 150.

Pulse-width modulated energizing of a plurality of three-phase systems 150 may be synchronous in time or essentially synchronous in time. With reference to the latter variant, a plurality of three-phase systems 150 may be energized at staggered times with respect to each other, and thus in staggered time slots with respect to each other, so that there may be a time offset between the voltage pulses applied to the respective three-phase systems 150. The time offset may be relatively small and may e.g. be in the single-digit microsecond range. This condition may therefore be neglected with respect to the data transmission between the stator 5 and the rotor 200 described below, and will therefore not be discussed in detail here.

The planar drive system 1 may be embodied in such a way that data transmission from the rotor 200 to the stator 5 is possible. In this context, embodiments described below may be used.

The process of load modulation may be used for data communication from the rotor 200 to the stator 5. For this purpose, the rotor 200 may be configured to perform a temporary electrical loading of the at least one rotor coil 240. The loading of the rotor coil 240 has the effect, from extracting energy, or extracting it in an amplified form, from the alternating magnetic field generated by the pulse-width modulated energization of three-phase systems 150 of the stator 5. This leads to an increase in the current consumption of energized three-phase systems 150 of the stator 5. By temporarily or pulse-wise loading the rotor coil 240, a temporarily or pulse-wise increased current consumption may be caused at the stator 5 in a corresponding manner, and based thereon data signals or symbols may be transmitted from the rotor 200 to the stator 5. By detecting the increased current consumption, which may be done as described below in the context of measuring a summation current of energized three-phase systems 150, and by performing a corresponding evaluation, conclusions may be drawn about the data signals generated by the rotor 200.

Figure 13:
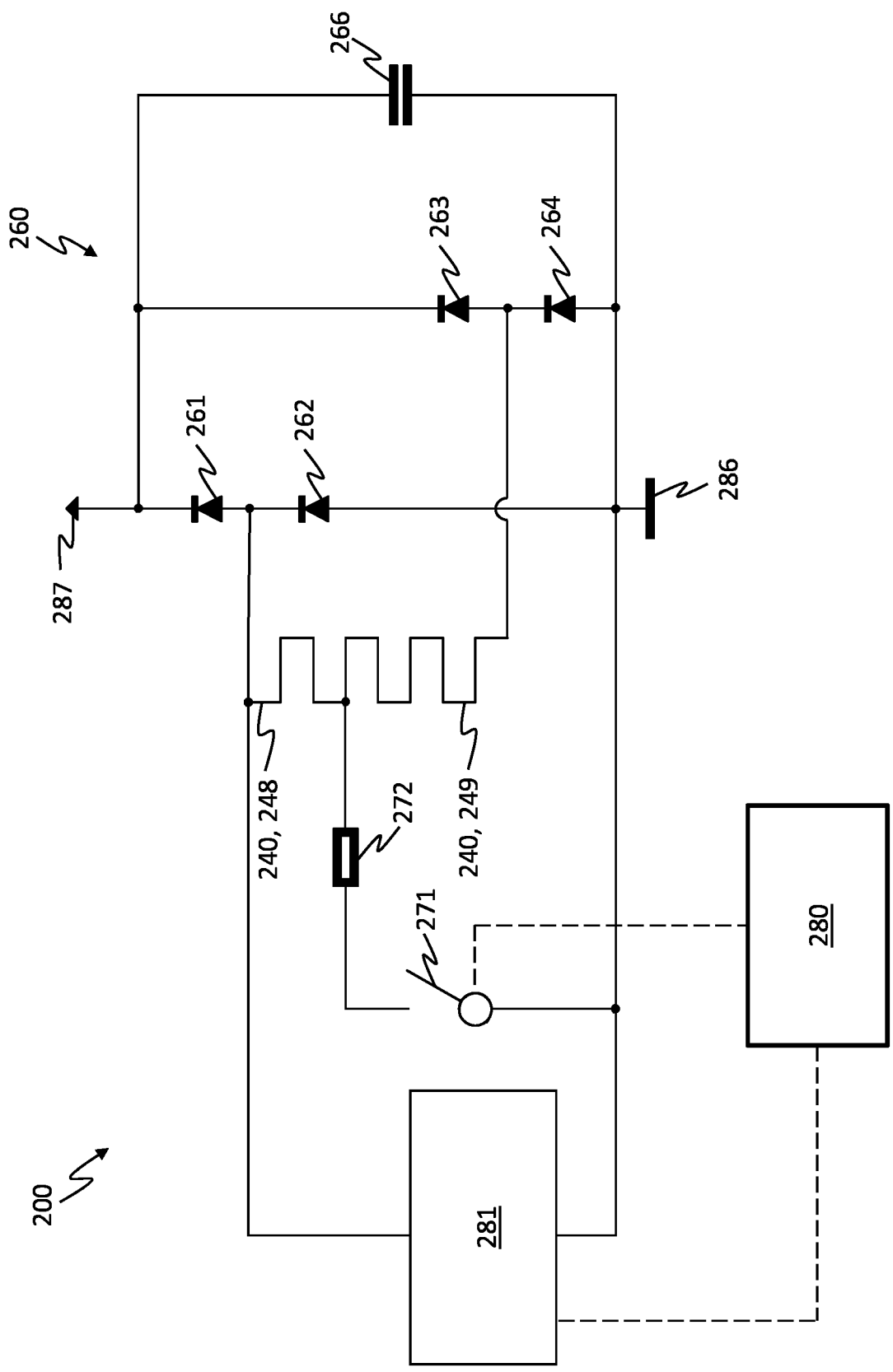
FIG. 13 is a depiction of the rotor having a rectifier, a rotor coil, a switching device, a voltage measuring device and a controller, wherein a coil portion of the rotor coil may be short-circuited.

For further illustration, FIG. 13 shows a possible embodiment of a circuit arrangement as may be provided in the rotor 200 for performing the load modulation. The rotor 200 has a rotor coil 240 in which an alternating electric voltage may be induced due to the pulse-width modulated energization of three-phase systems 150 of the stator 5 and the associated evocation of an alternating magnetic field. Further components of the rotor 200 are a rectifier 260 connected to the rotor coil 240 and a smoothing capacitor 266 connected to the rectifier 260. The rectifier 260, which is realized in the present case in the form of a bridge rectifier, comprises a first diode 261, a second diode 262, a third diode 263 and a fourth diode 264. With the aid of the rectifier 260, the AC voltage induced in the rotor coil 240 may be converted into a DC voltage. The smoothing capacitor 266 is used to smooth the DC voltage otherwise provided in a pulsating form by the rectifier 260.

The smoothed DC voltage generated by the rectifier 260 and the smoothing capacitor 266 may be applied between a first connection 286 and a second connection 287, which are connected to the rectifier 260 and the smoothing capacitor 266, according to the circuit arrangement shown in FIG. 13. The first connection 286 may be a ground connection, as indicated in FIG. 13. The DC voltage may be used to provide electrical energy to at least one further device. The further device may be part of the rotor 200 and/or arranged on the rotor 200. This e.g. includes a controller 280 of the rotor 200 described further below.

According to the embodiment shown in FIG. 13, the rotor 200 is embodied to short-circuit a coil portion of the rotor coil 240 to perform the load modulation by temporarily electrically loading the rotor coil 240. In this way, it may be achieved that during the loading, the AC voltage induced in the rotor coil 240 only partially collapses, and thus the inductive energy transfer from the stator 5 to the rotor 200 is maintained.

As shown in FIG. 13, the rotor coil 240 comprises a first coil portion 248 and a second coil portion 249 for this purpose, the second coil portion 249 being used for temporary electrical short-circuiting. The rotor 200 further comprises a load resistor 272 connected to the rotor coil 240, and a switching device 271 connected to the load resistor 272 and to the first connection 286. The switching device 271 may be implemented in the form of a transistor. By closing the switching device 271, the second coil portion 249 of the rotor coil 240 may be short-circuited across the load resistor 272. According to the circuit arrangement shown in FIG. 13, the second coil portion 249 or its ends are connected to the first connection 286 which serves as a ground connection. The short-circuiting of the second coil portion 249 is associated with effects such as a change in impedance and an occurrence of an eddy current, so that, as described above, an increased energy extraction from the alternating magnetic field of the stator 5 and thus an increased current consumption of energized three-phase systems 150 of the stator 5 may be caused. By opening the switching device 271, the short circuit of the second coil portion 249 may be cancelled, and in this respect the presence of the increased current consumption at the stator 5 may be terminated. By using the load resistor 272, the magnitude of the energy extraction from the alternating magnetic field may be set when the rotor coil 240 is loaded.

According to the circuit arrangement shown in FIG. 13, the rotor 200 further comprises a controller 280 connected to the switching device 271. The controller 280 is used to control the switching device 271, and thus to control the transmission of data from the rotor 200 to the stator 5. As indicated above, the controller 280 may be supplied with electrical energy via the DC voltage provided by the rectifier 260 and the smoothing capacitor 266. Via the controller 280, the switching device 271 may be periodically or pulse-controlled to short-circuit the second coil portion 249 of the rotor coil 240 in such a manner that corresponding data signals or symbols are generated by the rotor 200 and transmitted to the stator 5.

The rotor 200 further comprises a voltage measuring device 281 connected to the rotor coil 240, as shown in FIG. 13. The voltage measuring device 281 may be used to measure the AC voltage induced in the rotor coil 240. This may serve the purpose of determining the frequency thereof on this basis. The voltage measuring device 281 is connected to the controller 280, so that corresponding measurement signals of the AC voltage may be transmitted from the voltage measuring device 281 to the controller 280 for evaluation. By evaluating the measurement signals, the controller 280 may determine the frequency of the AC voltage, and consequently the frequency of the alternating magnetic field generated by the stator 5 corresponding thereto, and correspondingly the PWM clock frequency of the current control. The phase position of the AC voltage and the alternating magnetic field may also be determined by the controller 280.

The determination of the frequency and the phase position of the alternating magnetic field may be provided in order to carry out the data transmission from the rotor 200 to the stator 5 using a reference clock, in this case in the form of the alternating magnetic field generated by the stator 5 or its frequency. In this way, data transmission may be performed with a high degree of reliability. In this context, the controller 280 may be embodied to perform the loading of the rotor coil 240 by triggering the switching device 271 in time with the alternating magnetic field. The reference clock in the form of the alternating magnetic field may be used in a corresponding manner in an evaluation performed by the stator 5, as will be explained in more detail below.

As indicated above and described in more detail below, a summation current of energized three-phase systems 150 is measured to detect the increased current consumption of the stator 5 caused by the loading of the rotor coil 240. In this context, it is possible that the amplitude of data signals generated by the rotor 200 in the measured summation current is relatively small. This is e.g. true when compared to an average or DC level of the summation current. Moreover, the summation current may be subject to disturbances such as noise. In this way, the measured summation current cannot be used to reliably decide whether or not there is a load on the rotor coil 240. As a result, the evaluation of the data signals may be impaired.

In order to enable reliable and safe data transmission from the rotor 200 to the stator 5 even under such circumstances, it may be considered to perform the loading of the rotor coil 240 (cf. FIG. 13), which is temporarily performed for data transmission by the controller 280 by controlling the switching device 271, in modulated form, i.e. using a carrier signal or periodic carrier signal. The modulation used may e.g. be a phase modulation, amplitude modulation or frequency modulation. In this embodiment, the loading of the rotor coil 240 may be modulated such that a carrier signal or carrier frequency is transmitted which is modulated with a user signal. In this regard, the user signal comprises the data signals or symbols intended to be transmitted. The carrier frequency may be a square wave carrier frequency. Furthermore, the carrier frequency may be in the kHz range. For example, the frequency range of 1 kHz to 2 kHz is possible. The carrier signal generated by the rotor 200 and modulated with the user information or signal may be included in the summation current measured at the stator 5. By evaluating the summation current, the user signal may consequently be inferred.

In the case of amplitude modulation, a carrier signal having a carrier frequency of 1 kHz or 2 kHz may e.g. be used. Data may be transmitted by either transmitting the carrier signal by pulsing the carrier coil 240 in time with the carrier frequency, or not transmitting the carrier signal by not pulsing the carrier coil 240. In this manner, symbols having the information content of a bit may be transmitted. For example, the logic state 0 may be transmitted by pulsing the load for a predetermined period of time, and the logic state 1 may be transmitted by not loading the load for the predetermined period of time (or vice versa).

With regard to frequency modulation, a carrier signal with a carrier frequency of 1 kHz or 2 kHz may also be used, for example. To implement data transmission, either the carrier signal with the carrier frequency of 1 kHz or 2 kHz, or a modulated carrier signal with a modified, i.e. higher or lower frequency of e.g. 2 kHz or 1 kHz, may be transmitted. Correspondingly, the rotor coil 240 may be pulse-loaded. Symbols having the information content of a bit may also be transmitted in this manner. For example, the logic state 0 may be transmitted by pulse-shaped loading with the carrier frequency for a predetermined period of time, and the logic state 1 may be transmitted by pulse-shaped loading with the changed frequency for the predetermined period of time (or vice versa). It is furthermore possible to use a plurality of different frequencies for transmitting a modulated carrier signal, allowing symbols with a greater information content to be transmitted. An example is a 4-FSK (Frequency Shift Keying), in which a total of four different frequencies are used. In this way, symbols with the information content of a dibit may be transmitted.

Phase modulation, also known as phase shift keying (PSK), may use a carrier signal with a carrier frequency of 1 kHz or 2 kHz, for example. The data transmission may be performed by transmitting the carrier signal in different and mutually shifted phase positions by applying a corresponding pulse load to the rotor coil 240. For example, two different phase positions are possible, so that a 2-PSK is provided. This allows symbols with the information content of one bit to be transmitted. Alternatively, a different number of different phase layers may be provided, allowing symbols with a greater information content to be transmitted. An example is four different phase layers, as is the case with a 4-PSK. In this way, symbols with the information content of a dibit may be transmitted. Such an embodiment will be discussed in more detail below.

Figure 14:
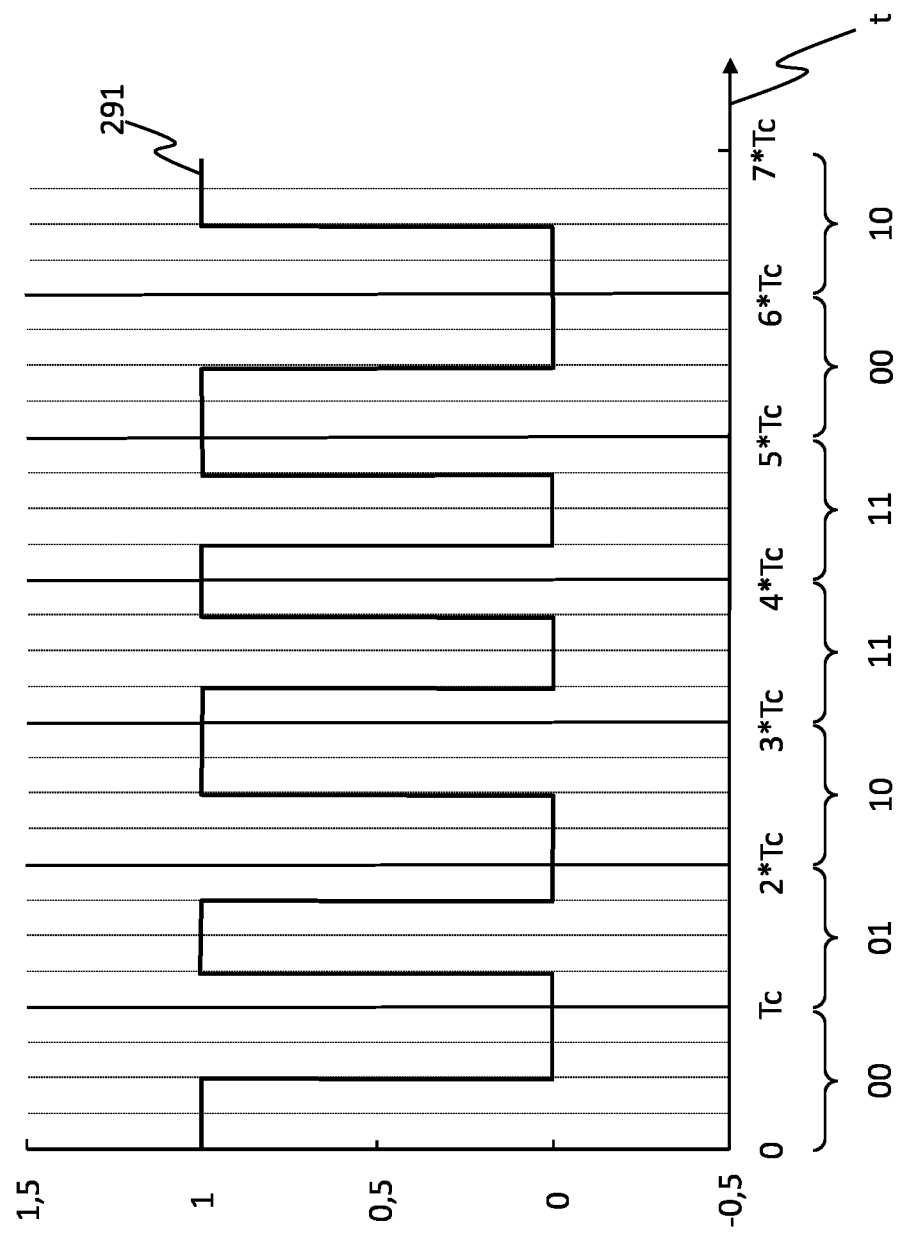
FIGS. 14 and 15 show control signal curves over times for short-circuiting the coil portion of the rotor coil.

To illustrate how a 4-PSK is carried out, FIG. 14 shows an exemplary first control signal curve 291 as a function of time t, which may be output in the rotor 200 by the controller 280 for controlling the switching device 271 (cf. FIG. 13) for the pulse-shaped loading of the rotor coil 240 by short-circuiting it. The first control signal curve 291 has an almost rectangular shape with two levels. Depending on whether the control signal is at the upper or lower of the two levels, the switching device 271 may be closed and thus the second coil portion 249 of the rotor coil 240 may be shorted, or the switching device 271 may be open and thus the second coil portion 249 may not be shorted. In an embodiment of the switching device 271 in the form of a transistor, the first control signal curve 291 may e.g. the time curve of a control voltage applied to the transistor. With reference to the first control signal curve 291, a notional magnitude scale is indicated on the ordinate. A clock period Tc of the carrier signal used for data transmission is shown on the abscissa.

With the aid of the first control curve 291 shown in FIG. 14, a user signal comprising four different symbols with the information content of a dibit is transmitted, which represent the logical states 00, 01, 10 or 11. The different symbols have four different phase positions with respect to the clock period Tc. FIG. 14 shows below the abscissa a possible assignment of the different phase positions to the logical states 00, 01, 10 and 11.

In FIG. 14 it is further indicated that each of the symbols has four subsections per clock period Tc, of which two subsections are occupied by the upper level of the control signal and two subsections by the lower level of the control signal. By "shifting" these subsections, the different symbols may be represented.

With reference to the data transmission from the rotor 200 to the stator 5, it may further be considered to perform the generation of data signals or symbols each extended to a predetermined length by sending the respective symbols multiple times with a predetermined repetition. The repetition may be five, for example. In this way, the information content of a symbol is transmitted by sending the relevant symbol several times in succession. Although this procedure leads to a reduction in the transmittable data rate, it allows for increasing the interference immunity and robustness of the data transmission.

Figure 15:
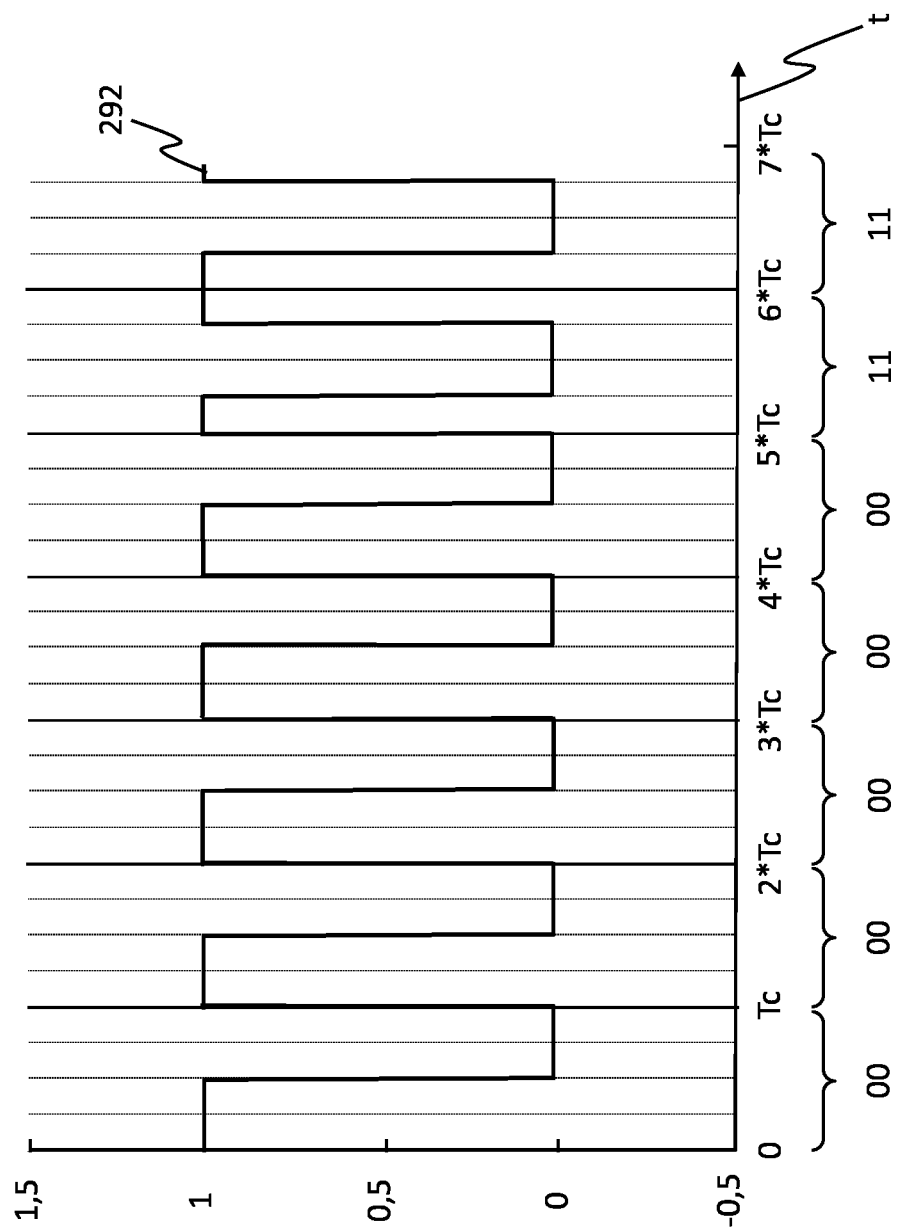

To illustrate the aforementioned embodiment, FIG. 15 shows an exemplary second control signal curve 292 as a function of time t, which may be output at the rotor 200 by the controller 280 for controlling the switching device 271 (cf. FIG. 13) for the pulse-shaped loading of the rotor coil 240. As shown in FIG. 15, the associated symbol is transmitted five times in succession to transmit the logical state 00.

For the stator 5 of the planar drive system 1, with regard to the data transmission from the rotor 200 to the stator 5, the embodiment described below may be applied in order to reliably detect and evaluate the increased current consumption of energized three-phase systems 150 caused by the loading of the rotor coil 240.

Figure 16:
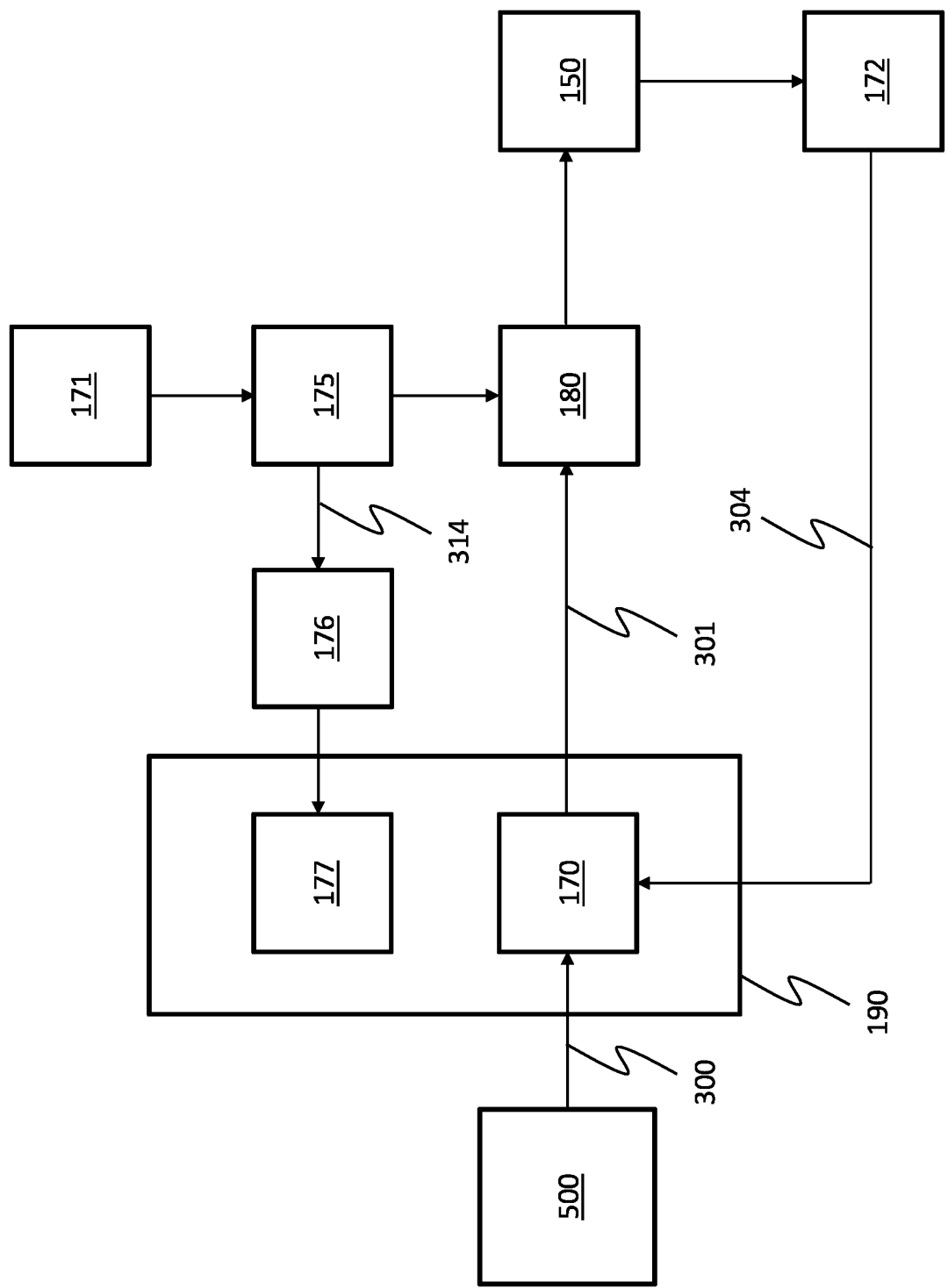
FIG. 16 shows a further control loop for current control of a coil system of the stator on the basis of pulse-width modulation, the stator additionally having a summation current measuring device, a bandpass filter and an evaluation device.

FIG. 16 shows a block diagram of a further control loop for current control of a three-phase system 150 of a stator module 10, as may be provided in the planar drive system 1. The control loop is based on the control loop shown in FIG. 11 and comprises, in addition to the primary controller 500, components described above such as a module controller 190, a current controller 170, an output stage device 180, an intermediate circuit 171, a three-phase system 150 and a current measuring device 172. With regard to details of these components, reference is made to the above description of FIG. 11.

According to FIG. 16, a summation current measuring device 175, a band-pass filter 176 and an evaluation device 177 are additionally used. The summation current measuring device 175, the bandpass filter 176 and the evaluation device 177 are components of the stator 5. In this context, it is possible that the or each stator module 10 of the stator 5 comprises a summation current measuring device 175, a bandpass filter 176 and an evaluation device 177.

As shown in FIG. 16, the summation current measuring device 175 is located between the intermediate circuit 171 and the output stage device 180. With respect to the above-described embodiment of a stator module 10 having an intermediate circuit 171 and a plurality (i.e., twenty-four) of output stage devices 180, the summation current measuring device 175 is located between the intermediate circuit 171 and all of the output stage devices 180 of the stator module 10 in question, and is connected to the intermediate circuit 171 and the output stage devices 180. As described above, the output stage devices 180 and thus the three-phase systems 150 are supplied with electrical energy from the intermediate circuit 171 of the stator module 10. Consequently, the summation current measuring device 175 may be used to measure the summation current of energized three-phase systems 150 of the stator module 10. The measured summation current is thereby related to the intermediate circuit 171 or the electrical power provided by the intermediate circuit 171. As was also described above, a plurality of three-phase systems 150 may be energized simultaneously. In this respect, the summation current may refer to the power consumption of the multiple three-phase systems 150 that are simultaneously energized.

The summation current measuring device 175 is further connected to the bandpass filter 176 downstream of the summation current measuring device 175, as shown in FIG. 16. The bandpass filter 176 is used to filter the measured summation current 314 provided by the summation current measuring device 175. As described above, the generation of data signals by the rotor 200 may be performed using modulation with the aid of a carrier signal having a corresponding carrier frequency. In accordance with this, the bandpass filter 176 has a passband in the range of the carrier frequency used. In this way, disturbance variables with frequencies outside the passband may be filtered out. This facilitates subsequent evaluation of the summation current.

The bandpass filter 176 is furthermore connected to the evaluation device 177 downstream of the bandpass filter 176, as shown in FIG. 16. The evaluation device 177, which may comprise an analog-to-digital converter, is embodied to process and evaluate the summation current measured and filtered by the bandpass filter 176. As shown in FIG. 16, the evaluation device 177 may be part of the module controller 190 of the relevant stator module 10.

As part of the evaluation, evaluation signals or evaluation data may be provided by the evaluation device 177 that reflect the data signals or symbols generated by the rotor 200. With reference to the above-described carrying out of the data transmission from the rotor 200 to the stator 5 by pulse-shaped loading of the rotor coil 240 for transmitting a carrier signal modulated with a user signal, the evaluation of the measured and filtered summation current by the evaluation device 177 may comprise carrying out of a correlation using at least one reference signal. In this context, measured current values of the summation current may be multiplied by the at least one reference signal for the length of a symbol in each case, and the products may be added up. In the case that a symbol is transmitted in repeated form several times in succession (cf. FIG. 15), the aforementioned length is the extended length of the symbol transmitted several times. The current measurement values may be provided in the context of the evaluation by the evaluation device 177 by virtue of sampling a measured and filtered summation current signal.

By carrying out the data transmission using modulation, it may be achieved that all components of a summation current signal on which the evaluation is based, except for the user signal itself, are uncorrelated to the reference signal. With the help of the correlation, a suppression of disturbance variables, which may be adjusted via the symbol length, and thus an improvement of the signal-to-noise ratio may be achieved. The at least one reference signal may be a periodic signal. The reference signal may also have a frequency tuned to the carrier frequency of the carrier signal or a frequency corresponding to the carrier frequency.

In this context, the use of the alternating magnetic field generated by the stator 5 as described above may be used as a reference clock. For this purpose, the evaluation of the measured and filtered summation current carried out by the evaluation device 177 may be timed to the alternating magnetic field of the stator 5, and thus timed to the pulse-width modulated energization of three-phase systems 150 of the stator 5. In this way, the reference signal may be synchronized as well as possible to the carrier signal.

The primary controller 500 of the planar drive system 1 (cf. FIG. 16) may also be partially involved in the evaluation. For this purpose, the planar drive system 1 may be embodied in such a way that the evaluation signals generated by the evaluation device 177, and in the case of an embodiment of the stator 5 with a plurality of stator modules 10, the evaluation signals generated by one or by a plurality of evaluation devices of the respective stator modules 5 are transmitted to the primary controller 500. Based on this, further processing of the evaluation signals coming from the stator 5 may be performed with the aid of the primary controller 500 in order to determine the data signals or symbols generated by the rotor 200.

Figure 17:
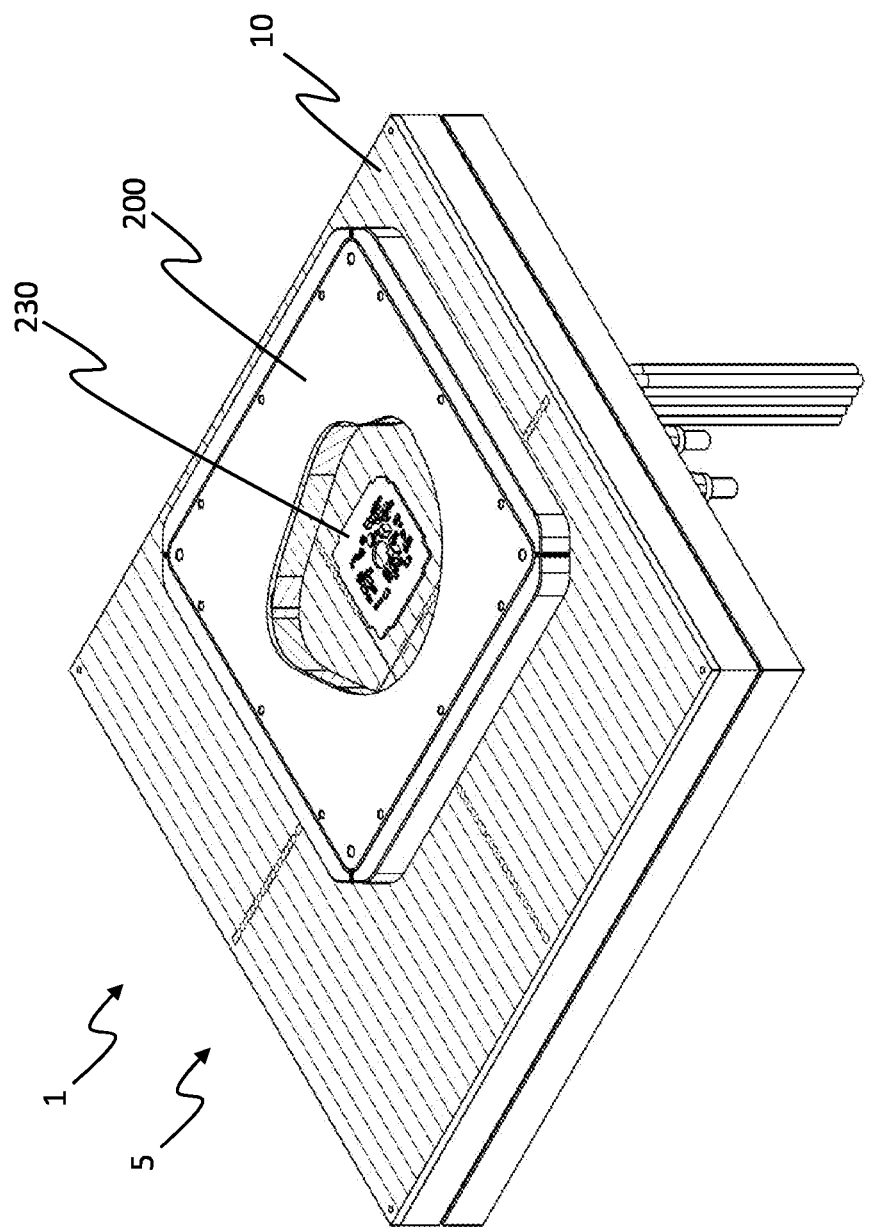
FIG. 17 is a perspective view of the stator module and of the rotor, with the printed circuit board of the rotor shown in a partially sectional view of the rotor.
Figure 18:
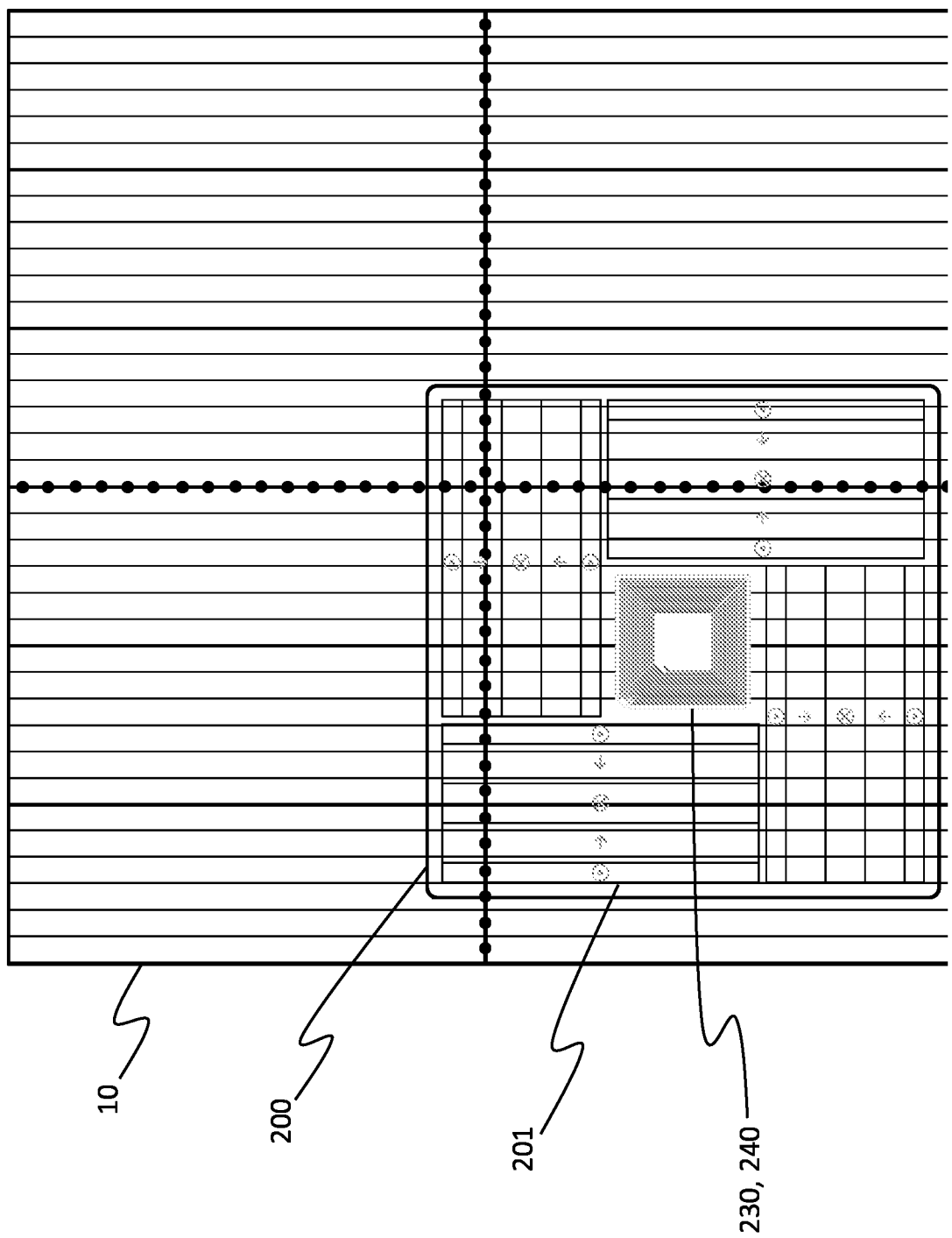
FIG. 18 is a top view of the stator module and of the rotor.

As explained above with reference to FIG. 3, the rotor 200 may comprise a first printed circuit board 230 comprising the rotor coil 240, which is arranged in the area surrounded by the rotor magnets 216 of the magnet device 201 of the rotor 200. In this manner, the first circuit board 230 and the rotor coil 240 may be integrated into the rotor 200 with relative ease. To further illustrate this embodiment, FIG. 17 shows a perspective view of the or a stator module 10 of the stator 5 and the rotor 200, wherein the rotor 200 is shown in a partially sectional view. Based on this illustration, a possible size and location of the first circuit board 230 of the rotor 200 become apparent. In the present case, the first printed circuit board 230 has a rectangular or square contour. Also, for illustrative purposes, FIG. 18 shows a top view of the stator module 10 and the rotor 200, wherein contours of the magnet device 201, the first printed circuit board 230 and the rotor coil 240 of the rotor 200 are shown. The other components of the rotor 200 described with reference to FIG. 13, such as the rectifier 260, the smoothing capacitor 266, the load resistor 272, the switching device 271, the controller 280, and the voltage measuring device 281, may be components of the first circuit board 230 and/or arranged on the first circuit board 230 in a corresponding manner.

The first circuit board 230 shown in FIGS. 3, 17 and 18 may e.g. have a thickness of 1 mm. Furthermore, the first circuit board 230 may be multi-layered, and may comprise a plurality of stacked and electrically interconnected spiral metallic conductor tracks. The rotor coil 240 may be formed by the interconnected spiral-shaped conductor tracks. This embodiment may allow for effective inductive energy transfer from the stator 5 to the rotor 200.

Figure 19:
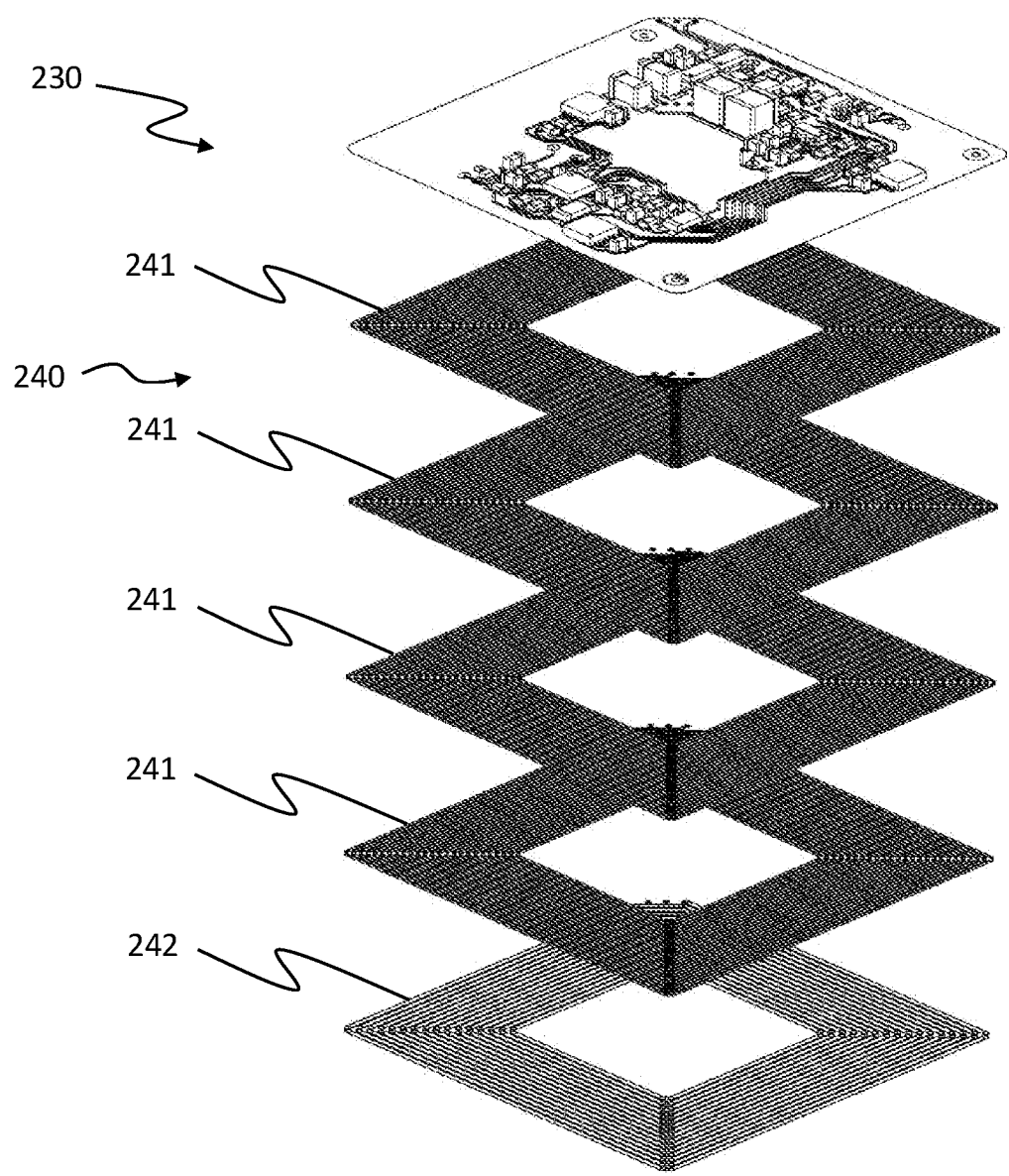
FIG. 19 is an exploded view of the printed circuit board of the rotor of FIG. 17 having a rotor coil which has spiral-shaped conductor tracks arranged in several layers.

As an exemplary illustration of this embodiment, FIG. 19 shows an exploded view of components of the first printed circuit board 230. The first printed circuit board 230 comprises a plurality of spiral first conductor tracks 241 arranged in different layers of the first printed circuit board 230 and a spiral second conductor track 242 arranged in a lowermost layer. The first conductor tracks 241 and the second conductor track 242 may be electrically connected in series via electrical vertical interconnection structures of the first printed circuit board 230. With reference to the embodiment of the rotor coil 240 with the first coil portion 248 and the second coil portion 249 described with reference to FIG. 13, the second coil portion 249 provided for short-circuiting may be formed by the second conductor track 242, and the first coil portion 248 may be formed by the first conductor tracks 241.

In operation of the planar drive system 1, the lowest spiral-shaped second conductor track 242 may face the stator 5 and have the smallest distance to the stator 5 and to its three-phase systems 150 compared to the spiral-shaped first conductor tracks 241. In this way, there may be a high inductive coupling between the second conductor track 242 of the rotor coil 240 used for short-circuiting and energized three-phase systems 150 of the stator 5. As a result, the energy extraction from the alternating magnetic field of the stator 5 achieved with the short-circuiting of the second conductor track 242, and thus the increase in the current extraction from energized three-phase systems 150 of the stator 5, may be as large as possible. This favors the evaluation of the summation current carried out at the stator 5.

Figure 20:
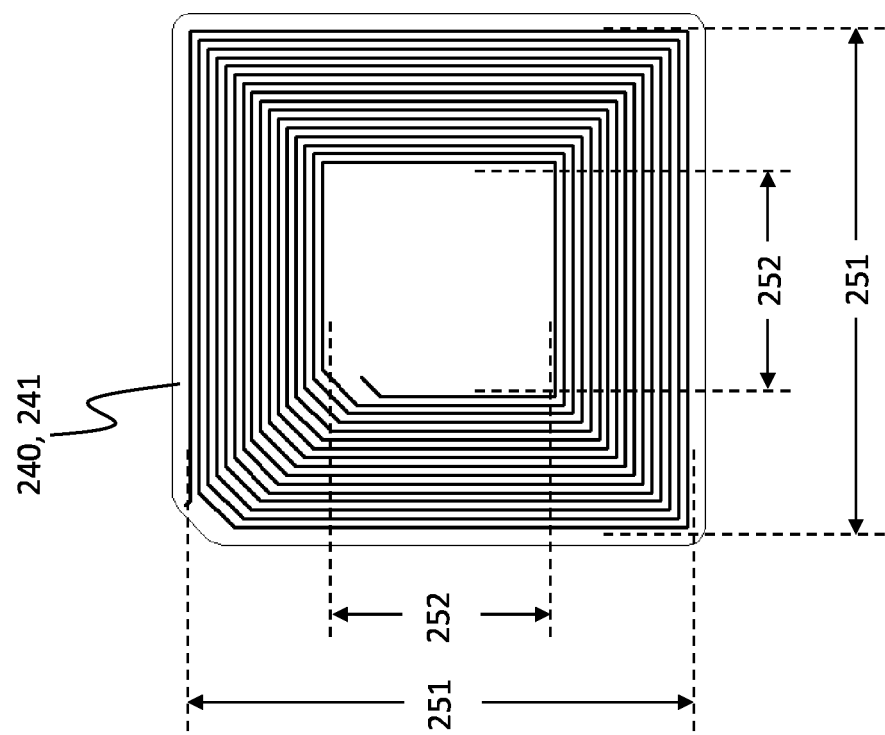
FIG. 20 is a top view of a spiral-shaped conductor track.

FIG. 20 shows a top view of a spiral-shaped first conductor track 241 of the rotor coil 240, as may be provided on the first circuit board 230. The first conductor track 241 has a substantially rectangular or square outer contour, and encloses a substantially rectangular or square inner region. Also, the first conductor track 241 comprises a relatively high number of windings. FIG. 20 further indicates an outer width 251 relating to the outer contour and an inner width 252 relating to the inner contour of the first conductor track 241. Here, the outer width 251 may e.g. be 0.85 L, and the inner width 252 may be 0.4 L, for example. The variable L may be a width of a three-phase system 150 or a stator segment 120, 121, and may correspond to the segment width 127 shown in FIGS. 6 and 7. The structure shown in FIG. 20 may apply with respect to all of the spiral-shaped first conductor tracks 241 of the first printed circuit board 230. This may also apply to the spiral-shaped second conductor tracks 242 used for short-circuiting, which may be formed to correspond to the first conductor tracks 241.

Figure 21:
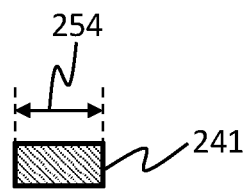
FIG. 21 shows different conductor cross-sections of conductor tracks.
Figure 21:
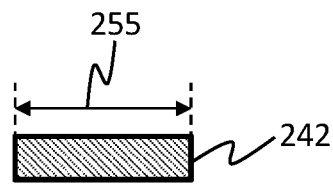

Alternatively, it may be considered to embody the rotor coil 240 in such a way that in the second coil portion 249 provided for short-circuiting or in the case of the spiral-shaped second conductor track 242, a larger conductor cross-section is provided than in the first coil portion 248 or in the case of the spiral-shaped first conductor tracks 241. For illustration purposes, FIG. 21 shows examples of possible conductor cross-sections as they may be provided for the first conductor tracks 241 and for the second conductor track 242 of the rotor coil 240. The first and second conductor paths 241, 242 shown in cross-section in FIG. 21 have the same thickness, but different widths. A first track width 254 of the first conductor track 241 is smaller than a second track width 255 of the second conductor track 242. For example, the second track width 255 may be twice as large as the first track width 254. Because of the larger second track width 254, the second conductor track 242 used for short-circuiting may have a higher coil quality compared to the first conductor tracks 241. In this way, as well, a presence of a high inductive coupling between the second conductor track 242 of the rotor coil 240 used for short-circuiting and energized three-phase systems 150 of the stator 5 may be provided. Due to the larger second conductor track width 254, the second conductor track 242 may have a lower number of windings than the first conductor tracks 241.

The planar drive system 1 may be configured not only to enable data transmission from the rotor 200 to the stator 5, but also to enable data transmission from the stator 5 to the rotor 200. In this context, embodiments described below may be used.

The data communication from the stator 5 to the rotor 200 may be based on temporarily influencing the energization of at least one energized three-phase system 150 of the stator 5. This may cause a change with respect to the alternating magnetic field generated by the stator 5, and thereby to the alternating voltage induced in the rotor coil 240 of the rotor 200. By influencing the current in a temporary or pulsed manner, a temporary or pulsed change in the induction voltage in the rotor coil 240 of the rotor 200 may be caused in a corresponding manner, and based thereon a user signal or symbols may be transmitted from the stator 5 to the rotor 200. By measuring the induction voltage, which may be done as indicated above using the voltage measuring device 281 of the rotor 200 (cf. FIG. 13), and by performing a corresponding evaluation, conclusions may be drawn about the data signals generated by the stator 5.

Figure 22:
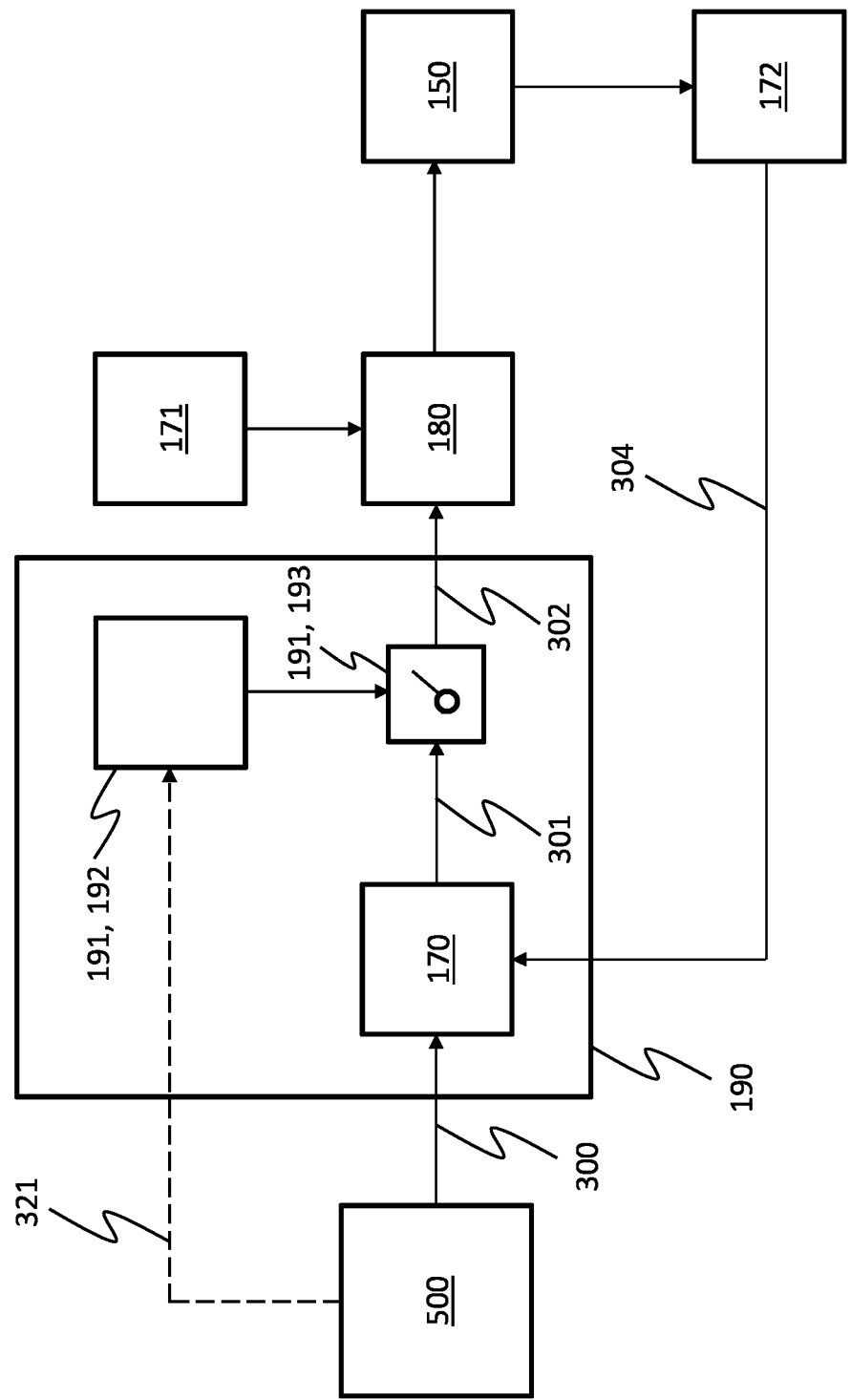
FIG. 22 shows a further control loop for current control of a coil system of the stator on the basis of pulse-width modulation, wherein the stator has an additional influencing device for influencing the current control.

For further illustration, FIG. 22 shows a block diagram of a further control loop for current control of a three-phase system 150 of a stator module 10, as may be provided in the planar drive system 1 for data transmission from the stator 5 to the rotor 200. The control loop is based on the control loop shown in FIG. 11 and comprises, in addition to the primary controller 500, components described above such as a module controller 190, a current controller 170, an output stage device 180, an intermediate circuit 171, a three-phase system 150 and a current measuring device 172. Further components explained on the basis of the control circuit of FIG. 16, such as a summation current measuring device 175, a band-pass filter 176 and an evaluation device 177, which are used in the context of data transmission from the rotor 200 to the stator 5 may be present in a corresponding manner in the control circuit of FIG. 22. With regard to details of the components already described, reference is made to the above description of FIGS. 11 and 16.

According to FIG. 22, a first influencing device 191 is further used, which, as shown in FIG. 22, may be part of the module controller 190. The first influencing device 191 is used for temporarily influencing the current control of the three-phase system 150. The first influencing device 191 may be controlled by the primary controller 500 of the planar drive system 1, and thereby activated and put into operation. When the first influencing device 191 is not activated, the current control of the three-phase system 150 is performed in the manner described above, as explained with reference to FIG. 11.

In contrast, in the operation of the first influencing device 191 used for data transmission, the current control of the three-phase system 150 is temporarily influenced in such a way that the occurrence of the ripple current in the three-phase system 150 is temporarily suppressed. In this way, it may be achieved that the generation of an alternating magnetic field associated with the ripple current, and thus the induction of an alternating electric voltage in the rotor coil 240 of the rotor 200, is temporarily suppressed or essentially suppressed. As a result of the interference, therefore, no induction voltage or only a small or negligible induction voltage is generated in the rotor coil 240.

According to the embodiment shown in FIG. 22, the first influencing device 191 comprises a data controller 192 and an interrupting device 193. Via the interrupting device 193, the transmission of control signals 301 output by the current controller 170 for the output stage device 180 is temporarily interrupted so that the control signals 301 are no longer applied to the output stage device 180. This serves the purpose of causing an influenced mode of operation of the output stage device 180 and thus of the three-phase system 150, in which the occurrence of the ripple current in the three-phase system 150 as indicated above temporarily ceases. For this purpose, as shown in FIG. 22, modified control signals 302 may be generated by the interrupting device 193 and applied to the output stage device 180.

The interruption of the control signals 301 generated by the current controller 170 and the output of modified control signals 302 effected by the interrupting device 193 is controlled by the data controller 192 of the first influencing device 191, which controls the interrupting device 193 for this purpose and applies corresponding control signals to the interrupting device 193. This process is initiated by the primary controller 500 of the planar drive system 1, which transmits data signals 321 relating to the data transmission from the stator 5 to the rotor 200 to the data controller 192. Based on the data signals 321, the data controller 192 appropriately controls the interrupting device 193 to thereby temporarily cause suppression of the ripple current in the three-phase system 150. In other words, the data signals 321 output from the primary controller 500 are converted into control signals used for driving the interrupting device 193 via the data controller 192.

The temporary suppression of the ripple current effected in this way with the aid of the first influencing device 191 may take place for one or for a plurality of PWM period durations in each case. In this way, an addition of a current component or DC current component to the current regulated in the three-phase system 150, and a disturbance of the current regulation associated therewith, may be prevented.

The temporary suppression of the ripple current in the three-phase system 150 may be achieved in different ways with the aid of the first influencing device 191. One possible variant is to suppress application of voltage pulses to the three-phase system 150, so that voltage pulses are switched off or omitted. Alternatively, it is possible to apply voltage pulses with matching pulse width to the three-phase system 150 when applying center-aligned voltage pulses to the three-phase system 150.

Figure 23:
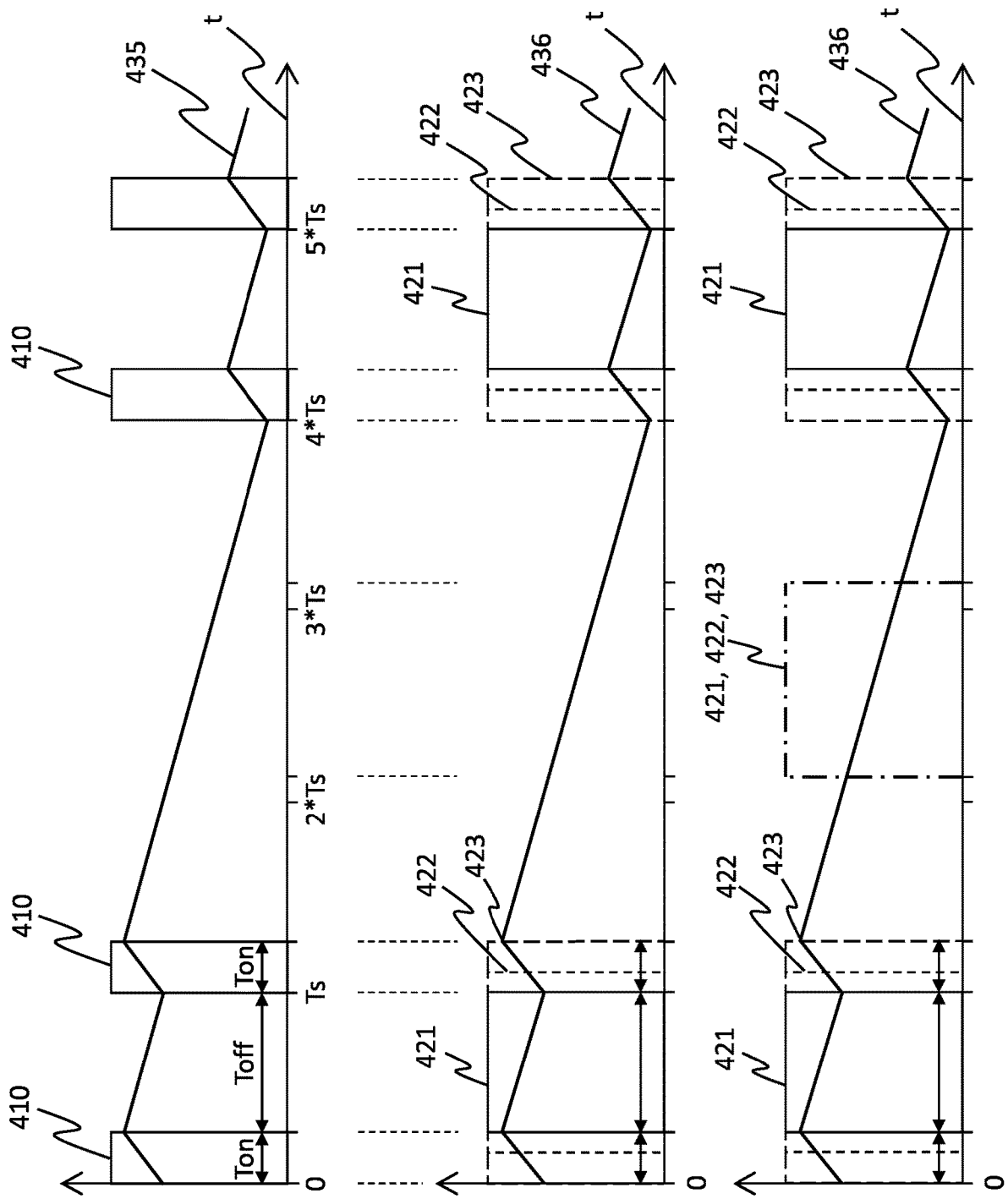
FIG. 23 shows voltage and current curves over time for pulse-width modulated energization of a coil system, wherein an influence by the influencing device is shown.

For further illustration of a temporary influencing of the current control, FIG. 23 shows possible electrical voltage and current characteristics as a function of time t, as they may occur with a pulse-width modulated electrical control of coil systems, including an influencing that may be achieved with the aid of the first influencing device 191. The upper diagram of FIG. 23, corresponding to FIG. 12, shows, for simplification, conditions for controlling a single-phase coil system with only one coil. The upper diagram of FIG. 23 may also be used as an equivalent diagram for a three-phase coil system. The middle and lower diagrams of FIG. 23 refer to the control of a three-phase coil system with three coils, as may be used in a three-phase system 150 of the planar drive system 1. As described above with reference to FIG. 12, the control is based on center-aligned pulse-width modulation.

According to the upper diagram of FIG. 23, first voltage pulses 410 are applied to the coil system, and furthermore, the electrical control of the coil system is influenced so that a third current curve 435 is provided. In the region of the first voltage pulses 410, the current follows the first voltage pulses 410, so that the third current curve 435 has a triangular appearance in this region, as explained above with reference to FIG. 12 with reference to the first current curve 430. According to the example shown in FIG. 23, the influencing of the control of the coil system extends over two PWM clock periods, i.e. in the present case from time 2*Ts to time 4*Ts, wherein two first voltage pulses 410 are omitted. This process may also be referred to as blanking the first voltage pulses 410. The effect of the influencing is that there is no ripple current during the influenced period. Due to an inertia of the coil system, a current flow with a decreasing current amount is still present in the influenced time period, as may be seen from the third current curve 435.

The middle diagram of FIG. 23 shows the corresponding conditions for controlling and influencing a three-phase coil system. The coil system is supplied with center-aligned second, third and fourth voltage pulses 421, 422, 423 with different pulse widths. Furthermore, there is an influence on the electrical drive of the coil system such that there is a fourth current curve 436. The fourth current curve 436 relates to one of the three coils of the three-phase coil system. In the region of the second to fourth voltage pulses 421, 422, 423, i.e. where the associated three drive voltages are not at the same (upper or lower) voltage level, there is an increase in the amount of current and the current follows the drive voltages so that the fourth current curve 436 has a triangular appearance in this region as explained above with reference to FIG. 12 with reference to the second current curve 431.

In the middle diagram of FIG. 23, the control and its influencing are carried out according to the upper diagram of FIG. 23, so that the fourth current curve 436 in the three-phase coil system corresponds to the third current curve 435 in the single-phase coil system. The influencing by blanking is carried out in such a way that a second, third and fourth voltage pulse 421, 422, 423 are omitted in the influenced period. As a result, there is no increase in the current amount and thus no ripple current in the influenced period. Due to the inertia of the coil system, a current flow with decreasing current amount is still present in the influenced period, as shown for the fourth current curve 436. For the two other coils of the three-phase coil system, corresponding current curves for the fourth current curve 436 are provided. Here, too, the current amount is increased in each case if all three drive voltages are not at the same voltage level, and otherwise the current amount is reduced.

As described above with reference to FIG. 22, in order to influence the current control for temporarily suppressing the ripple current in a three-phase system 150, modified control signals 302 may be applied to an associated output stage device 180 with the aid of the interrupting device 193. Influencing current control to blank out second to fourth voltage pulses 421, 422, 423 according to the middle diagram of FIG. 23 may be done as follows. With reference to the output stage device 180 shown in FIG. 10, the modified control signals 302 may be used, e.g. to cause the first to sixth switches 181, 182, 183, 184, 185, 186 to be temporarily actuated such that the second switch 182, the fourth switch 184 and the sixth switch 186 are closed, and the first switch 181, the third switch 183 and the fifth switch 185 are open. Alternatively, using the changed control signals 302, an operating mode may be temporarily caused in which the first switch 181, the third switch 183, and the fifth switch 185 are closed, and the second switch 182, the fourth switch 184, and the sixth switch 186 are open. By such control, blanking of second to fourth voltage pulses 421, 422, 423, respectively, may be obtained.

The blanking of voltage pulses offers the possibility of reducing or suppressing parasitic capacitive couplings between the stator 5 and the rotor 200. This favors a measurement of the AC voltage induced in the rotor coil 240 performed at the rotor 200 as part of the data transmission from the stator 5 to the rotor 200.

The lower diagram of FIG. 23 illustrates the alternative approach mentioned above of generating voltage pulses with matching pulse widths instead of blanking voltage pulses. In this way, as well, the influenced fourth current curve 436 may be caused in the three-phase coil system in question. In this case, the influencing of the current control is done in such a way that a second, third and fourth voltage pulse 421, 422, 423 with matching pulse widths are applied to the coil system in the influenced period. In this way, the associated three drive voltages are at the same upper voltage level, which results in an absence of magnification of the current amount, and thus an absence of ripple current. In the influenced period, a current flow with decreasing current amount is still present here as well, due to the inertia of the coil system. For the two other coils of the three-phase coil system, current curves corresponding to the fourth current curve 436 are provided.

Influencing the current control according to the lower diagram of FIG. 23 may also be achieved by modified control signals 302, which may be generated by the interrupting device 193 and applied to a corresponding output stage device 180 or its switches 181, 182, 183, 184, 185, 186 (cf. FIGS. 10 and 22).

As described above, the first influencing device 191 shown in FIG. 22 may be activated or controlled by the primary controller 500 of the planar drive system 1 as part of the data transmission from the stator 5 to the rotor 200. Based on this, the first influencing device 191 may influence the current control of the three-phase system 150 shown in FIG. 22 temporarily or for defined periods of time. In this way, the ripple current in the three-phase system 150, and thus the generation of an alternating magnetic field caused by the ripple current, and in this way the induction of an alternating electrical voltage in the rotor coil 240 of the rotor 200 may be temporarily (essentially) suppressed.

With reference to the control loop shown in FIG. 22, it is possible that the or each stator module 10 of the stator 5 comprises a single first influencing device 191. In this case, the first influencing device 191 of a stator module 10 may be embodied and used in the manner described above to temporarily interrupt the control signals 301 generated by at least one current controller 170 of the associated stator module 10 and to temporarily cause an influenced mode of operation of at least one output stage device 180, and thus a suppression of the ripple current in at least one three-phase system 150 of the stator module 10. It is also possible that the stator 5 comprises a separate first influencing device 191 for each three-phase system 150 and thus each current controller 170 and each output stage device 180. In this embodiment, the or each stator module 10 may comprise twenty-four first influencing devices 191, each of which may be used to influence the current control of a respective three-phase system 150. The first influencing device 191 or the plurality of first influencing devices 191 of a stator module 10 may be integrated into the associated module controller 190, as shown in FIG. 22.

As has been described above, a plurality of three-phase systems 150 of the stator 5, which may be components of a plurality of adjacent stator modules 10, may be energized simultaneously. In this respect, it is possible to temporarily influence the current control of one or also of a plurality of or all of the energized three-phase systems 150 for the purpose of data transmission from the stator 5 to the rotor 200 using one or a plurality of first influencing devices 191. This may be initiated and controlled by the primary controller 500 by the primary controller transmitting appropriate data signals 321 to the one or a plurality of first influencing devices 191 for activation and actuation. In the case of influencing current control of a plurality of energized three-phase systems 150, the influencing may be synchronized in time with one another. In the operation of one or of a plurality of first influencing devices 191, the ripple current in one or in a plurality of three-phase systems 150 may be temporarily suppressed. In a corresponding manner, the generation of an alternating magnetic field associated with the ripple current, and thus the induction of an alternating electrical voltage in the rotor coil 240 of the rotor 200, may be temporarily (essentially) suppressed. Based thereon, corresponding data signals may be transmitted from the stator 5 to the rotor 200.

With reference to the rotor 200 of the planar drive system 1, a measurement of the AC voltage induced in the rotor coil 240 takes place within the framework of the data transmission from the stator 5 to the rotor 200 in order to detect, based on this, the temporary influencing of the current control of at least one three-phase system 150 of the stator 5. Furthermore, a corresponding evaluation is carried out in order to determine data signals or symbols which may be generated by the stator 5 as a result of the interference which is carried out temporarily or in the form of a pulse. By influencing the current control, a change may be caused with respect to the AC voltage induced in the rotor coil 240. As indicated above, it may be achieved in this regard that the voltage induction is suppressed and no AC voltage is induced in the rotor coil 240. It is also possible that the voltage induction is essentially suppressed as a result of the interference, causing only a relatively small or negligible AC voltage to be induced in the rotor coil 240.

For the purpose of voltage measurement and evaluation, the components of the rotor 200 described above with reference to FIG. 13, i.e. the voltage measuring device 281 connected to the rotor coil 240 and the controller 280, may be used. Here, the voltage measuring device 281 is used to measure the AC electrical voltage induced in the rotor coil 240. The voltage measuring device 281 is connected to the controller 280, so that corresponding measurement signals of the AC voltage may be transmitted from the voltage measuring device 281 to the controller 280 for processing and evaluation. By evaluating the measurement signals, the controller 280 may detect the change with respect to the induction voltage caused by the temporary influence of the current flowing from at least one three-phase system 150 of the stator 5, and determine the data signals or symbols generated by the stator 5 based thereon.

As described above, the change may be to temporarily suppress or substantially suppress the induction of the AC voltage. The controller 280 of the rotor 200 used for evaluation may comprise an analog-to-digital converter and a threshold separator, wherein the change or suppression of the induction voltage, and thus an influence on the current applied to the stator 5 for generating a transmission pulse, may be detected.

With reference to the data transmission from the stator 5 to the rotor 200, compared to the data transmission from the rotor 200 to the stator 5 performed by load modulation, a stronger or much stronger transmission signal may be generated. Therefore, data transmission in this transmission direction may be performed without modulating a user signal to a carrier signal as described above.

The data transmission from the stator 5 to the rotor 200 may nevertheless also be carried out using modulation, in that the temporary influencing of the current control of at least one three-phase system 150 described above is carried out in modulated form with the aid of at least one first influencing device 191. Hereby, the security of the data transmission may be favored. To this end, at least one first influencing device 191 may be controlled by the primary controller 500 of the planar drive system to influence the energization of at least one three-phase system 150 in modulated form. Aspects and details described above with reference to performing data transmission from the rotor 200 to the stator 5 using modulation may also be applied here in a corresponding manner.

For example, the modulation used may be phase modulation, amplitude modulation or frequency modulation. The influence on the current may be modulated in such a way that a carrier signal or a carrier frequency is transmitted which is modulated with a user signal. The user signal comprises the data signals or symbols intended for transmission. The carrier frequency may be in the kHz range. For example, the frequency range from 1 kHz to 2 kHz is possible. The carrier signal generated by the stator 5 and modulated with the user information or signal may be included in the AC voltage measured at the rotor 200. Consequently, by evaluating the measured AC voltage, the user signal may be inferred.

With regard to amplitude modulation, e.g. a carrier signal with a carrier frequency of 1 kHz or 2 kHz may be used. For data transmission, either transmission of the carrier signal by pulse-shaped influencing of the current control of at least one three-phase system 150 or non-transmission of the carrier signal, in that no influencing is carried out, may take place. In this case, the logic state 0 may be transmitted by pulsed influencing for a predetermined period of time, and the logic state 1 may be transmitted by not influencing for the predetermined period of time (or vice versa).

In the case of frequency modulation, a carrier signal with a carrier frequency of 1 kHz or 2 kHz may also be used, for example. For realizing the data transmission, either the carrier signal with the carrier frequency of 1 kHz or 2 kHz, or a modulated carrier signal with a changed, i.e. higher or lower frequency of e.g. 2 kHz or 1 kHz, may be transmitted. For this purpose, the energization of at least one three-phase system 150 may be influenced in a pulse-shaped manner corresponding thereto. For example, the logic state 0 may be transmitted by pulsed influencing with the carrier frequency for a predetermined period of time, and the logic state 1 may be transmitted by pulsed influencing with the changed frequency for the predetermined period of time (or vice versa). A larger number of different frequencies and thus e.g. a 4-FSK may be used.

With regard to phase modulation, a carrier signal with a carrier frequency of 1 kHz or 2 kHz may be used in a corresponding manner. The data transmission may be carried out by transmitting the carrier signal in different phase positions by influencing the energization of at least one three-phase system 150 in a corresponding pulse shape. For example, two different phase positions are possible, so that a 2-PSK is provided, or a different number of different phase positions, such as four different phase positions, so that a 4-PSK is used.

In order to increase the interference immunity, it may also be considered with respect to the data transmission from the stator 5 to the rotor 200 to perform the generation of data signals or symbols each extended to a predetermined length by transmitting the respective symbols several times with a predetermined repetition. In this way, the information content of a symbol is transmitted by sending the relevant symbol several times in succession.

Carrying out the data transmission from the stator 5 to the rotor 200 using modulation is associated, in addition to analog-to-digital conversion, with more complex signal processing as part of the evaluation by the controller 280 of the rotor 200 (cf. FIG. 13). The evaluation may comprise a correlation using at least one reference signal. In this case, measured values of the induction voltage sampled for the length of a symbol may be multiplied by the at least one reference signal, and the products may be summed up. The at least one reference signal may be a periodic signal.

In the following, further possible or alternative embodiments will be discussed which may be considered with respect to the planar drive system 1 and its components. With regard to aspects and details already described, which may be applied analogously in these embodiments, reference is made to the above description.

Figure 24:
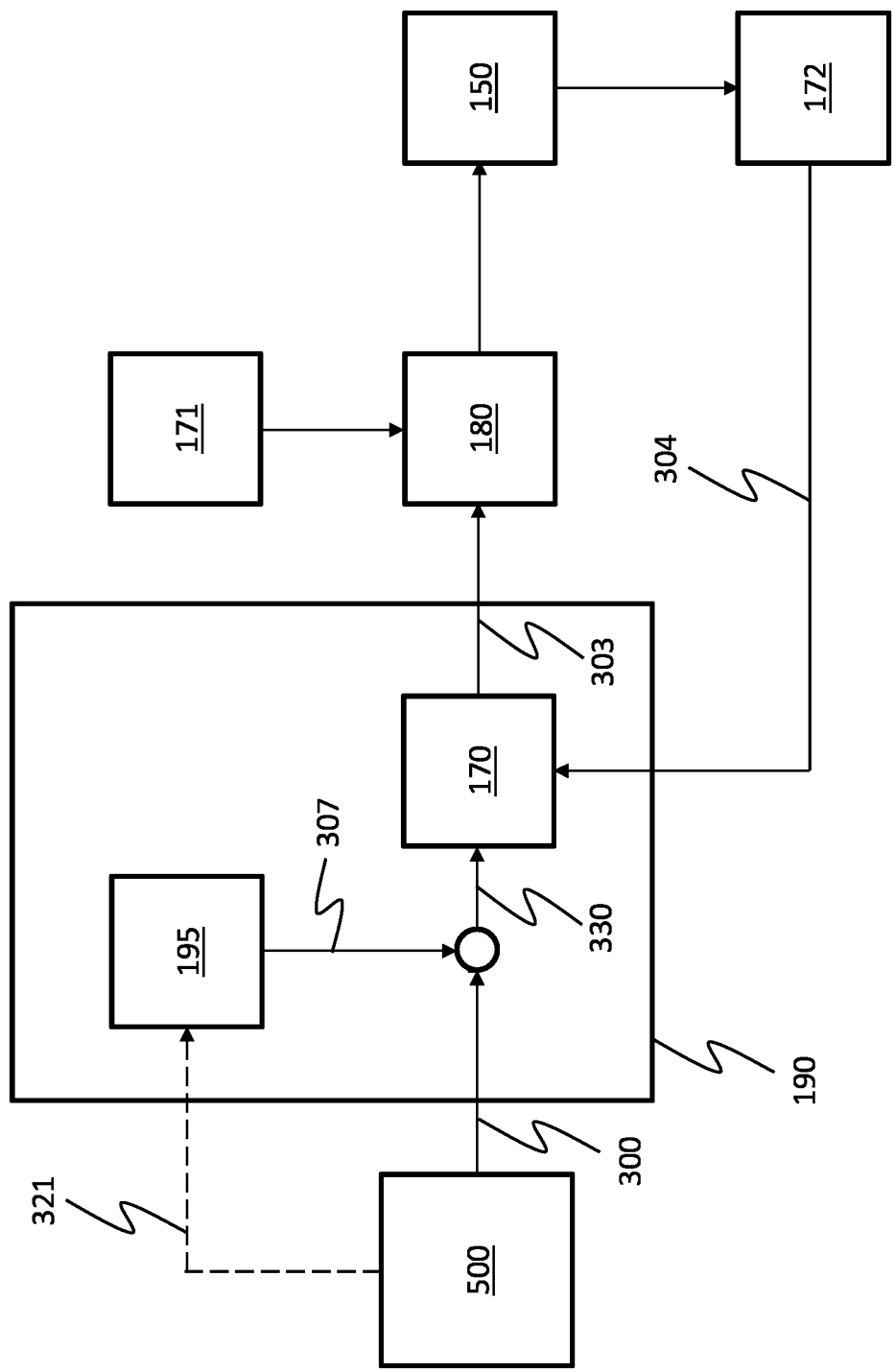
FIGS. 24 and 25 show further control loops for current control of a coil system of the stator based on pulse-width modulation including further embodiments of an influencing device.

With reference to the stator 5, for example, provision may be made to carry out the temporary influencing of the current of at least one three-phase system 150 with an alternative embodiment of an influencing device. By way of illustration, FIG. 24 shows a modified embodiment, compared to FIG. 22, of a control loop for controlling the current of a three-phase system 150 of a stator module 10, such as may be provided in the planar drive system 1 for transmitting data from the stator 5 to the rotor 200. The control loop is also based on the control loop shown in FIG. 11.

According to FIG. 24, a second influencing device 195, which may be integrated with the module controller 190, is used to temporarily influence or change target current values 300 used in current control. In operation of the second influencing device 195, as shown in FIG. 24, influencing signals 307 may be generated by the second influencing device 195 which are added to the target current values 300 output from the primary controller 500. The effect of adding the influencing signals 307 to the target current values 300 is to transmit influenced or modified target current values 330 to the current controller 170. It is also possible that the second influencing device 195 itself generates modified target current values 330 and transmits them to the current controller 170. In each case, this results in modified control signals 303 being generated by the current controller 170 and applied to the output stage device 180, causing a temporary influence on the current control of the three-phase system 150, and thus a change in the induction voltage detectable at the rotor 200. The second influencing device 195 is also controlled by the primary controller 500, which may transmit corresponding data signals 321 to the second influencing device 195 for this purpose.

Figure 25:
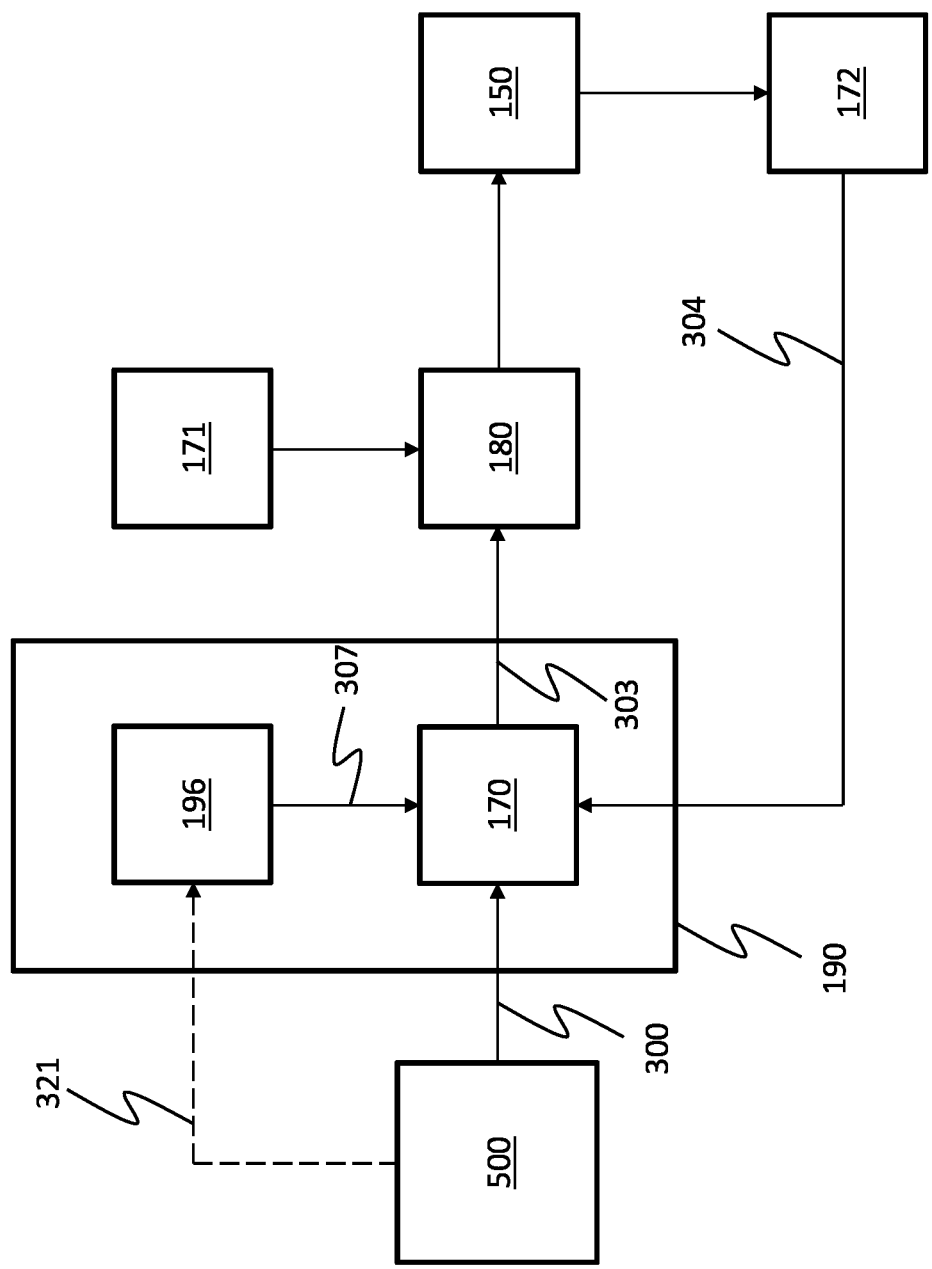

FIG. 25 shows a further modified embodiment of a control loop for current control of a three-phase system 150 of a stator module 10, as it may be used in the planar drive system 1 for data transmission from the stator 5 to the rotor 200. The control loop is also based on the control loop shown in FIG. 11.

According to FIG. 25, a third influencing device 196 is used, which may be integrated in the module controller 190, and which is provided for directly temporarily influencing the current controller 170. During operation of the third influencing device 196, influencing signals 307 are generated by the third influencing device 196 and transmitted to the current controller 170. As a result, the current controller 170 generates and applies modified control signals 303 to the output stage device 180, thereby temporarily influencing the current control of the three-phase system 150, and thus causing a change in the induction voltage detectable at the rotor 200. The third influencing device 196 is also controlled by the primary controller 500, which may transmit corresponding data signals 321 to the third influencing device 196 for this purpose.

For example, influencing the energization carried out by the second or third influencing device 195, 196 may result in an increased or decreased ripple current being induced in the three-phase system 150 due to the changed control signals 303, which has an increased or decreased oscillation width compared to the uninfluenced state. In a corresponding manner, a weaker or stronger alternating magnetic field may thereby be produced by the stator 5, and a smaller or larger alternating electric voltage may thereby be induced in the rotor coil 240 of the rotor 200. This may also be detected as part of the voltage measurement and evaluation described above and performed on the rotor 200.

In accordance with the above description of the first influencing device 191, it is possible that the or each stator module 10 of the stator 5 has a single second or third influencing device 195, 196, with the aid of which the mode of operation of one or of a plurality of current controllers 170 and output stage devices 180 may be acted upon, and thus the current flowing through one or a plurality of three-phase systems 150 may be temporarily influenced. It is also possible for the stator 5 to comprise a separate second or third influencing device 195, 196 for each three-phase system 150. With the aid of one or of a plurality of second or third influencing devices 195, 196, the energization of one or of a plurality of energized three-phase systems 150, and thereby the induction of an AC voltage in the rotor coil 240 of the rotor 200, may be temporarily influenced. This may be initiated and controlled by the primary controller 500. It is furthermore possible to perform the temporary influencing of the current flowing through one or a plurality of three-phase systems 150 using one or a plurality of second or third influencing devices 195, 196 in modulated form, i.e., using modulation such as phase modulation, amplitude modulation, or frequency modulation.

Figure 26:
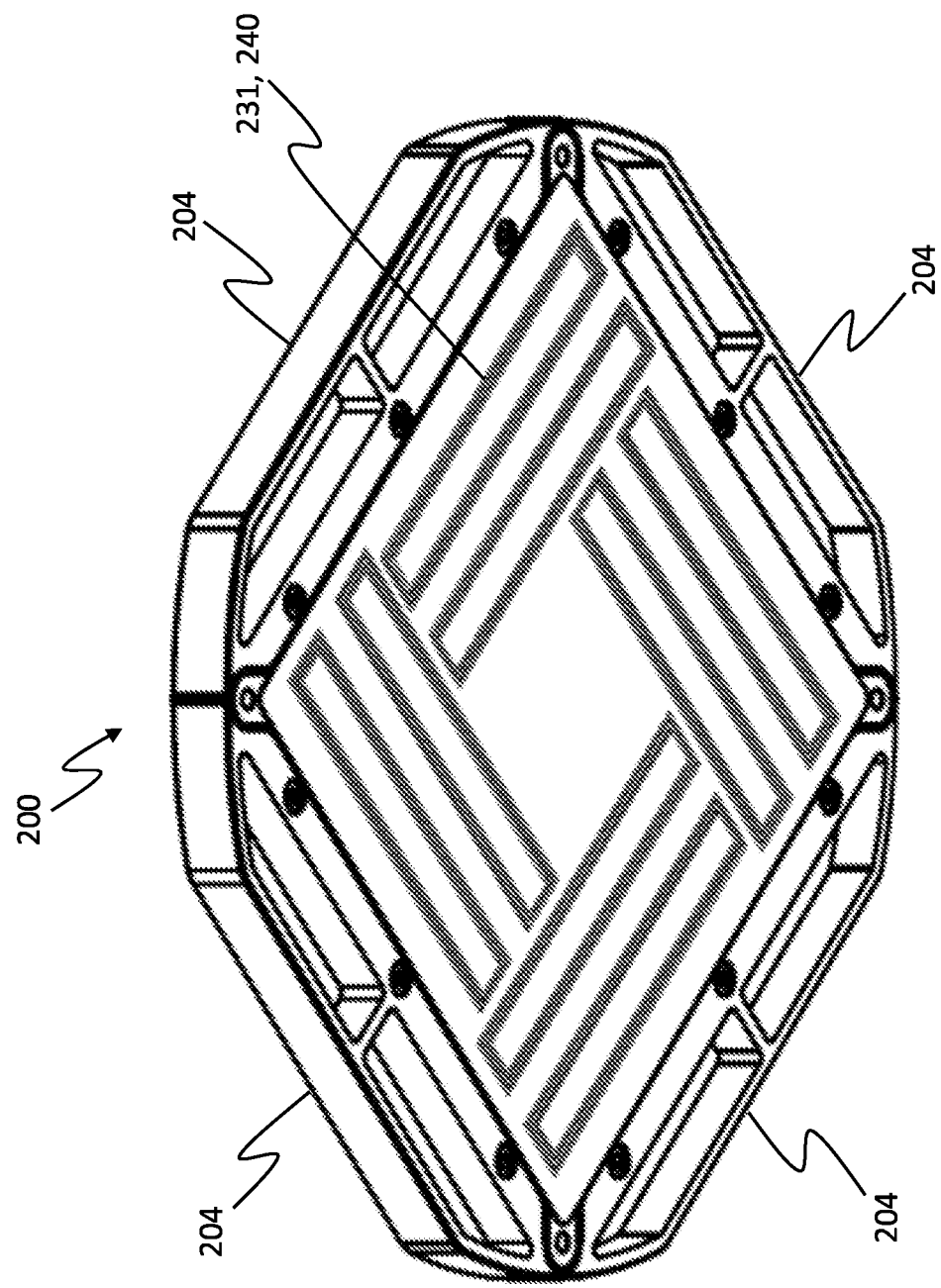
FIG. 26 is a perspective view of a further embodiment of the rotor having a printed circuit board arranged on an underside of the rotor.

With respect to the rotor 200, modified embodiments may also be considered. FIG. 26 shows a perspective view from below of a further possible embodiment of the rotor 200. Here, the rotor 200 comprises a second printed circuit board 231 with a plurality of or four rotor coils 240 arranged on the underside and located below the magnet device 201. The second circuit board 231 extends over substantially the entire surface of the rotor 200, and in this way a relatively large coil area may be provided, which promotes effective energy transfer from the stator 5 to the rotor 200. The second printed circuit board 231 may also comprise multiple layers.

In the embodiment shown in FIG. 26, the flying height of the rotor 200 may be reduced by the thickness of the second printed circuit board 231. Therefore, it may be considered to implement the second printed circuit board 231 with a smaller thickness and a smaller number of layers compared to the first printed circuit board 230 shown in FIGS. 3, 17 and 18. For example, it is possible to implement the second printed circuit board 231 with a thickness of 0.3 mm and, as shown in an exploded view in FIG. 27, having two layers.

Figure 27:
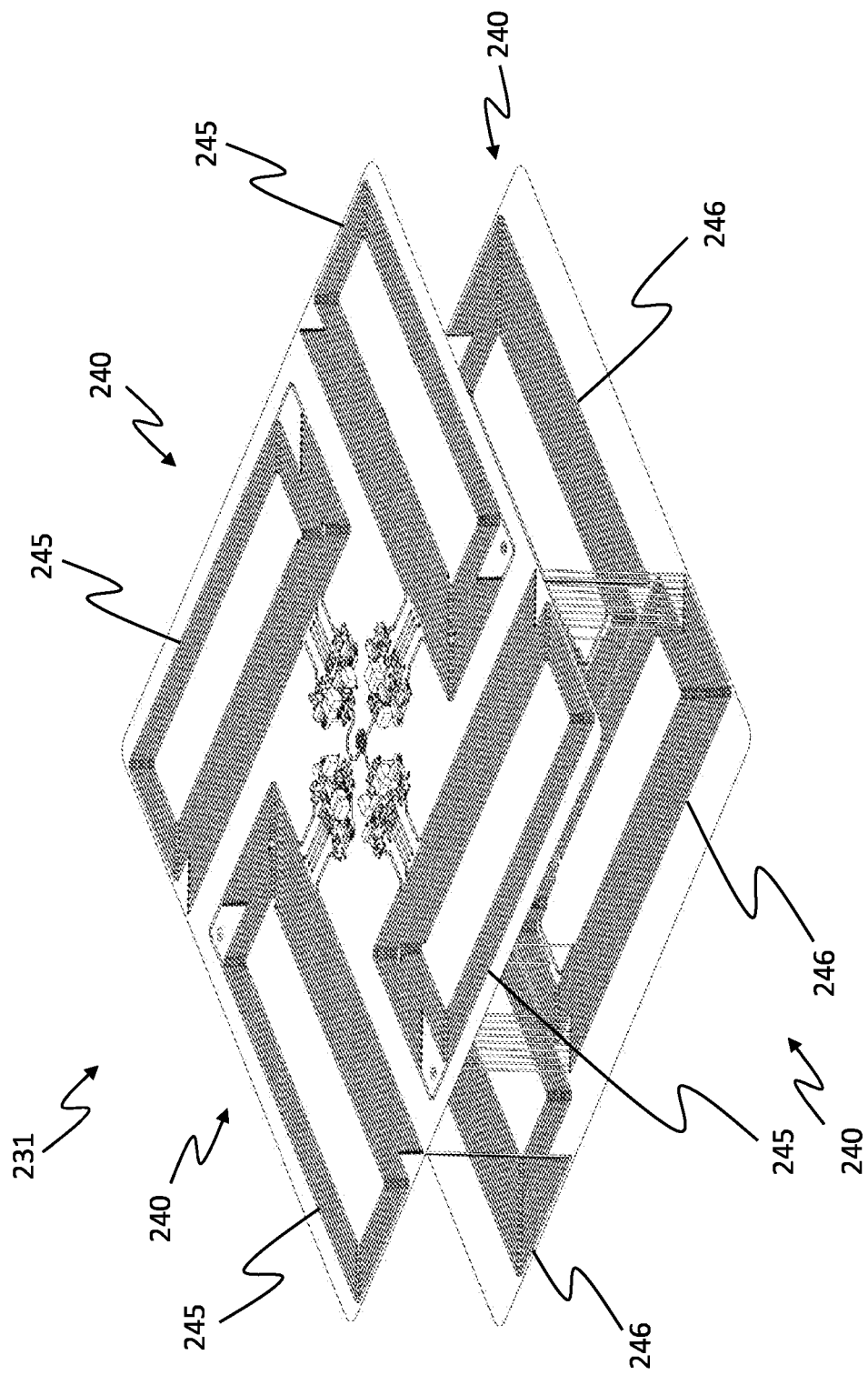
FIG. 27 is an exploded view of the printed circuit board of the rotor of FIG. 26 having a plurality of rotor coils.

According to the embodiment shown in FIG. 27, the second circuit board 231 comprises four side-by-side spiral-shaped metallic third conductor tracks 245 in an upper layer and four side-by-side spiral-shaped metallic fourth conductor tracks 246 in a lower layer. A stacked pair of third and fourth conductor tracks 246, which may be electrically connected via vertical connection structures of the second circuit board 231, may each form one of the four rotor coils 240. Furthermore, the rotor coils 240 may be electrically connected to one another.

With reference to the embodiment of the rotor 200 shown in FIGS. 26 and 27, the circuit arrangement shown in FIG. 13 may be applied in a corresponding manner. In this regard, the rotor coil 240 shown in FIG. 13 may serve as an equivalent circuit to the rotor coils 240 of the second circuit board 231 shown in FIG. 27, and may comprise all of the electrically connected rotor coils 240 of the second circuit board 231. Furthermore, the second coil portion 249 used for short-circuiting in the load modulation may be formed by all of the fourth conductor tracks 246, and the first coil portion 248 may be formed by all of the third conductor tracks 245 of the second circuit board 231. The fourth conductor tracks 246 may face the stator 5 during operation of the planar drive system 1, and may have the smallest distance to the stator 5 and to its three-phase systems 150 compared to the third conductor tracks 245. Analogously to the embodiment shown in FIG. 21, the fourth conductor tracks 246 may have a larger conductor cross-section than the third conductor tracks 245.

Figure 28:
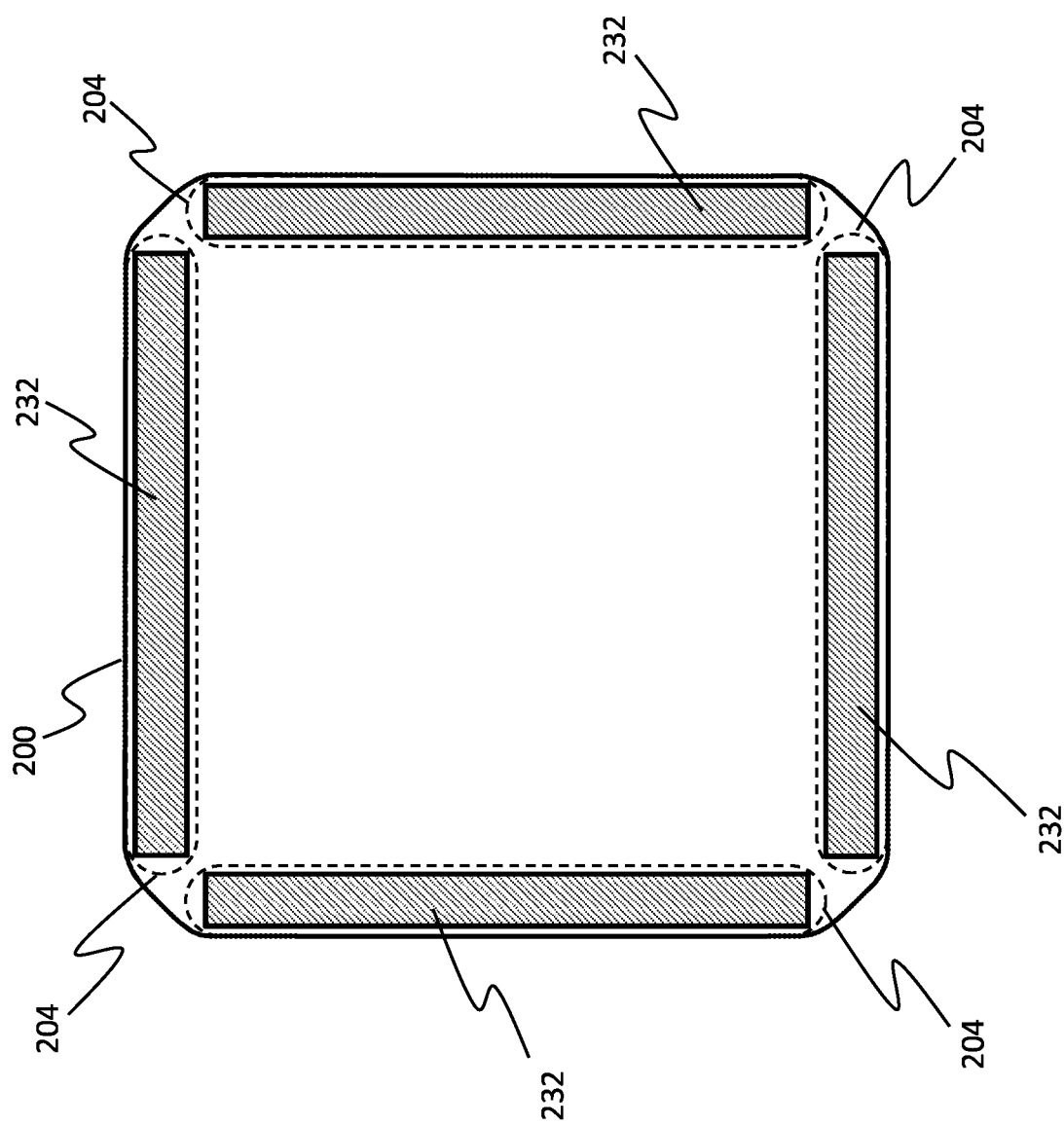
FIG. 28 is an illustration of a further embodiment of the rotor, which comprises a plurality of printed circuit boards in the region of lateral outer sides.

FIG. 28 shows a further possible embodiment of the rotor 200, in which the rotor 200 has a plurality of or four third printed circuit boards 232, which are arranged in the region of lateral outer sides of the rotor 200. The third circuit boards 232 may be multilayer circuit boards, and may have a thickness of e.g. 1 mm. Each third circuit board 232 may comprise a plurality of stacked spiral-shaped conductor tracks, which together may form a rotor coil 240. In this manner, the rotor 200 may have one rotor coil 240 per third circuit board 232, and thus a total of four rotor coils 240. The rotor coils 240 may be electrically connected. The number of layers may e.g. correspond to the first printed circuit board 230 shown in FIG. 19. The third circuit boards 232 may be integrated into spacers 204 of the rotor 200, which may be present in the area of the lateral outer sides of the rotor 200.

With reference to the embodiment of the rotor 200 shown in FIG. 28, the circuit arrangement shown in FIG. 13 may be used in a corresponding manner. Here, too, the rotor coil 240 shown in FIG. 13 may serve as an equivalent circuit of the rotor coils 240 of the third circuit boards 232, and may comprise all of the rotor coils 240 of the third circuit boards 232. The second coil portion 249 used for short-circuiting in the load modulation may be formed by lowermost conductor tracks of the third circuit boards 232.

A further embodiment for the rotor 200 is e.g. a modification of the embodiment shown in FIG. 28 in that the rotor 200 comprises only two third printed circuit boards 232 instead of four third printed circuit boards 232, which are arranged in the area of lateral outer sides of the rotor 200 or are integrated in spacers 204 of the rotor 200. Here, the two third printed circuit boards 232 may extend in different lateral directions. With reference to FIG. 28, e.g. only the two printed circuit boards 232 arranged at the top and left in the depiction of FIG. 28 may be provided.

With respect to power and data transmission between the stator 5 and the rotor 200 of the planar drive system 1, the following aspects and embodiments may further be applied.

It is e.g. possible that within the scope of data communication, a data transmission from the stator 5 to the rotor 200 (or vice versa from the rotor 200 to the stator 5) is carried out one after the other and subsequently a data transmission from the rotor 200 to the stator 5 (or vice versa from the stator 5 to the rotor 200) is carried out in the transmission direction inverse thereto.

In this respect, e.g. a predetermined frequency range with the lowest possible interference may be selected or determined by the stator 5 (or the primary controller 500) and this may be communicated to the rotor 200. Based on this, subsequent data transmission from the rotor 200 to the stator 5 may be performed by transmitting on the predetermined frequency range. This may be performed by loading the rotor coil 240 in modulated form using a carrier signal having a carrier frequency within the predetermined frequency range. In this way, the highest possible signal-to-noise ratio may be achieved under environmental conditions that are unknown in advance.

Figure 29:
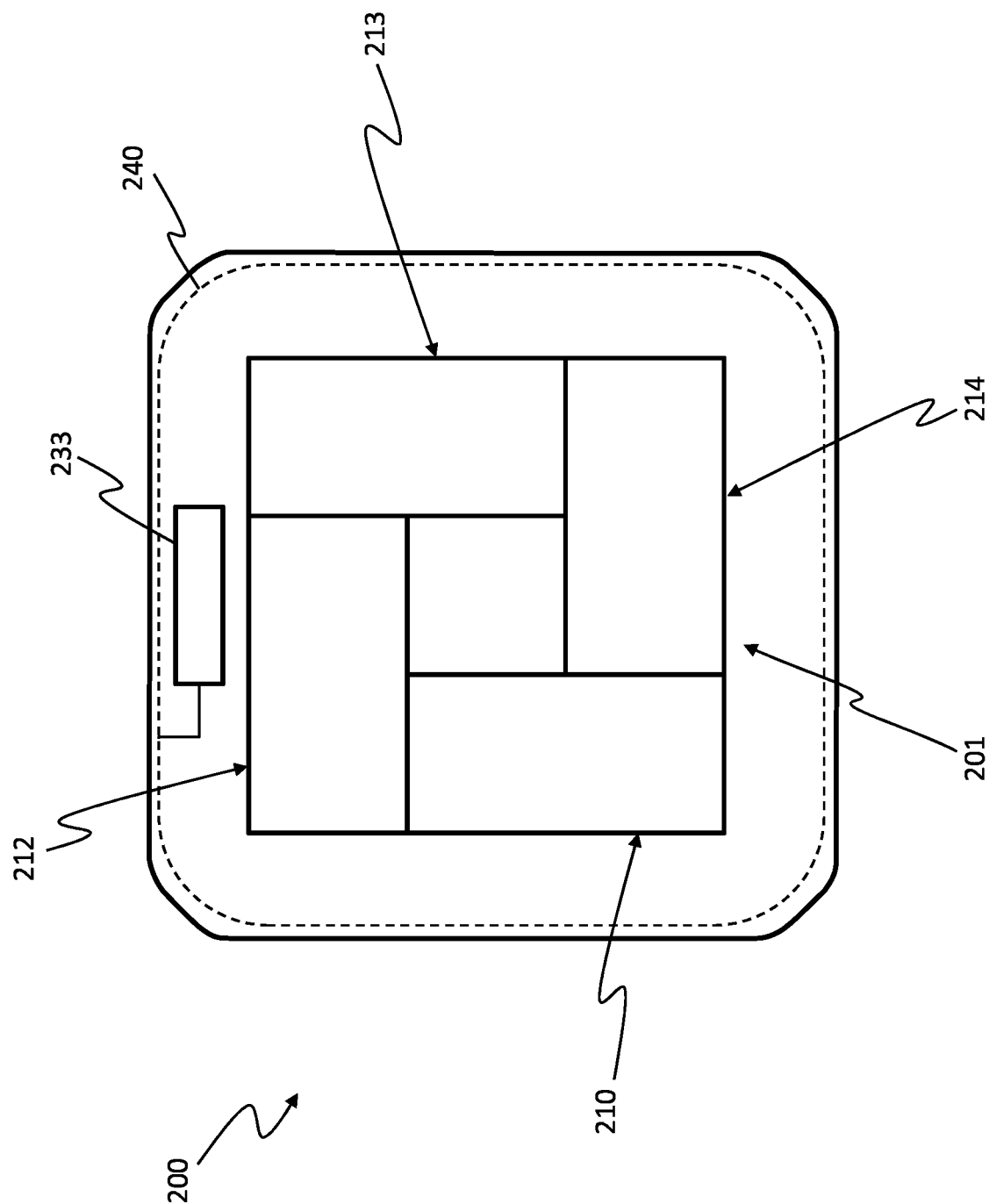
FIG. 29 is a depiction of a further embodiment of the rotor, which comprises a rotor coil in the region of lateral outer sides.

FIG. 29 shows another possible embodiment which may be considered for the rotor 200 of the planar drive system 1. The rotor 200 shown in FIG. 29 comprises a rotor coil 240 which may be used for inductive energy transfer and for data transmission between the stator 5 and the rotor 200 as described above. The rotor coil 240 is arranged in an area or installation space of the rotor 200 laterally surrounding the magnet device 201 comprising the four magnet units 210, 212, 213, 214. The rotor coil 240, which is located in the area of lateral outer sides of the rotor 200, may e.g. be integrated in spacers of the rotor 200. Also, the rotor coil 240 may be realized in the form of a multi-wound wire.

As indicated in FIG. 29, the rotor 200 may further comprise a fourth circuit board 233 at a suitable location. Components of the rotor 200 described with reference to FIG. 13 and connected to the rotor coil 240, such as the rectifier 260, the switching device 271, the controller 280, and the voltage measuring device 281, may be arranged on the fourth circuit board 233. Furthermore, the first and second coil portions 248, 249 shown in FIG. 13 may be formed by different windings of the rotor coil 240 realized in the form of a wound wire.

With reference to the embodiment described with reference to FIG. 29, the rotor 200 may further be configured such that the fourth printed circuit board 233 has a shape surrounding the magnet device 201. In this embodiment, the fourth circuit board 233 may have multiple layers. Furthermore, the rotor coil 240 may be formed by superimposed spiral-shaped conductor tracks of the fourth circuit board 233, and the first and second coil portions 248, 249 shown in FIG. 13 may be formed by different conductor tracks of the circuit board 233.

The magnet device 201 of the rotor 200 may, deviating from FIG. 29, also be embodied in such a way that the magnet device 201 does not surround any area or free space. In this way, an embodiment of the rotor 200 with small or smaller dimensions is possible. If a plurality of identical rotors 200 are used in the planar drive system 1 (see FIG. 30), more rotors 200 may be used on the stator 5.

For performing the power and data transmission between the stator 5 and the rotor(s) 200 of the planar drive system 1, the rotor(s) 200 may be held stationary on the stator 5 or be pulled towards the stator 5. It is also possible to perform power and data transmission also during normal operation of the planar drive system 1, in which the rotor(s) 200 are driven and moved. The latter variant may be favored by the embodiment of the rotor 200 shown in FIG. 29. This design allows a relatively large amount of electrical power to be transferred from the stator 5 to the rotor 200, so that a relatively large distance may be maintained between the rotor 200 and the stator 5 during power and data transmission.

Figure 30:
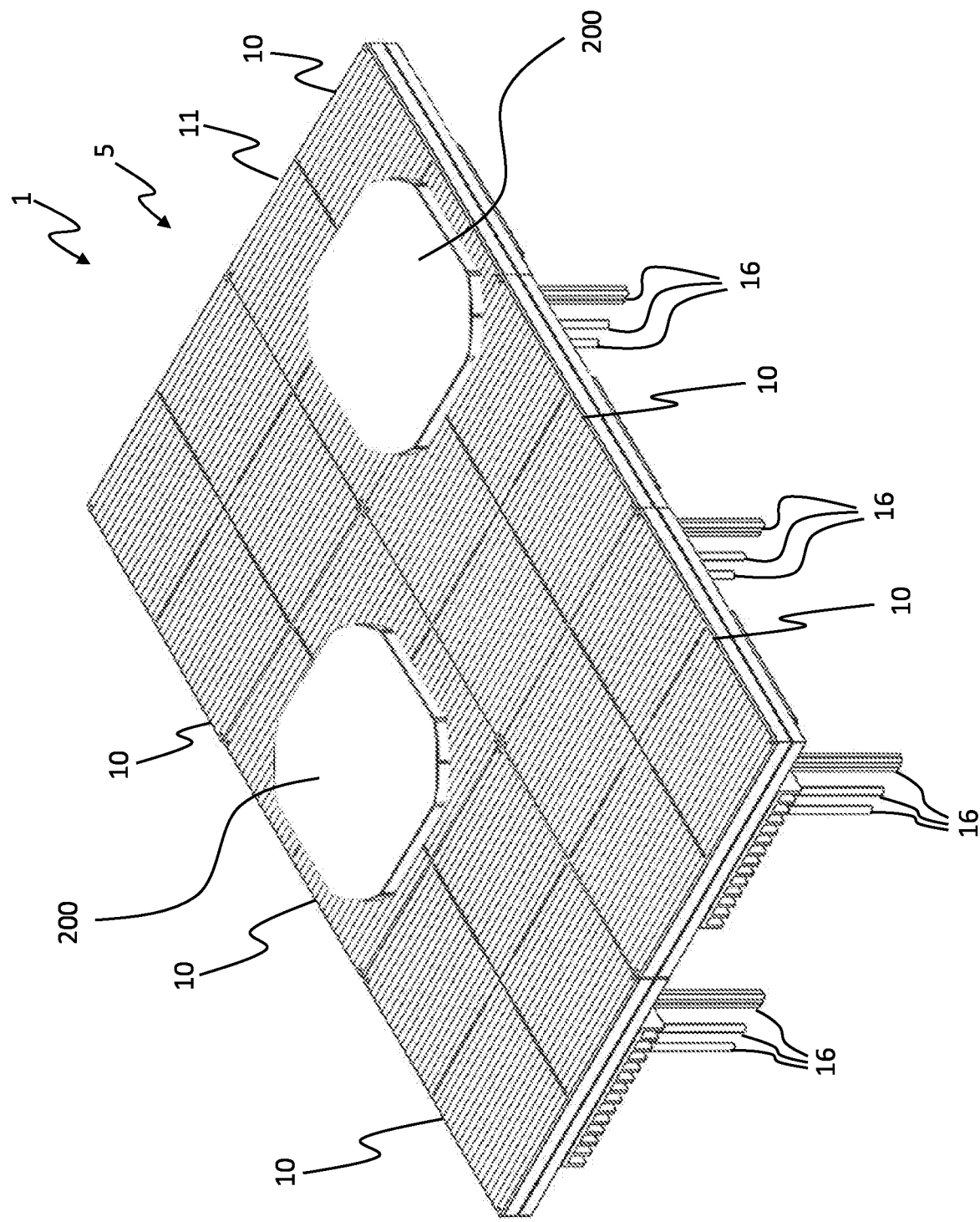
FIG. 30 is a perspective view of the planar drive system with the stator and two rotors.

As shown in FIG. 30, the planar drive system 1 may comprise a plurality of or, as shown, two rotors 200. By suitably energizing three-phase systems 150 of the stator 5, the plurality of rotors 200 may be driven as indicated above. With respect to data transmission between the plurality of rotors 200 and the stator 5, it may be contemplated to perform simultaneous data transmission on a plurality of different frequency bands or frequency ranges. In each case, this refers to performing data transmission in modulated form; that is, using a carrier signal having a carrier frequency. Different carrier signals with carrier frequencies lying in different frequency ranges may be used herein. In this way, e.g. a plurality of rotors 200 may transmit data to the stator 5 simultaneously using carrier signals with different carrier frequencies from different frequency ranges. Due to the different frequency ranges, the data streams of the rotors 200 may be separated from one another in the context of an evaluation performed by the stator 5.

A further possible embodiment is to use a different carrier signal instead of a carrier signal with a fixed carrier frequency or square-wave carrier frequency when data is transmitted in modulated form. For example, a pseudorandom sequence may be used. In this way, a user signal to be transmitted may be spread over a wider frequency range, which may make the data transmission less sensitive to narrowband interference sources. Modulation of a user signal to be transmitted to a pseudorandom carrier signal with a pseudorandom sequence may be performed, e.g. by transmitting the pseudorandom sequence in different phase positions, or by performing a transmission of the pseudorandom sequence or not. In an evaluation, a correlation may also be performed here using at least one reference signal.

The aforementioned approach may be used in a corresponding manner to distinguish between different data streams, which may be sent by a plurality of rotors 200 (cf. FIG. 30), for example. Differentiation of the data streams may be achieved by using different carrier signals with different pseudo-random sequences.

It should be noted that apart from the embodiments described above, additional or alternative wireless communication options may be considered for a planar drive system comprising a stator and at least one rotor. For example, the use of RFID (Radio-Frequency Identification) or NFC (Near Field Communication) is conceivable. In this context, the or at least one rotor of the planar drive system may have a transponder such as an NFC chip, and the stator may have a reader embodied to communicate with the transponder. The transponder may e.g. be located at the edge of the rotor or on the side of a rotor coil or printed circuit board of the rotor.

Other wireless communication types or radio technologies may be used, as well. In this case, the or at least a rotor of the planar drive system and the stator may comprise suitable communication devices (transmitting device, receiving device, transceiver or transceiver). Further conceivable are radio technologies or (mobile) radio standards such as 5G, 4G (LTE—Long Term Evolution), 3G (UMTS—Universal Mobile Telecommunications System), 2G (GSM—Global System for Mobile Communications), Bluetooth, WLAN (Wireless Local Area Network), WAN (Wide Area Network), ZigBee, Loran (Long Range Navigation), DECT (Digital Enhanced Cordless Telecommunications), EnOcean, Wibree or WiMAX (Worldwide Interoperability for Microwave Access) in the radio frequency range, as well as IrDA (Infrared Data Association) and optical directional radio (FSO, Free-Space Optics) in the infrared or optical frequency range.

External communication or RFID communication is also possible without the involvement of the stator. In this case, the or at least one rotor of the planar drive system may comprise a transponder or another communication device, and an external reading device or another external communication device may be used correspondingly.

Although the invention has been further illustrated and described in detail by embodiments, the invention is not limited by the disclosed examples and other variations may be derived therefrom by those skilled in the art without departing from the scope of protection of the invention.

The invention claimed is:

1. A planar drive system comprising:
a stator, and
a rotor;
wherein the stator comprises a plurality of energizable stator conductors,
wherein the rotor comprises a magnet device having at least one rotor magnet,
wherein a magnetic interaction is producible between energized stator conductors of the stator and the magnet device of the rotor in order to drive the rotor,
wherein the stator is configured to carry out energization of the energizable stator conductors such that an alternating magnetic field is generated via the energized stator conductors,
wherein the rotor comprises at least one rotor coil in which an alternating voltage is inducible due to the alternating magnetic field, and
wherein the planar drive system is configured to transmit data from the stator to the rotor, in that the stator is configured to temporarily influence the energization of the energizable stator conductors in order to thereby temporarily cause a change with respect to the alternating voltage inducible in the at least one rotor coil of the rotor.

2. The planar drive system according to claim 1, wherein the stator comprises an influencing device for temporarily influencing the energization of the energizable stator conductors.

3. The planar drive system according to claim 2,
wherein the stator is configured to perform the energization of the energizable stator conductors by a current control based on a pulse-width modulation, and
wherein the influencing device is configured to temporarily influence the current control.

4. The planar drive system according to claim 3,
wherein, due to the current control, a ripple current in the energized stator conductors of the stator and thereby the alternating magnetic field are generated, and
wherein the influencing device is configured to influence the current control such that a change with respect to the ripple current is caused in the energized stator conductors.

5. The planar drive system according to claim 3, wherein the influencing device is configured to suppress a supplying of the energizable stator conductors with voltage pulses that is carried out during the current control.

6. The planar drive system according to claim 3,
wherein the energizable stator conductors of the stator are connected to form multiphase systems which are energizable independently of one another,
wherein energized multiphase systems are supplied with voltage pulses which are center-aligned with respect to one another during the current control, and
wherein the influencing device is configured to influence current control of at least one of the multiphase systems such that voltage pulses having matching pulse widths are applied to the energized multiphase system.

7. The planar drive system according to claim 1, wherein the stator is configured to perform the influencing of the energization of the energizable stator conductors in modulated form.

8. The planar drive system according to claim 1, wherein the rotor comprises a voltage measuring device for measuring the alternating voltage.

9. The planar drive system according to claim 8, wherein the rotor comprises a processing device for evaluating the measured alternating voltage.

10. The planar drive system according to claim 1, wherein the rotor comprises a rectifier for converting the alternating voltage into a direct voltage.

11. The planar drive system according to claim 1, wherein the planar drive system is configured to transmit data from the rotor to the stator, in that the rotor is configured to temporarily load the at least one rotor coil in order to thereby temporarily cause an increased current consumption of the energized stator conductors of the stator.

12. A planar drive system comprising:
a stator, and
a rotor;
wherein the stator comprises a plurality of energizable stator conductors,
wherein the rotor comprises a magnet device having at least one rotor magnet,
wherein a magnetic interaction is producible between energized stator conductors of the stator and the magnet device of the rotor in order to drive the rotor,
wherein the stator is configured to carry out energization of the energizable stator conductors by a current control based on a pulse-width modulation, so that the energizable stator conductors are supplied with pulse-width modulated periodic voltage pulses,
wherein, due to the current control based on pulse-width modulation, a ripple current in the energized stator conductors of the stator and thereby an alternating magnetic field are generated,
wherein the rotor comprises at least one rotor coil in which an alternating voltage is inducible due to the alternating magnetic field,
wherein the planar drive system is configured to transmit data from the stator to the rotor, in that the stator is configured to temporarily influence the energization of the energizable stator conductors in order to thereby temporarily cause a change with respect to the alternating voltage inducible in the at least one rotor coil of the rotor, and
wherein the stator comprises an influencing device for temporarily influencing the energization of the energizable stator conductors for this purpose, which is configured to temporarily influence the current control such that a change with respect to the ripple current is caused in the energized stator conductors of the stator.

13. The planar drive system according to claim 12, wherein the change with respect to the ripple current comprises one of the following:
suppressing the ripple current; or
causing an increased or reduced value of the ripple current.

14. The planar drive system according to claim 12, wherein the influencing device is configured to suppress a supplying of the energizable stator conductors with voltage pulses that is carried out during the current control and to suppress occurrence of the ripple current in the energized stator conductors of the stator.

15. The planar drive system according to claim 12,
wherein the energizable stator conductors of the stator are connected to form multiphase systems which are energizable independently of one another and which comprise a plurality of coils formed from the energizable stator conductors,
wherein the current control is carried out based on a center-aligned pulse-width modulation in which coils of energized multiphase systems are supplied with voltage pulses which are center-aligned with respect to one another with reference to a time grid of the pulse-width modulation, said voltage pulses having different pulse-widths in an uninfluenced state, and
wherein the influencing device is configured to influence current control of at least one of the multiphase systems such that voltage pulses having matching pulse widths are applied to the coils of the energized multiphase system and as a result, occurrence of the ripple current is suppressed in the at least one multiphase system.

16. A planar drive system comprising:
a stator, and
a rotor;
wherein the stator comprises a plurality of energizable stator conductors,
wherein the rotor comprises a magnet device having at least one rotor magnet,
wherein a magnetic interaction is producible between energized stator conductors of the stator and the magnet device of the rotor in order to drive the rotor,
wherein the stator is configured to carry out the energization of the energizable stator conductors by a current control based on a pulse-width modulation, so that the energizable stator conductors are supplied with pulse-width modulated periodic voltage pulses,
wherein, due to the current control based on pulse-width modulation, a ripple current in the energized stator conductors of the stator and thereby an alternating magnetic field are generated,
wherein the rotor comprises at least one rotor coil in which an alternating voltage is inducible due to the alternating magnetic field,
wherein the planar drive system is configured to transmit data from the stator to the rotor, in that the stator is configured to temporarily influence the energization of the energizable stator conductors in order to thereby temporarily cause a change with respect to the alternating voltage inducible in the at least one rotor coil of the rotor, and
wherein the temporary influence of the energization of the energizable stator conductors comprises temporarily influencing the current control such that a change with respect to the ripple current is caused in the energized stator conductors of the stator.

17. The planar drive system according to claim 16, wherein the change with respect to the ripple current comprises one of the following:
suppressing the ripple current; or
causing an increased or reduced value of the ripple current.

18. The planar drive system according to claim 16, wherein the temporary influence of the current control comprises suppressing a supplying of the energizable stator conductors with voltage pulses that is carried out during the current control and suppressing occurrence of the ripple current in the energized stator conductors of the stator.

19. The planar drive system according to claim 16,
wherein the energizable stator conductors of the stator are connected to form multiphase systems which are energizable independently of one another and which comprise a plurality of coils formed from the energizable stator conductors,
wherein the current control is carried out based on a center-aligned pulse-width modulation in which coils of energized multiphase systems are supplied with voltage pulses which are center-aligned with respect to one another with reference to a time grid of the pulse-width modulation, said voltage pulses having different pulse-widths in an uninfluenced state, and
wherein the temporary influence of the current control comprises influencing the current control of at least one of the multiphase systems such that the coils of the energized multiphase systems are supplied with voltage pulses having matching pulse widths and occurrence of the ripple current is suppressed in the at least one multiphase system.

* * * * *